United States Patent
Arai et al.

(10) Patent No.: US 10,977,917 B2
(45) Date of Patent: *Apr. 13, 2021

(54) SURVEILLANCE CAMERA SYSTEM AND SURVEILLANCE METHOD

(71) Applicant: Panasonic i-PRO Sensing Solutions Co., Ltd., Fukuoka (JP)

(72) Inventors: Takamitsu Arai, Fukuoka (JP); Marie Kanda, Fukuoka (JP); Takahiro Yoshimura, Fukuoka (JP); Atsuharu Yamamoto, Kanagawa (JP); Kazuma Ohtani, Kanagawa (JP); Takashi Kamio, Kanagawa (JP)

(73) Assignee: Panasonic i-PRO Sensing Solutions Co., Ltd., Fukuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/688,787

(22) Filed: Nov. 19, 2019

(65) Prior Publication Data

US 2020/0082691 A1 Mar. 12, 2020

Related U.S. Application Data

(63) Continuation of application No. 15/830,203, filed on Dec. 4, 2017, now Pat. No. 10,529,205.

(30) Foreign Application Priority Data

Feb. 27, 2017 (JP) .................... 2017-035464

(51) Int. Cl.
*G08B 13/196* (2006.01)
*G06K 9/00* (2006.01)
(Continued)

(52) U.S. Cl.
CPC ... *G08B 13/19673* (2013.01); *G06K 9/00288* (2013.01); *G06K 9/00362* (2013.01);
(Continued)

(58) Field of Classification Search
USPC .......................................... 348/148
See application file for complete search history.

(56) References Cited

U.S. PATENT DOCUMENTS

| 10,529,205 B2 * | 1/2020 | Arai ................... G06K 9/00288 |
| 2008/0018737 A1 | 1/2008 | Suzuki et al. |

(Continued)

FOREIGN PATENT DOCUMENTS

| JP | H06-240918 A | 8/1994 |
| JP | 2005-346545 A | 12/2005 |

(Continued)

OTHER PUBLICATIONS

Japanese Notice of Reasons for Refusal dated Jun. 2, 2020, for Corresponding Japanese Patent Application No. 2017-035464, 5 pages. (With English Machine Translation).

*Primary Examiner* — Behrooz M Senfi
(74) *Attorney, Agent, or Firm* — Seed IP Law Group LLP

(57) ABSTRACT

A camera transmits a captured image of a surveillance area to a server. A microphone receives a sound of the surveillance area and transmits the sound to the server. The server detects a warning sound starting based on a harming behavior on a vehicle in a surveillance area and arriving from the vehicle using the sound of the surveillance area, determines an occurrence position of the harming behavior based on the detection of the warning sound, acquires a captured image of the occurrence position, determines the vehicle on which the harming behavior is executed using the captured image of the occurrence position, acquires information regarding the vehicle, and records the information regarding the vehicle (Continued)

and the captured image of the occurrence position in association with each other in an accumulator.

8 Claims, 24 Drawing Sheets

(51) Int. Cl.
*G08B 25/08* (2006.01)
*G08G 1/017* (2006.01)

(52) U.S. Cl.
CPC ..... *G06K 9/00771* (2013.01); *G06K 9/00825* (2013.01); *G06K 9/00979* (2013.01); *G08B 13/1963* (2013.01); *G08B 13/19602* (2013.01); *G08B 13/19656* (2013.01); *G08B 25/08* (2013.01); *G08G 1/0175* (2013.01)

(56) References Cited

U.S. PATENT DOCUMENTS

| | | |
|---|---|---|
| 2010/0321183 A1 | 12/2010 | Donovan et al. |
| 2014/0023247 A1 | 1/2014 | Kuwahara et al. |
| 2014/0218527 A1* | 8/2014 | Subramanya ........... G01S 13/50 348/148 |
| 2016/0241818 A1 | 8/2016 | Palanisamy et al. |
| 2017/0278389 A1* | 9/2017 | Okazaki ................. G08G 1/205 |
| 2018/0050800 A1 | 2/2018 | Boykin et al. |

FOREIGN PATENT DOCUMENTS

| | | |
|---|---|---|
| JP | 2008-068744 A | 3/2008 |
| JP | 2008-152460 A | 7/2008 |
| JP | 2014-022970 A | 2/2014 |

* cited by examiner

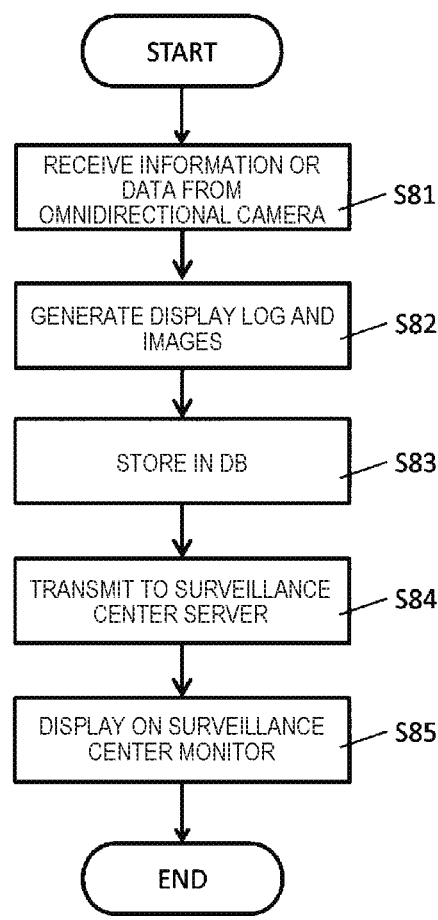

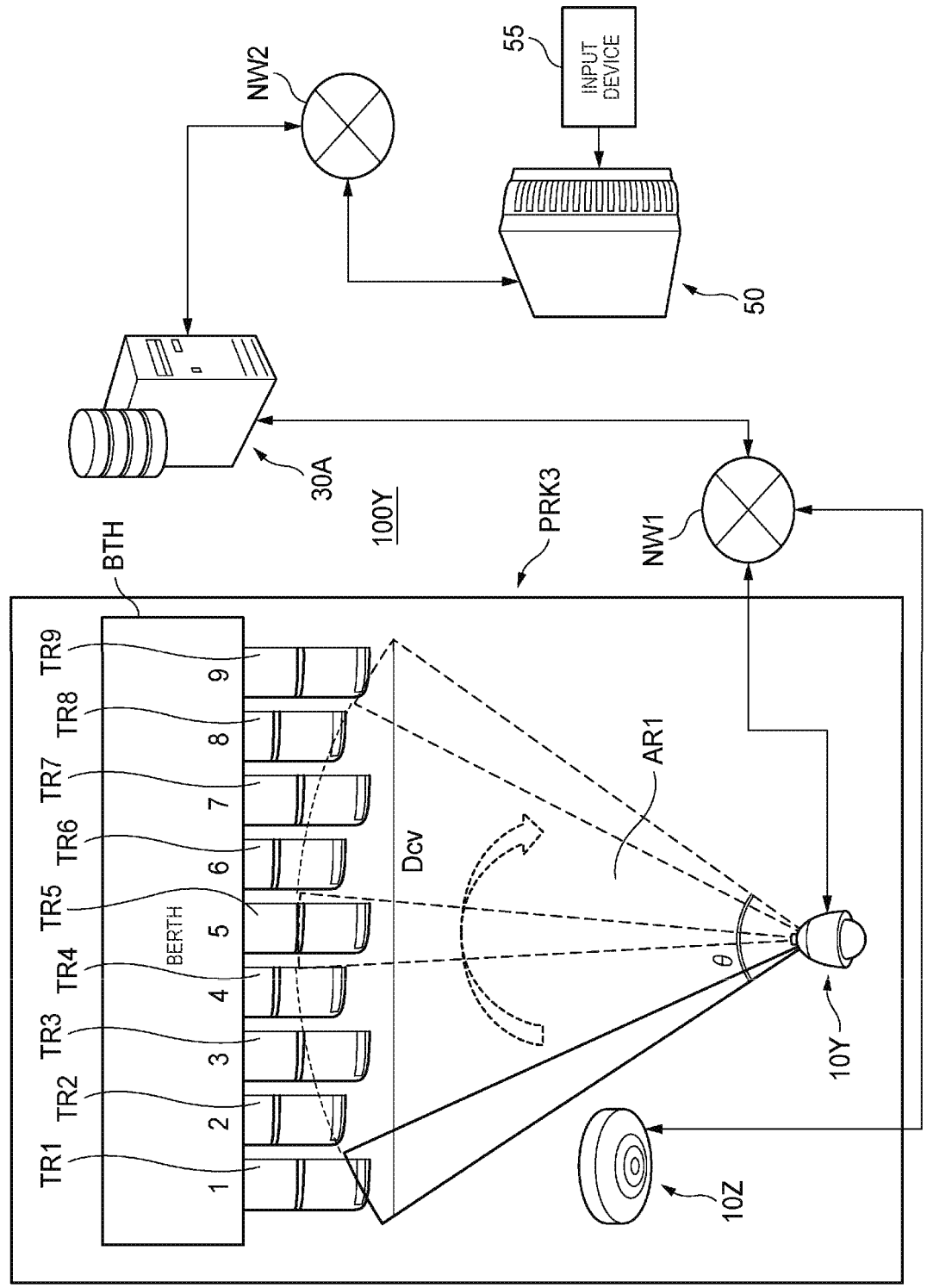

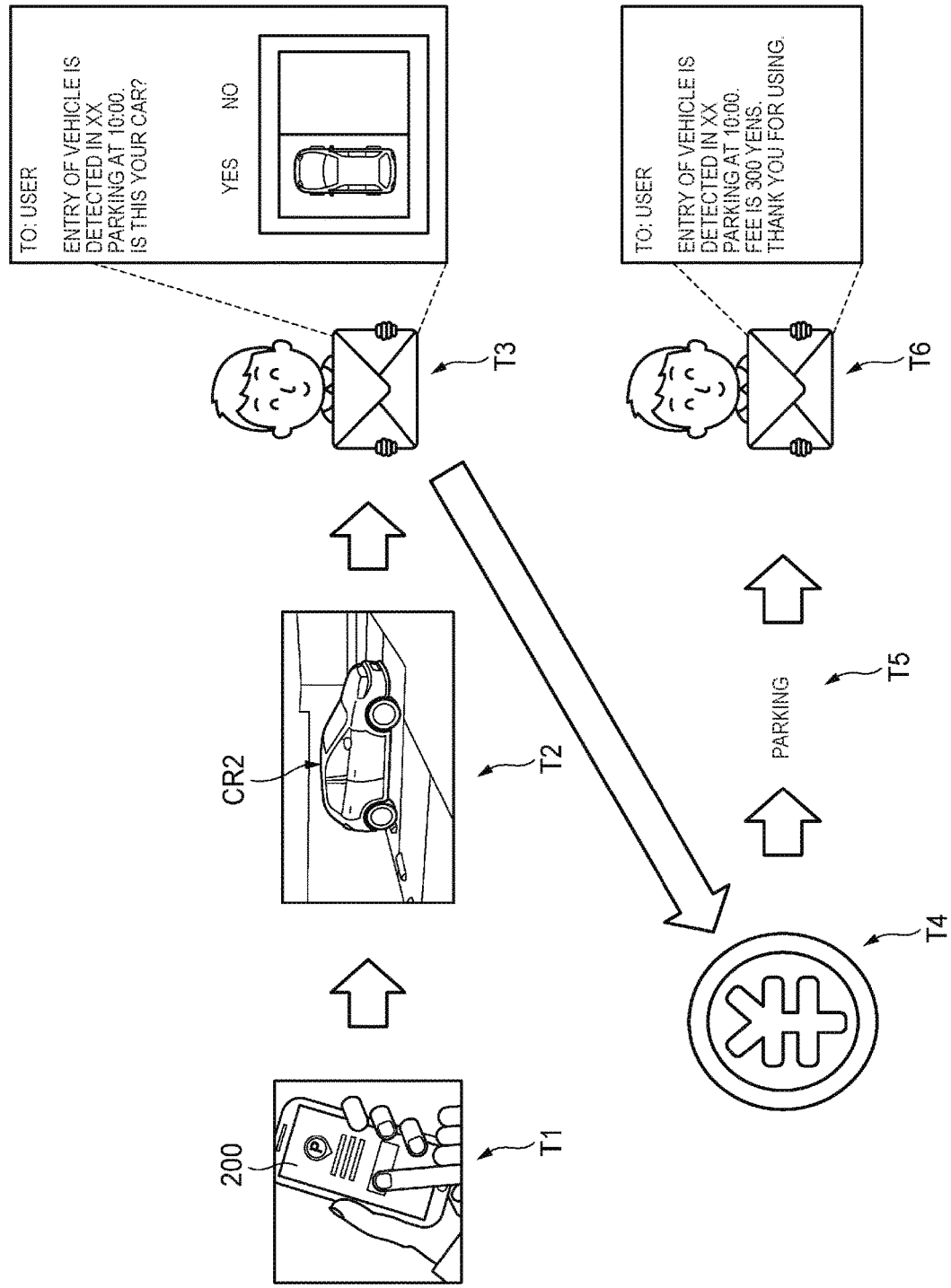

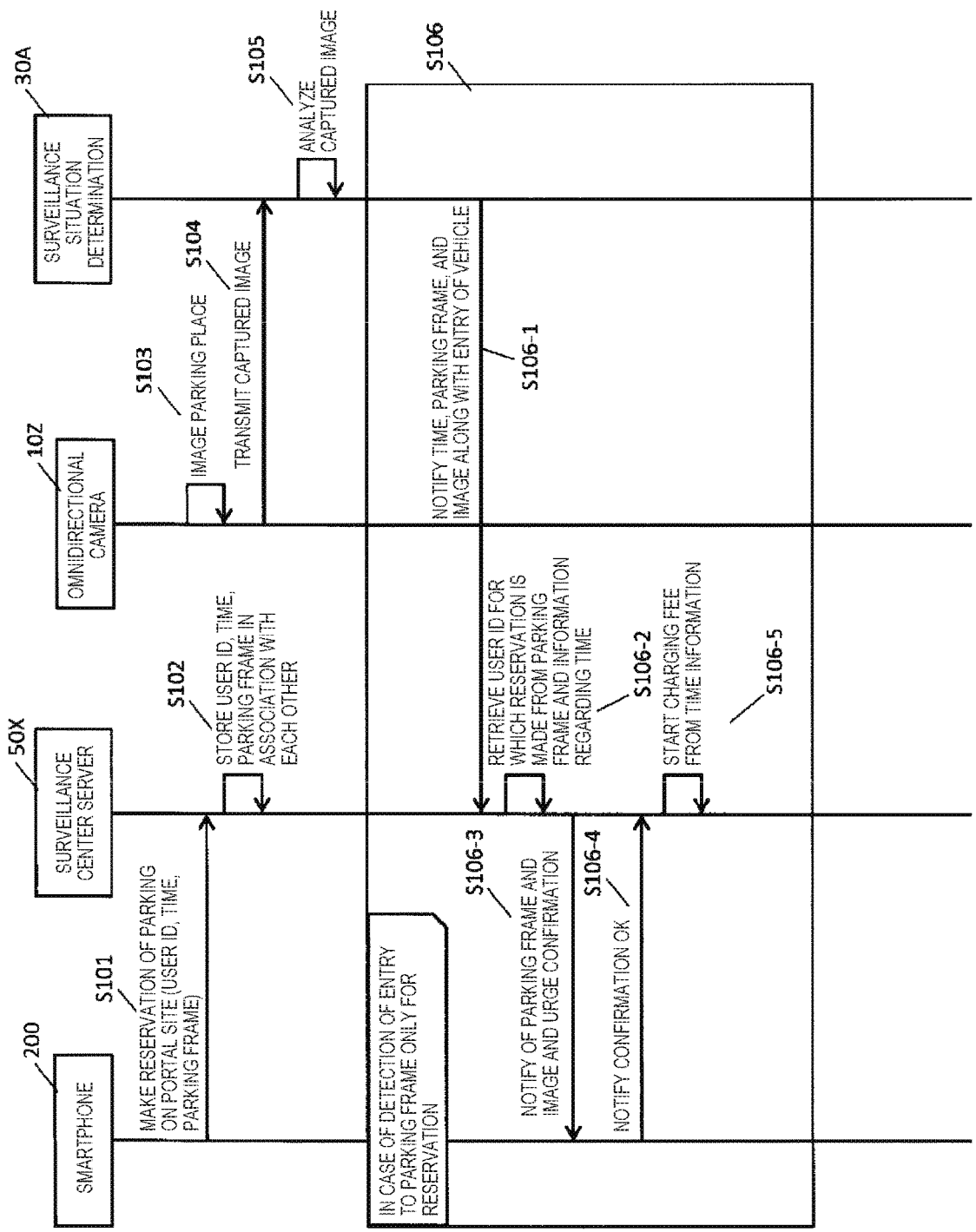

SURVEILLANCE CAMERA SYSTEM AND SURVEILLANCE METHOD

BACKGROUND

1. Technical Field

The present disclosure relates to a surveillance camera system and a surveillance method of surveilling an area of a surveillance target based on an image analysis result obtained using a captured image of a camera.

2. Background

As a technology of the related art for tracking a movement of a vehicle from an entrance to an exit in a parking place which is an example of a surveillance target area to manage parking, there is known, for example, a parking management system disclosed in, for example, Japanese Patent Unexamined Publication No. 2008-152460. The parking management system disclosed in Japanese Patent Unexamined Publication No. 2008-152460 analyzes videos of a plurality of cameras capable of surveilling an entire area of the parking place, continuously tracks movement of a vehicle, and records parking information such as a parking location and times of parking start, and parking end in association with a vehicle ID of the vehicle from positional information regarding the tracked vehicle. Thus, since the entire area of the parking place is surveilled with the videos of the cameras, security of the parking place can be improved.

However, in Japanese Patent Unexamined Publication No. 2008-152460, to collect detailed information including a harmed vehicle or an occurrence position of an incident in a case in which a malicious third person (for example, a person breaking into a vehicle or a thief) executes a behavior (for example, vehicle break-in or stealing) of harming a parked vehicle in a parking place is not considered. Therefore, in the technology of the related art, in a case in which there is a behavior of harming a parked vehicle in a parking place, a surveillance agent (for example, a private surveillance provider or the police) grasps a harm situation of an incident by a late notice of a customer (for example, a driver of a harmed parked vehicle) and grasps the details of a situation at that time at which a harm occurs later, for example, by appropriately rewinding a video of a surveillance camera near a scene of an incident. A considerably complicated and difficult work is forced to grasp the situation at that time, for example, by rewinding the video of the surveillance camera, and thus there is a problem that efficiency is insufficient in early grasping of the details of the incident.

SUMMARY

To address the above-described problems of the related art, the present disclosure is to provide a surveillance camera system and a surveillance method for improving efficiency with which a surveillance agent early grasps the details of an incident by early collecting detailed information including a harmed vehicle or the position of a scene of an incident in a case in which there is a behavior of harming the parked vehicle in a parking place.

According to an aspect of the present disclosure, there is provided a surveillance camera system including: a camera and a microphone installed in a surveillance area; and a server. The camera transmits a captured image of the surveillance area to the server. The microphone receives a sound of the surveillance area and transmits the output to the server. The server detects a warning sound starting based on a harming behavior on a vehicle in the surveillance area and arriving from a vehicle using a sound of the surveillance area transmitted from the microphone. The server determines an occurrence position of the harming behavior based on the detection of the warning sound and acquires a captured image of the determined occurrence position. The server determines the vehicle on which the harming behavior is executed using the captured image of the occurrence position and acquires information regarding the determined vehicle. The server records the information regarding the vehicle and the captured image of the occurrence position in association with each other in an accumulator.

According to another aspect of the present disclosure, there is provided a surveillance method using a surveillance camera system including a camera and a microphone installed in a surveillance area and a server. The camera transmits a captured image of the surveillance area to the server. The microphone receives a sound of the surveillance area and transmits the output to the server. The server detects a warning sound starting based on a harming behavior on a vehicle in the surveillance area and arriving from a vehicle using a sound of the surveillance area transmitted from the microphone. The server determines an occurrence position of the harming behavior based on the detection of the warning sound and acquires a captured image of the determined occurrence position. The server determines the vehicle on which the harming behavior is executed using the captured image of the occurrence position and acquires information regarding the determined vehicle. The server records the information regarding the vehicle and the captured image of the occurrence position in association with each other in an accumulator.

According to the aspects of the present disclosure, it is possible to early collect detailed information including the position of a harmed vehicle or the position of a scene of an incident in a case in which there is a behavior of harming the parked vehicle in a parking place, and thus improving efficiency with which a surveillance agent early grasps the details of an incident.

BRIEF DESCRIPTION OF THE DRAWINGS

FIG. 14B is a flowchart illustrating an example of an operation procedure of a surveillance situation determination server in detail according to Exemplary Embodiment 2;

FIG. 15 is a diagram schematically illustrating an overview of an example of a system configuration of a parking place surveillance system according to Exemplary Embodiment 3;

FIG. 21 is a diagram schematically illustrating an example of an operation overview of a parking place surveillance system according to Exemplary Embodiment 4;

FIG. 22 is a sequence diagram illustrating an example of an operation sequence in detail at the time of entry of a vehicle in the parking place surveillance system according to Exemplary Embodiment 4.

DETAILED DESCRIPTION

Hereinafter, referring appropriately to the drawings, exemplary embodiments in which a surveillance camera system and a surveillance method according to the present disclosure are specifically disclosed will be described in detail. Here, detailed description will not be made more than necessary in some cases. For example, detailed description of known factors or repeated description of substantially the same configuration will not be made in some cases. The reason is to prevent the following description from being unnecessarily redundant and facilitate those skilled in the art to understand. The appended drawings and the following description are provided so that those skilled in the art sufficiently understand the present disclosure and are not intended to limit subjects described in the claims.

In the following exemplary embodiments, a parking place in which a plurality of vehicles can be parked will be exemplified as a surveillance area of a surveillance camera system according to the present disclosure in the following description. A parking place surveillance system will be exemplified as a surveillance camera system in the following description.

In the description of the following exemplary embodiments, a process of associating certain information or data with another information or data is defined as "tagging". A tagging process is executed by a surveillance situation determination server included in the parking place surveillance system. At the time of tagging, tagging identification information is assumed to be given as identification information of the tagging process and visual information at the time of tagging is assumed to be also recorded in association with the tagging identification information.

Exemplary Embodiment 1

In Exemplary Embodiment 1, in a case in which a harming behavior (for example, vehicle break-in) on a vehicle parked in a parking place (for example, a parking place on a road) (hereinafter referred to as a "parked vehicle" in some cases) is detected, an example of a parking place surveillance system that records at least information regarding the parked vehicle with a captured image (for example, a still image or a moving image) of the parked vehicle by tagging the information with the captured image.

First, a first example of a system configuration of the parking place surveillance system according to Exemplary Embodiment 1 will be described.

Figure 1:
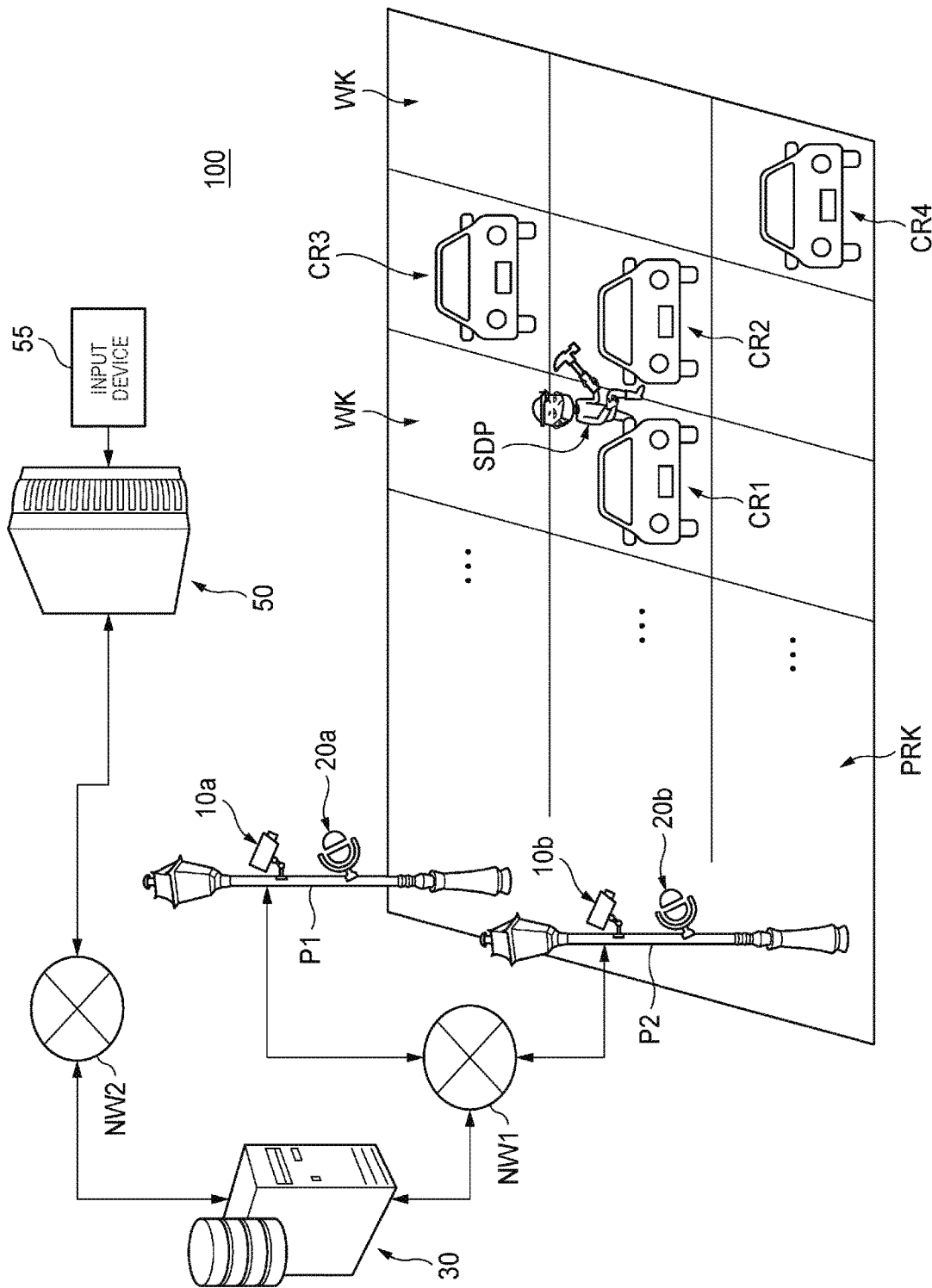
FIG. 1 is a diagram schematically illustrating an overview of a first example of a system configuration of a parking place surveillance system according to Exemplary Embodiment 1.
Figure 2:
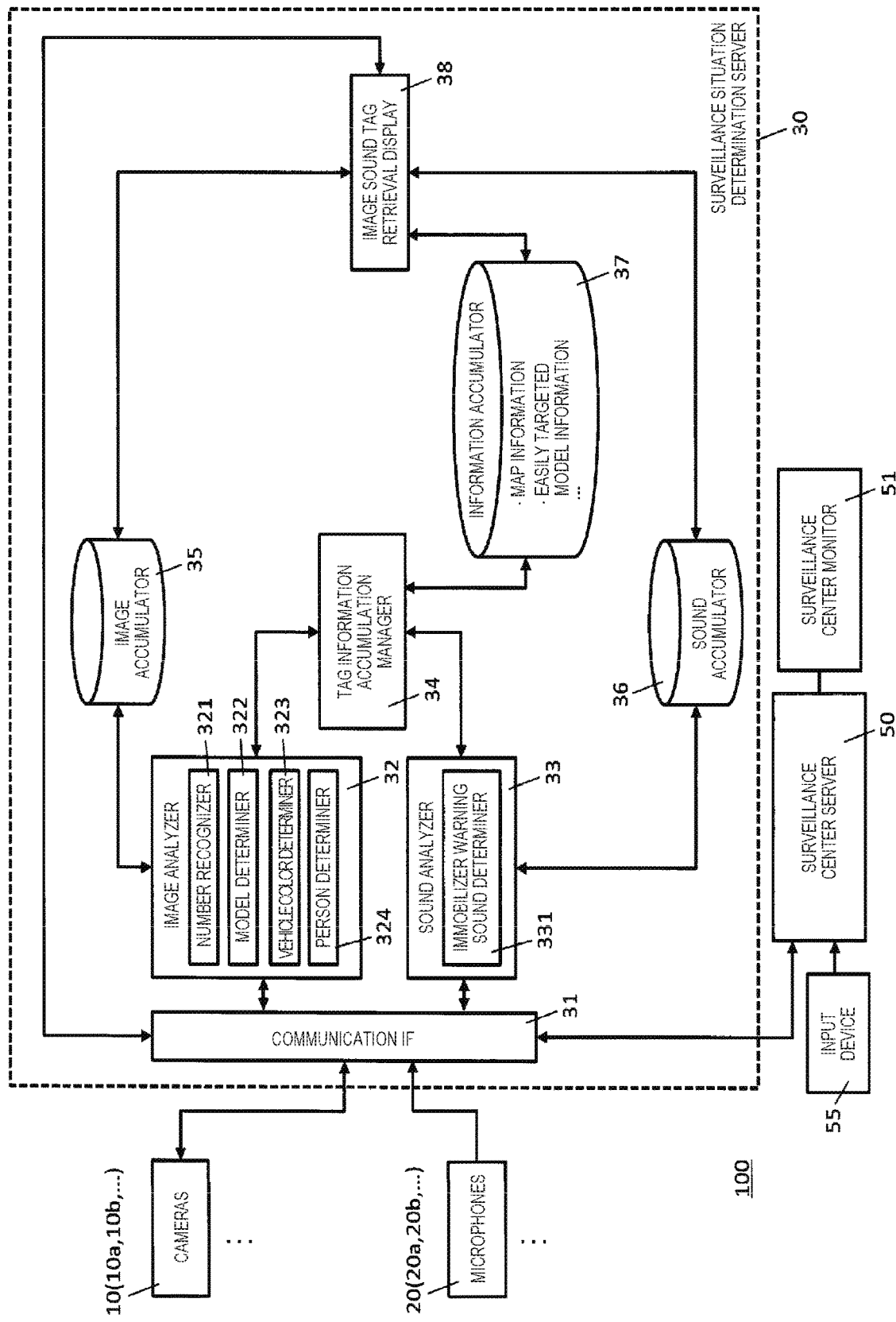
FIG. 2 is a block diagram illustrating the first example of the system configuration of the parking place surveillance system in detail according to Exemplary Embodiment 1.

FIG. 1 is a diagram schematically illustrating an overview of the first example of the system configuration of the parking place surveillance system according to Exemplary Embodiment 1. FIG. 2 is a block diagram illustrating a first example of the system configuration of the parking place surveillance system in detail according to Exemplary Embodiment 1.

Parking place surveillance system 100 is configured to include a plurality of cameras 10a and 10b and a plurality of microphones 20a and 20b installed in parking place PRK, surveillance situation determination server 30, surveillance center server 50, and input device 55. In parking place PRK, a plurality of poles P1 and P2 are erected. For example, camera 10a and microphone 20a are mounted on pole P1 and camera 10b and microphone 20b are mounted on pole P2. Hereinafter, in a case in which it is not necessary to distinguish cameras 10a and 10b from each other, cameras 10a and 10b are written as "cameras 10". Similarly, in a case in which it is not necessary to distinguish microphones 20a and 20b from each other, microphones 20a and 20b are written as "microphones 20".

To facilitate the description in FIG. 1, one camera and one microphone are mounted on one pole, but the number of cameras and the number of microphones mounted on one pole are not limited. To facilitate the description in FIG. 1, two poles are illustrated in the drawing. However, the number of installed poles is not limited to 2. Microphones 20a and 20b may be configured to be contained in cameras 10a and 10b, respectively.

Cameras 10a and 10b, microphones 20a and 20b, and surveillance situation determination server 30 are connected to be able to communicate via network NW1. Network NW1 is a wireless network or a wired network. The wireless network is, for example, a wireless Local Area Network (LAN), a wireless Wide Area Network (WAN), a 3rd generation (3G) mobile communication system, Long Term Evolution (LTE), wireless gigabit (WiGig), or a 5th generation (5G) mobile communication system. The wired network is, for example, an intranet or the Internet.

Surveillance situation determination server 30 and surveillance center server 50 are connected to communicate with each other via network NW2. Network NW2 is a wireless network or a wired network. The wireless network is, for example, a wireless LAN, a wireless WAN, a 3rd generation (3G) mobile communication system, LTE, WiGig, or a 5th generation (5G) mobile communication system. The wired network is, for example, an intranet or the Internet. Networks NW1 and NW2 can be collected to one network.

In parking place PRK, parking space WK (an example of a parking region) in which each of a plurality of vehicles CR1, CR2, CR3, and CR4 can be parked is provided in advance. FIG. 1 illustrates a situation in which a total of four vehicles CR1, CR2, CR3, and CR4 are parked in parking spaces WK, respectively. FIG. 1 illustrates a situation in which suspicious person SDP (for example, a person breaking into a vehicle) who is a malicious third person is attempting to execute a behavior (for example, vehicle break-in) of harming vehicle CR2 which is a parked vehicle.

Here, an immobilizer which is an example of a so-called vehicle security device is mounted on a parked vehicle according to exemplary embodiments including the present exemplary embodiment. When an immobilizer mounted inside each parked vehicle detects a harming behavior (for example, vehicle break-in) on the parked vehicle of the suspicious person SDP, the immobilizer can start outputting a sound which is a given warning sound or blink a light (for example, a headlight or a brake light) of the parked vehicle based on the detection.

Camera 10 is set such that parking place PRK is included as an imaging area within an angle of view of camera 10, and thus images parking place PRK as a subject. Camera 10 acquires a captured image of parking place PRK obtained by imaging parking place PRK and normally or periodically transmits the captured image and identification information of camera 10 to surveillance situation determination server 30 via network NW1. Camera 10 may be a pan, tilt, and zoom (PTZ) camera that has pan, tilt, and zoom functions, may be an omnidirectional camera capable of capturing an omnidirectional image at 360°, or may be a fixed camera capable of capturing an image at a given fixed angle of view. Information regarding camera 10 (for example, installation position information or a type of camera 10) is stored in information accumulator 37 of surveillance situation determination server 30. The installation position information of camera 10 is, for example, latitude, longitude, and height. A subject (that is, an imaging target) of camera 10 is not limited as long as the subject is a parked vehicle in a parking space inside parking place PRK. For example, the subject includes a vehicle parked irrespective of the parking space inside parking place PRK or a vehicle (for example, an unattended parked vehicle) parked in a road adjacent to parking place PRK or a road near parking place PRK. The same applies to various cameras (for example, an omnidirectional camera and a PTZ camera) according to the following exemplary embodiments.

Microphone 20 is set such that a circumference of microphone 20 in parking place PRK is included as a sound reception area and receives sounds in parking place PRK. Microphone 20 acquires tone signals of parking place PRK obtained by receiving sounds and normally or periodically transmits the identification information of microphone 20 and the tone signals to surveillance situation determination server 30 via network NW1. In microphone 20, directivity may be given in advance in a specific direction so that a sound in the specific direction can be emphasized and received or no directivity may be given. Information regarding microphone 20 (for example, installation position information of microphone 20 and information regarding directivity or non-directivity) is stored in information accumulator 37 of surveillance situation determination server 30. The installation position information of microphone 20 is, for example, latitude, longitude, and height.

Surveillance situation determination server 30 which is an example of a server is configured to include communication interface (IF) 31, image analyzer 32, sound analyzer 33, tag information accumulation manager 34, image accumulator 35, sound accumulator 36, information accumulator 37, and image sound tag retrieval display 38. Surveillance situation determination server 30 may be used in an on-premise operation form (that is, introduced and installed in equipment managed by an operator operating parking place surveillance system 100) or may be used in a cloud operation form on a network (that is, introduced and installed in another equipment not managed by the operator operating parking place surveillance system 100). The same applies to the following exemplary embodiments.

Surveillance situation determination server 30 and at least one of the configurations of surveillance situation determination server 30 may be installed in camera 10, microphone 20, or both (that is, camera 10 and microphone 20).

Communication IF 31 performs a process related to an interface of communication among camera 10, microphone 20, and surveillance center server 50.

Image analyzer 32 is configured using, for example, a processor such as a central processing unit (CPU), a micro processing unit (MPU), or a digital signal processor (DSP), performs various kinds of image analysis using a captured image transmitted from camera 10, and stores various image analysis result including the captured image in image accumulator 35. Image analyzer 32 includes number recognizer 321, model determiner 322, vehicle color determiner 323, and person determiner 324. Image analyzer 32 may be installed inside camera 10.

Number analyzer 321 is configured using, for example, a processor such as a CPU, an MPU, or a DSP, recognizes a number plate of a vehicle shown in a captured image using the captured image transmitted from camera 10, reads various numbers displayed on the number plate, and stores a reading result in image accumulator 35.

Model determiner 322 is configured using, for example, a processor such as a CPU, an MPU, or a DSP and determines a model of a vehicle shown in a captured image transmitted from camera 10 through a pattern matching process on the captured image using, for example, a given template image prepared in advance for each model. A method of determining a model of a vehicle by model determiner 322 is not limited to the above-described pattern matching process. Model determiner 322 stores a determination result of the model of the vehicle in image accumulator 35.

Vehicle color determiner 323 is configured using, for example, a processor such as a CPU, an MPU, or a DSP and determines a color of a vehicle shown in a captured image transmitted from camera 10 through a matching process on the captured image using, for example, a given template image prepared in advance for each vehicle color. A method of determining a color of a vehicle by vehicle color determiner 323 is not limited to the above-described matching process. Vehicle color determiner 323 stores a determination result of the color of the vehicle in image accumulator 35.

Person determiner 324 is configured using, for example, a processor such as a CPU, an MPU, or a DSP and determines a person (for example, suspicious person SDP) shown in a captured image through a matching process on a captured image transmitted from camera 10 using, for example, a given person template image prepared in advance. Person determiner 324 stores a determination result of the person in image accumulator 35. The determination result of the person includes, for example, feature information of the person (for example, the entire shape, sex, height, walking style, and face of the person).

Sound analyzer 33 is configured using, for example, a processor such as a CPU, an MPU, or a DSP, performs sound analysis on a tone signal transmitted from microphone 20, and stores a sound analysis result including the tone signal in sound accumulator 36. Sound analyzer 33 includes immobilizer warning sound determiner 331. Sound analyzer 33 may also be installed inside camera 10 or microphone 20.

Immobilizer warning sound determiner 331 is configured using, for example, a processor such as a CPU, an MPU, or a DSP and detects a warning sound started when an immobilizer mounted on a vehicle (for example, vehicle CR2) outputs a sound based on a harming behavior (for example, vehicle break-in) executed by suspicious person SDP using the tone signal transmitted from microphone 20. In other words, when suspicious person SDP breaks in vehicle CR2, the immobilizer detecting the vehicle break-in (for example, damage of glass of vehicle CR2) outputs a given warning sound and the warning sound is detected by immobilizer warning sound determiner 331. Immobilizer warning sound determiner 331 outputs a message indicating the detection of the warning sound and identification information of microphone 20 to tag information accumulation manager 34.

Tag information accumulation manager 34 is configured using, for example, a processor such as a CPU, an MPU, or a DSP and performs tagging of a plurality of pieces of information or data regarding a harming behavior (for example, vehicle break-in) executed on a parked vehicle (vehicle CR2 targeted by suspicious person SDP) in parking place PRK using the image analysis result of image analyzer 32 and the sound analysis result of sound analyzer 33. Tag information accumulation manager 34 records the plurality of pieces of tagged information or data in information accumulator 37. Tag information accumulation manager 34 may also be installed inside camera 10 or microphone 20.

Image accumulator 35 is configured using, for example, a hard disk drive (HDD) or a semiconductor memory such as a flash memory and stores the captured image transmitted from camera 10 or the various image analysis results of image analyzer 32 in association with each other. Image accumulator 35 may also be installed inside camera 10.

Sound accumulator 36 is configured using, for example, an HDD or a semiconductor memory such as a flash memory and stores the tone signal (sound data) transmitted from microphone 20 or the sound analysis result of sound analyzer 33 in association with each other. Sound accumulator 36 may also be installed inside camera 10 or microphone 20.

Information accumulator 37 which is an example of an accumulator is configured using, for example, an HDD or a semiconductor memory such as a flash memory and stores various kinds of information or data. Information accumulator 37 stores, for example, the installation position information (for example, information of latitude, longitude, and height) of each of camera 10 and microphone 20 or easily targeted model information. The easily targeted model information indicates, for example, a model of a parked vehicle of which an occurrence frequency of a harming behavior (for example, vehicle break-in) is statistically high.

Image sound tag retrieval display 38 is configured using, for example, a processor such as a CPU, an MPU, or a DSP, acquires the tagged information or data corresponding to a request from information accumulator 37, image accumulator 35, and sound accumulator 36 in accordance with the request from surveillance center server 50, and responds to surveillance center server 50.

For example, in a case in which there is a harming behavior (for example, vehicle break-in) on the parked vehicle (for example, vehicle CR2), the tagged information or data includes at least two of information regarding a vehicle harmed due to the harming behavior, and a captured image of the vehicle, and a person (that is, an executing person) executing the harming behavior. The tagged information or data may further include information regarding another vehicle (for example, a vehicle owned by the executing person) on which the person executing the harming behavior gets or a sound spoken by the executing person at the time of the harming behavior.

Surveillance center server 50 which is an example of an external server is configured using, for example, a personal computer (PC) displays the tagged information or data transmitted from surveillance situation determination server 30 on surveillance center monitor 51 in accordance with an input operation by a surveillance staff who is an employee of a surveillance agent (for example, a private surveillance provider or the police) operating parking place surveillance system 100 according to the exemplary embodiment. Surveillance center server 50 may be used in an on-premise operation form (that is, introduced and installed in equipment managed by the surveillance agent operating surveillance center server 50) or may be used in a cloud operation form on a network (that is, introduced and installed in another equipment not managed by the surveillance agent operating surveillance center server 50). The same applies to the following exemplary embodiments.

Surveillance center monitor 51 is configured using, for example, a liquid crystal display (LCD) or an electroluminescence (EL) and displays the tagged information or data delivered from surveillance center server 50. Surveillance center monitor 51 is installed as an external device different from surveillance center server 50, but may be configured to be contained inside surveillance center server 50.

Input device 55 is configured using, for example, a mouse, a keyboard, a touch panel, or a touch pad and outputs a signal in accordance with an input operation of a surveillance staff of a surveillance center to surveillance center server 50.

Next, an operation procedure when the immobilizer in the parked vehicle outputs a warning sound based on a harming behavior (for example, vehicle break-in) in parking place surveillance system 100 according to the exemplary embodiment will be described with reference to FIG. 3.

Figure 3:
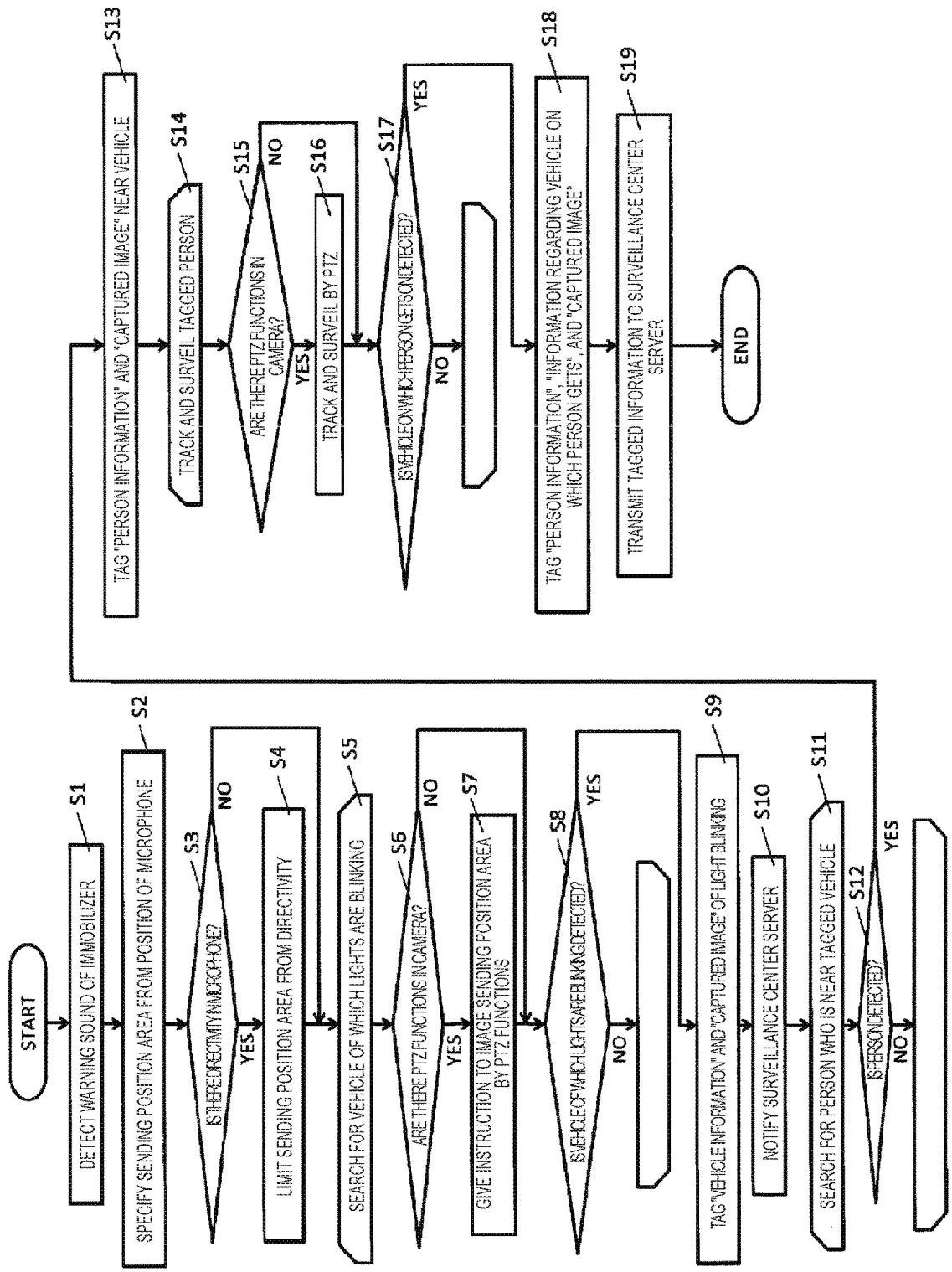
FIG. 3 is a flowchart illustrating an example of an operation procedure in detail at the time of detecting break-in by the parking place surveillance system according to Exemplary Embodiment 1.

FIG. 3 is a flowchart illustrating an example of an operation procedure at the time of detecting break-in by parking place surveillance system 100 according to Exemplary Embodiment 1.

Each process illustrated in FIG. 3 is performed by surveillance situation determination server 30 illustrated in FIG. 2. As the premise of the description in FIG. 3, camera 10 normally or periodically transmits a captured image of parking place PRK to surveillance situation determination server 30, and microphone 20 receives a sound of parking place PRK and normally or periodically transmits a tone signal to surveillance situation determination server 30.

In FIG. 3, immobilizer warning sound determiner 331 detects a warning sound started when the immobilizer mounted on the vehicle (for example, vehicle CR2) outputs a sound based on a harming behavior (for example, vehicle break-in) executed by suspicious person SDP using the tone signal transmitted from microphone 20 (S1). Immobilizer warning sound determiner 331 outputs a message indicating the detection of the warning sound to tag information accumulation manager 34. Thus, tag information accumulation manager 34 can currently recognize that a harming harm (for example, vehicle break-in or vehicle stealing) has been executed or is executing on one of the vehicles parked in parking place PRK by receiving the message from immobilizer warning sound determiner 331.

Tag information accumulation manager 34 specifies an area of a sending position of the warning sound using the installation position information (for example, information of latitude, longitude, and height) of microphone 20 stored in information accumulator 37 (S2). Tag information accumulation manager 34 determines whether the directivity is given to microphone 20 based on information regarding the directivity or non-directivity of microphone 20 stored in information accumulator 37 (S3). In a case in which no directivity is given to microphone 20 (NO in S3), the process of surveillance situation determination server 30 proceeds to step S5.

In a case in which tag information accumulation manager 34 determines that the directivity is determined to be given to microphone 20 (YES in S3), the sending position of the warning sound is specified to a limited extent so that the sending position of the warning sound is further narrowed down than the area specified in step S2 based on information regarding the directivity of microphone 20 (S4).

Tag information accumulation manager 34 performs a process of searching for a vehicle of which a light is blinking using information regarding the area of the sending position of the warning sound specified in step S2 or the sending position of the warning sound specified in step S4 (S5). The process of step S5 is performed to specify a parked vehicle subjected to a harming behavior (for example, vehicle break-in) by focusing on a given setting in which a parked vehicle subjected to a harming behavior (for example, vehicle break-in) is blinking some or all of the lights (for example, a headlight or a brake light) mounted on the parked vehicle and searching for the vehicle of which the lights are blinking.

Specifically, tag information accumulation manager 34 determines whether camera 10 has the pan, tilt, and zoom functions using information regarding camera 10 stored in information accumulator 37 (S6). In a case in which camera 10 is determined to have the pan, tilt, and zoom functions (NO in S6), the process of surveillance situation determination server 30 proceeds to step S8.

Conversely, in a case in which tag information accumulation manager 34 determines that camera 10 has the pan, tilt, and zoom functions (YES in S6), an imaging instruction to cause camera 10 to image the area of the sending position of the warning sound or the narrowed-down sending position of the warning sound using information regarding the area of the sending position of the warning sound specified in step S2 or the sending position of the warning sound specified in step S4 is delivered to image analyzer 32 (S7). Image analyzer 32 transmits the imaging instruction to image the area of the sending position or the narrowed-down sending position of the warning sound to camera 10 via communication IF 31 in accordance with the imaging instruction delivered from tag information accumulation manager 34 (S7).

For example, in a case in which camera 10 has the pan, tilt, and zoom functions, the parked vehicle subjected to the harming behavior (for example, vehicle break-in) is imaged toward an imaging range in accordance with the imaging instruction from image analyzer 32 and a captured image of the parked vehicle is transmitted to surveillance situation determination server 30.

Image analyzer 32 receives the captured image of the parked vehicle transmitted from camera 10 via communication IF 31 and determines whether some or all of the lights of the parked vehicle shown in the captured image are blinking (S8). In a case in which image analyzer 32 determines that some or all of the lights of the parked vehicle are not blinking (NO in S8), image analyzer 32 transmits an imaging instruction to camera 10 until the captured image in which some or all of the lights of the parked vehicle are blinking can be obtained. For example, in the case in which camera 10 has the pan, tilt, and zoom functions, image analyzer 32 generates and transmits an imaging instruction so that an imaging range of camera 10 is changed for imaging. In a case in which camera 10 does not have the pan, tilt, and zoom functions, image analyzer 32 selects another camera 10 capable of imaging the sending position of the warning sound or the area of the sending position and generates and transmits an imaging instruction to the selected camera 10.

Conversely, in a case in which image analyzer 32 determines that some or all of the lights of the parked vehicle are blinking (YES in S8), image analyzer 32 notifies tag information accumulation manager 34 of a message indicating some or all of the lights of the parked vehicle are blinking. In accordance with the notification, tag information accumulation manager 34 acquires information regarding the parked vehicle (in other words, the vehicle subjected to the harming behavior (for example, vehicle break-in)) of which the lights are blinking and a captured image (for example, the captured image captured in step S8) of the parked vehicle from image accumulator 35. Tag information accumulation manager 34 tags the various kinds of pieces of information or data (that is, the information regarding the parked vehicle of which the lights are blinking and the captured image of the parked vehicle) and records the various kinds of pieces of information or data in information accumulator 37 (S9). Tag information accumulation manager 34 grants tagging identification number at the time of the tagging of step S9 and records the tagging identification number in information accumulator 37.

The information regarding the parked vehicle of which the lights are blinking includes some of all of a vehicle number (number) displayed on a number plate of the parked vehicle, a model, a vehicle color, position information (for example, coordinates of the parked vehicle) in the captured image of the parked vehicle, and position information (for example, information of latitude, longitude, and height) of the parked vehicle. The captured image of the parked vehicle includes some or all of the captured image, time information (for example, time information at the time of detecting the blinking of the lights), identification information of camera 10 imaging the parked vehicle, the positions of captured images that form a video of camera 10 imaging the parked vehicle, and a number of the above-described video.

In step S9, tag information accumulation manager 34 may also tag and record immobilizer warning sound output information in information accumulator 37. The immobilizer warning sound output information includes some or all of, for example, time information at which a warning sound output from the immobilizer is detected by sound analyzer 33, the identification information of microphone 20 receiving the warning sound, a kind of warning sound, information indicating content of the warning sound, and a source position (for example, information of latitude, longitude, and height) of the warning sound. The same applies below.

Tag information accumulation manager 34 notifies (transmits) surveillance center server 50 of a message indicating that the information regarding the parked vehicle of which the lights are blinking and the captured image of the parked vehicle are tagged and recorded in information accumulator 37 via communication IF 31 (S10). The message preferably includes the tagging identification number granted at the time of the tagging in step S9, for example, so that a surveillance staff using surveillance center server 50 can have a query.

Tag information accumulation manager 34 performs a process of searching for a person (for example, a suspicious person) who is near the parked vehicle tagged in step S9 (S11). The process of step S11 is performed to tag information regarding the person executing the harming behavior along with the information regarding the parked vehicle damaged by the harming behavior and the captured image of the parked vehicle in order to easily specify the person actually executing the harming behavior (for example, vehicle break-in) (that is, the executing person).

Specifically, tag information accumulation manager 34 delivers an imaging instruction to cause camera 10 to image the position of the tagged parked vehicle using the information regarding the position of the tagged parked vehicle to image analyzer 32 in order to determine whether the person is near the position of the tagged parked vehicle using the information regarding camera 10 stored in information accumulator 37. Image analyzer 32 transmits an imaging instruction to image the position of the tagged parked vehicle to camera 10 via communication IF 31 in accordance with the imaging instruction delivered from tag information accumulation manager 34.

Camera 10 images the position of the tagged parked vehicle in accordance with the imaging instruction from image analyzer 32 and transmits the captured image of the position of the parked vehicle (that is, the captured image of the occurrence position of the harming behavior) to surveillance situation determination server 30.

Image analyzer 32 receives the captured image of the position of the parked vehicle transmitted from camera 10 via communication IF 31 and determines whether there is a person shown in the captured image (S12). In a case in which image analyzer 32 determines that there is no person shown in the captured image, image analyzer 32 (NO in S12), image analyzer 32 transmits the imaging instruction to camera 10 until a captured image in which there is the person shown in the captured image can be obtained.

Conversely, in a case in which image analyzer 32 determines that there is the person shown in the captured image (YES in S12), image analyzer 32 notifies tag information accumulation manager 34 of a message indicating that the person is detected near the tagged parked vehicle. In accordance with the notification, tag information accumulation manager 34 acquires the information regarding the person detected near the tagged parked vehicle and the captured image of the parked vehicle (for example, the captured image captured in step S11) from image accumulator 35. Tag information accumulation manager 34 tags the various pieces of information or data (that is, the information regarding the person detected near the tagged parked vehicle and the captured image of the parked vehicle) and records the various pieces of information or data in information accumulator 37 (S13). At the time of the tagging in step S13, tag information accumulation manager 34 similarly grants the tagging identification number granted at the time of tagging in step S9 and records the tagging identification number in information accumulator 37.

The information regarding the person detected near the tagged parked vehicle includes some or all of, for example, feature information of the person (for example, the entire shape, sex, rough height, walking style, face, cloth color, and hair color of the person), positional information (for example, coordinates of the person) in the captured image of the person, and positional information (for example, information of latitude, longitude, and height) of the person. The captured image of the parked vehicle includes some or all of the captured image, the positions of captured images that form a video of camera 10 imaging the person, and a number of the above-described video.

In step S13, tag information accumulation manager 34 may record the immobilizer warning sound output information together in information accumulator 37, as in step S9.

Subsequently, tag information accumulation manager 34 performs a process of tracking and surveilling the person tagged in step S13 (S14). The process of step S14 is performed to tag information obtained by tacking a movement of the executing person together in order to easily specify a movement route of the person (that is, the executing person) executing the harming behavior (for example, vehicle break-in).

Specifically, tag information accumulation manager 34 determines whether there are the pan, tilt, and zoom functions in camera 10 using the information regarding camera 10 stored in information accumulator 37 (S15). In a case in which tag information accumulation manager 34 determines that there are no pan, tilt, and zoom functions in camera 10 (NO in S15), the process of surveillance situation determination server 30 proceeds to step S17.

Conversely, in a case in which tag information accumulation manager 34 determines that there are the pan, tilt, and zoom functions in camera 10 (YES in S15), tag information accumulation manager 34 delivers an imaging instruction to cause camera 10 to image the position of the tagged person to image analyzer 32 using the information regarding the tagged person in order to track the movement route of the tagged person. Image analyzer 32 transmits the imaging instruction to image the position of the tagged person to camera 10 via communication IF 31 in accordance with the imaging instruction delivered from tag information accumulation manager 34.

Camera 10 images the position of the tagged person while tracking the position of the tagged person using the pan, tilt, and zoom functions in accordance with the imaging instruction from image analyzer 32 and transmits a captured image of the position of the person (that is, the captured image of the position of the person who is being tracked) to surveillance situation determination server 30.

Image analyzer 32 receives the captured image transmitted from camera 10 which is the captured image of the position of the person which is being tracked, via communication IF 31 and tracks and surveils the movement route of the person (S16). Image analyzer 32 tracks the movement route of the tracking target person, for example, using still images or moving images chronologically before and after the still image or the moving image in which the tracking target person is imaged. Image analyzer 32 detects whether the person gets on the vehicle (for example, vehicle CR1 on which the person has gotten to come to parking place PRK) (S17). Image analyzer 32 determines whether the tracking target person gets on the vehicle (for example, the above-described vehicle CR1), for example, using still images or moving images chronologically before and after the still image or the moving image in which the tracking target person is imaged and still images or moving images chronologically before and after the still image or the moving image in which the vehicle (for example, the above-described vehicle CR1) is imaged. Image analyzer 32 transmits an imaging instruction to camera 10 until a captured image in which the person gets on the vehicle can be obtained.

Conversely, in a case in which image analyzer 32 detects that the person gets on the vehicle (YES in S17), the process of step S14 ends and tag information accumulation manager 34 is notified of a message indicating that it is detected that the person gets on the vehicle. In accordance with the notification, tag information accumulation manager 34 acquires the information regarding the person tagged in step S13, the information regarding the vehicle on which the person gets, and the captured image of the vehicle (for example, the captured image captured in the process of step S14) from image accumulator 35. Tag information accumulation manager 34 tags the various pieces of information or data (that is, the information regarding the person tagged in step S13, the information regarding the vehicle on which the person gets, and the captured image of the vehicle) and records the various pieces of information or data in information accumulator 37 (S18). At the time of the tagging in step S18, tag information accumulation manager 34 similarly grants the tagging identification number granted at the time of tagging in steps S9 and S13 and records the tagging identification number in information accumulator 37.

Tag information accumulation manager 34 transmits the information or data tagged in step S18 (that is, the information regarding the person tagged in step S13, the information regarding the vehicle on which the person gets on, and the captured image of the vehicle) to surveillance center server 50 via communication IF 31 (S19). Tag information accumulation manager 34 may transmit a control signal for sound output of an alarm (that is, warning indication) to surveillance center server 50 via communication IF 31 in step S19. Thus, surveillance center server 50 can output a given sound of the alarm (that is, warning indication) in accordance with the control signal transmitted from surveillance situation determination server 30 in step S19 so that an attention of the surveillance staff can be attracted.

Although not illustrated in FIG. 3, surveillance center server 50 may query retrieval of the information or data tagged in association with the tagging identification number to surveillance situation determination server 30, for example, using the tagging identification number granted in step S9 and S13 or S18 in accordance with an operation on input device 55 after the surveillance staff confirms the notification of step S19 or the above-described given sound of the alarm.

Image sound tag retrieval display 38 extracts the information or the data tagged in association with the tagging identification number from image accumulator 35, sound accumulator 36, and information accumulator 37 based on the tagging identification number included in the query transmitted from surveillance center server 50. Image sound tag retrieval display 38 transmits information or data of an extracted result to surveillance center server 50 via communication IF 31. Thus, the surveillance staff can unitarily retrieve and acquire various pieces of information or data tagged through the tagging identification number. Therefore, even in a case in which a certain harming behavior is executed in parking place PRK, detailed information including a position, a cause, or the like of the harming behavior can be grasped early and quickly, and thus the surveillance work can be efficient.

As described above, in parking place surveillance system 100 according to the exemplary embodiment, the plurality camera and the plurality of microphones installed in parking place PRK (an example of a surveillance area) are connected to be able to communicate with surveillance situation determination server 30. Camera 10 transmits a captured image of parking place PRK to surveillance situation determination server 30. Microphone 20 receives a sound of parking place PRK and transmits the sound to surveillance situation determination server 30. Surveillance situation determination server 30 detects a warning sound starting based on a harming behavior (for example, vehicle break-in) on a vehicle in parking place PRK and arriving from the immobilizer mounted inside a vehicle using a tone signal of parking place PRK transmitted from microphone 20. Surveillance situation determination server 30 determines an occurrence position or an area of the harming behavior based on the detection of the warning sound, acquires a captured image of the determined occurrence position or the area, determines the vehicle on which the harming behavior is executed using the captured image of the determined occurrence position or the area, and acquires information regarding the determined vehicle. Surveillance situation determination server 30 records the information regarding the vehicle and the captured image of the occurrence position in association with each other (that is, tagging) in information accumulator 37.

Thus, in parking place surveillance system 100, in a case in which there is a behavior (for example, vehicle break-in by suspicious person SDP) of harming a parked vehicle in parking place PRK, detailed information including the position of the harmed vehicle or a scene of an incident can be early collected and the information or data can be associated by the tagging. Therefore, it is possible to accurately guarantee an improvement in efficiency with which a surveillance staff who is an employee of a surveillance agent early grasps the details of the incident.

Surveillance situation determination server 30 notifies surveillance center server 50 that the information regarding the harmed vehicle and the captured image of the occurrence position are recorded in association with each other (by the tagging) in information accumulator 37. Thus, in a case in which there is a behavior (for example, vehicle break-in by suspicious person SDP) of harming a parked vehicle in parking place PRK, the surveillance staff can early grasp that the information regarding the harmed vehicle and the captured image of the occurrence position are tagged by surveillance situation determination server 30, and thus can take accurate early measures.

Surveillance situation determination server 30 detects blinking of a light of the vehicle starting based on the harming behavior using a captured image of parking place PRK transmitted from camera 10 and acquires information regarding the vehicle for which the blinking of the light is detected. Thus, surveillance situation determination server 30 can easily specify the parked vehicle subjected to the harming behavior (for example, vehicle break-in) by searching for the vehicle of which the light is blinking.

Surveillance situation determination server 30 transmits an instruction to image the occurrence position to camera 10. Camera 10 has the pan, tilt, and zoom functions and orients an imaging direction to the occurrence position to image the occurrence position in accordance with the imaging instruction transmitted from surveillance situation determination server 30. Thus, since camera 10 can accurately grasp the imaging range using the pan, tilt, and zoom functions, it is possible to acquire a captured image from which a situation of the harmed vehicle subjected to the harming behavior can be grasped in detail.

Surveillance situation determination server 30 acquires information regarding a person near the occurrence position in accordance with detection of the person and records the information regarding the person further in association with (by tagging) the information regarding the vehicle and the captured image of the occurrence position in information accumulator 37. Thus, surveillance situation determination server 30 can tag the information regarding the person detected near the harmed vehicle (for example, a person executing the harming behavior) in addition to the harmed vehicle subjected to the harming behavior and the captured image. Therefore, it is possible to associate broad information with the incident and support early situation grasping of the incident.

Surveillance situation determination server 30 transmits the information regarding the vehicle subjected to the harming behavior and the captured image of the occurrence position of the harming behavior in association with each other to surveillance center server 50. Thus, in a case in which there is a behavior (for example, vehicle break-in by suspicious person SDP) of harming a parked vehicle in parking place PRK, the surveillance staff can early grasp the information regarding the vehicle subjected to the harming behavior and the captured image of the occurrence position of the harming behavior. Therefore, the details of the incident also including information regarding the vehicle subjected to the incident can be confirmed quickly, and thus can appropriately take early measures.

Surveillance situation determination server 30 transmits the information regarding the vehicle subjected to the harming behavior, the captured image of the occurrence position of the harming behavior, and the information regarding the person (for example, a person executing the harming behavior) detected near the vehicle in association with each other to surveillance center server 50. Thus, in a case in which there is a behavior (for example, vehicle break-in by suspicious person SDP) of harming a parked vehicle in parking place PRK, the surveillance staff can early grasp the information regarding the vehicle subjected to the harming behavior, the captured image of the occurrence position of the harming behavior, and the information regarding the person detected near the vehicle. Therefore, the surveillance staff can quickly confirm the details of the incident that also include information regarding a person who is likely to be an offender of the incident or information regarding a vehicle subjected to the incident, and thus can appropriately take measures.

Next, an operation procedure at the time of setting a priority surveillance target vehicle in parking place surveillance system 100 according to Exemplary Embodiment 1 will be described with reference to FIG. 4. Vehicles which are easy to be stolen are luxury vehicles which are easy to be resold and popular vehicles. In the technology of the related art included in Japanese Patent Unexamined Publication No. 2008-152460 described above, there is a problem that models of vehicles which are easy to be targeted may not be surveilled in priority.

Accordingly, in parking place surveillance system 100, information regarding models of vehicles which are easy to be stolen are maintained, models of vehicles parked in a parking place are determined, and the vehicles are set as priority surveillance target vehicles which are necessary to be surveilled in priority in a case in which the models of the vehicles parked in the parking place match the models of the vehicles which are easy to be targeted.

Figure 4:
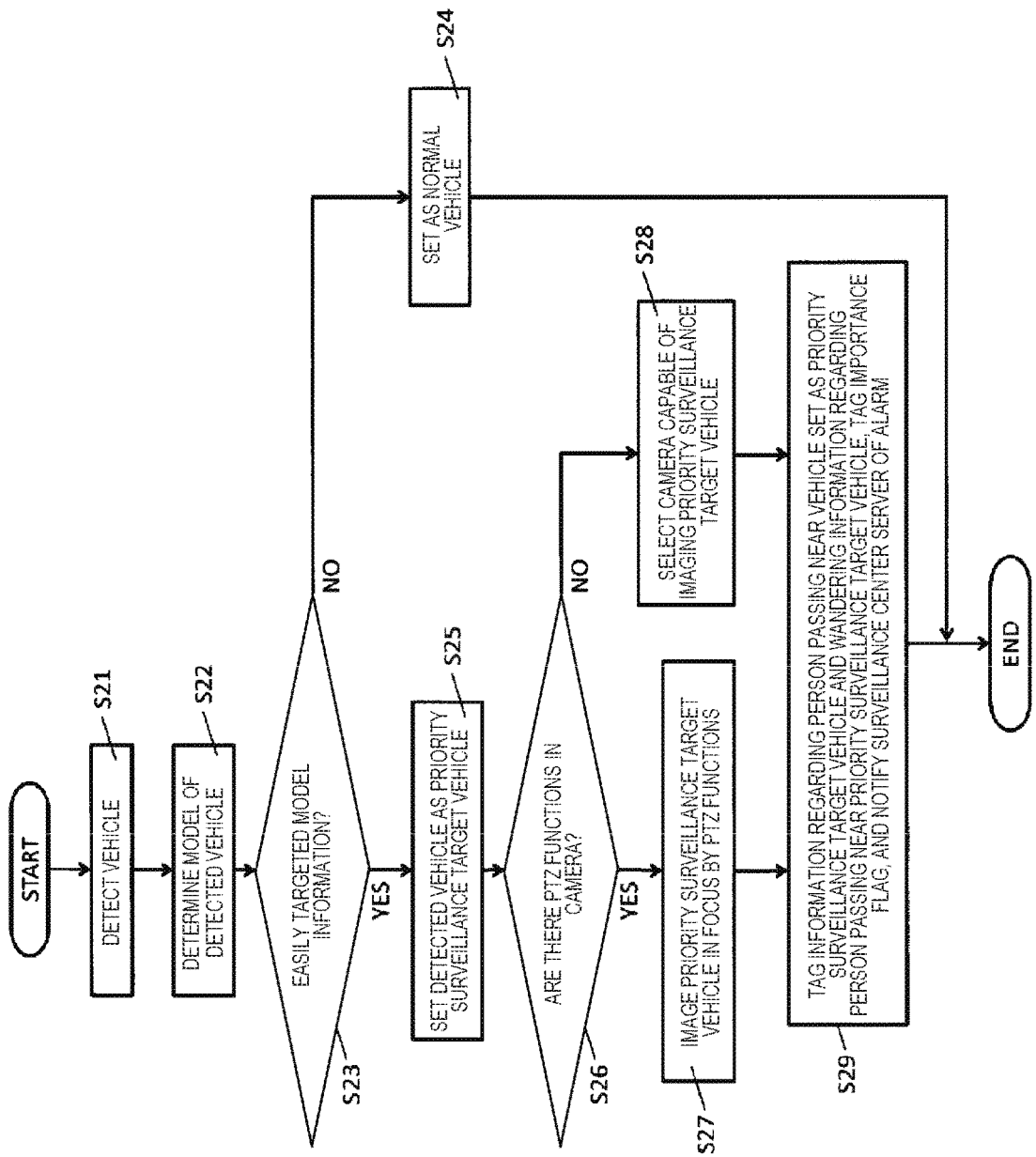
FIG. 4 is a flowchart illustrating an example of an operation procedure at the time of setting a priority surveillance target vehicle by the parking place surveillance system in detail according to Exemplary Embodiment 1.

FIG. 4 is a flowchart illustrating an example of an operation procedure at the time of setting a priority surveillance target vehicle by parking place surveillance system 100 in detail according to Exemplary Embodiment 1.

Each process illustrated in FIG. 4 is performed by surveillance situation determination server 30 illustrated in FIG. 2. Each process of FIG. 4 may be performed earlier than each process of FIG. 3, may be performed in parallel to each process of FIG. 3, or may be performed later than each process of FIG. 3. As the premise of description in FIG. 4, when easily targeted model information transmitted from surveillance center server 50 is received via communication IF 31 through an operation by the surveillance staff using input device 55, image sound tag retrieval display 38 registers and stores the information regarding the models of the vehicles in information accumulator 37. Tag information accumulation manager 34 sets the easily targeted model information in image analyzer 32 (specifically, model determiner 322).

In FIG. 4, when a captured image of parking place PRK transmitted from camera 10 is received via communication IF 31, image analyzer 32 detects the vehicle using the captured image (S21). Model determiner 322 determines the model of the detected vehicle (S22).

Model determiner 322 determines whether the model of the vehicle detected in step S21 is identical to the model of the easily targeted model information set by model determiner 322 (S23). In a case in which model determiner 322 determines that the model of the vehicle detected in step S21 is not identical to the model of the easily targeted model information set by model determiner 322 (NO in S23), model determiner 322 notifies tag information accumulation manager 34 of a message indicating that the model of the vehicle is not identical to the model of the easily targeted model information. Tag information accumulation manager 34 sets the vehicle detected in step S21 as a normal vehicle in accordance with the notification from image analyzer 32 (S24). The normal vehicle is, for example, a general vehicle different from a priority surveillance target vehicle which is necessary to be surveilled in priority in parking place surveillance system 100. After step S24, the process of surveillance situation determination server 30 ends.

Conversely, in a case in which image analyzer 32 determines that the model of the vehicle detected in step S21 is identical to the model of the easily targeted model information set by model determiner 322 (YES in S23), image analyzer 32 notifies tag information accumulation manager 34 of a message indicating that the model of the vehicle is identical to the model of the easily targeted model information. Tag information accumulation manager 34 sets the vehicle detected in step S21 as a priority surveillance target vehicle in accordance with the notification from image analyzer 32 (S25).

Tag information accumulation manager 34 determines whether there are the pan, tilt, and zoom functions in camera 10 imaging the vehicle set as the priority surveillance target vehicle in step S21 using information regarding camera 10 stored in information accumulator 37 (S26).

In a case in which tag information accumulation manager 34 determines that there are the pan, tilt, and zoom functions in camera 10 (YES in S26), tag information accumulation manager 34 delivers an imaging instruction to imaging the vehicle set as the priority surveillance target vehicle in focus using the pan, the tilt, and zoom functions to image analyzer 32 (S27).

Conversely, in a case in which tag information accumulation manager 34 determines that there are no pan, tilt, and zoom functions in camera 10 (NO in S26), tag information accumulation manager 34 selects camera 10 capable of imaging the vehicle set as the priority surveillance target vehicle (S28) and delivers an imaging instruction to cause camera 10 to perform imaging to image analyzer 32 (S28).

Image analyzer 32 transmits the imaging instruction to image the vehicle set as the priority surveillance target vehicle in focus to one of camera 10 that has the pan, tilt, and zoom functions and camera 10 set in step S28 via communication IF 31 in accordance with the imaging instruction delivered from tag information accumulation manager 34 (S27 and S28).

Camera 10 orients toward an imaging range using the pan, tilt, and zoom functions to image the vehicle set as the priority surveillance target vehicle in accordance with the imaging instruction from surveillance situation determination server 30 and transmits a captured image of the vehicle set as the priority surveillance target vehicle to surveillance situation determination server 30.

Image analyzer 32 receives the captured image of the vehicle set as the priority surveillance target vehicle transmitted from camera 10 via communication IF 31, detects a person passing near the vehicle set as the priority surveillance target vehicle using the captured image, and acquires information regarding the detected person (S29). In a case in which image analyzer 32 detects a situation in which the detected person comes and goes near the vehicle set as the priority surveillance target vehicle (for example, a wandering situation), image analyzer 32 generates wandering information regarding the detected person. Image analyzer 32 delivers the information regarding the person detected near the vehicle set as the priority surveillance target vehicle and the wandering information regarding the person to tag information accumulation manager 34. Tag information accumulation manager 34 tags the information regarding the person and the wandering information regarding the person delivered from image analyzer 32 and records the information regarding the person and the wandering information regarding the person in information accumulator 37 (S29). Tag information accumulation manager 34 grants the tagging identification number at the time of tagging in step S28 and records the tagging identification number in information accumulator 37.

Tag information accumulation manager 34 notifies (transmits) surveillance center server 50 of a message indicating that the information regarding the person detected near the vehicle set as the priority surveillance target vehicle and the wandering information regarding the person are tagged and recorded in information accumulator 37 via communication IF 31 (S29). The message preferably includes the tagging identification number granted at the time of tagging in step S28 so that the surveillance staff using surveillance center server 50 queries. Tag information accumulation manager 34 may transmit a control signal for sound output of an alarm (that is, warning indication) to surveillance center server 50 via communication IF 31. Thus, surveillance center server 50 can output a given sound of the alarm (that is, warning indication) in accordance with the control signal transmitted from surveillance situation determination server 30 in step S28 so that an attention of the surveillance staff can be attracted.

In this way, surveillance situation determination server 30 maintains information regarding a model of a parked vehicle of which an occurrence frequency of the harming behavior is statistically high (that is, the easily targeted model information), determines a model of a vehicle parked in parking place PRK using a captured image in parking place PRK. In a case in which the determined model of the vehicle matches the model of the parked vehicle, surveillance situation determination server 30 sets the determined model of the vehicle as a priority surveillance target vehicle (an example of a surveillance target vehicle) and transmits an instruction to image the priority surveillance target vehicle to camera 10. Camera 10 images the priority surveillance target vehicle in accordance with the imaging instruction transmitted from surveillance situation determination server 30. Thus, in a case in which a vehicle of a statistically easily targeted model (for example, a model of popular vehicle or a model of a vehicle which can be frequently resold) is detected to be parked before a harming behavior is executed by, for example, suspicious person SDP, surveillance situation determination server 30 can acquire a captured image of the vehicle in advance. Therefore, even in a case in which vehicle break-in or stealing occurs on the vehicle set as the priority surveillance target vehicle, the vehicle break-in or stealing can be found early.

Surveillance situation determination server 30 acquires information regarding a person coming and going near the priority surveillance target vehicle using a captured image of the priority surveillance target vehicle (an example of the surveillance target vehicle) and records the information regarding the priority surveillance target vehicle and the information regarding the person coming and going in association with each other (tagging) in information accumulator 37. Thus, surveillance situation determination server 30 can record the fact that a suspicious person (for example, suspicious person SDP) hanging around near the priority surveillance target vehicle as information. Thus, for example, even in a case in which vehicle break-in or stealing actually occurs on the priority surveillance target vehicle, it is possible to grasp the details of the person quickly using the information regarding the person associated with the information regarding the priority surveillance target vehicle.

Surveillance situation determination server 30 notifies surveillance center server 50 that the information regarding the priority surveillance target vehicle (an example of the surveillance target vehicle) and the information regarding the person coming and going near the vehicle set as the priority surveillance target vehicle is recorded in association with each other (tagging) in information accumulator 37. Thus, since the surveillance staff can early grasp that the suspicious person is detected near the vehicle set as the priority surveillance target vehicle, it is possible to take appropriate measures based on this fact.

Next, a second example of the system configuration of the parking place surveillance system according to Exemplary Embodiment 1 will be described.

Figure 5:
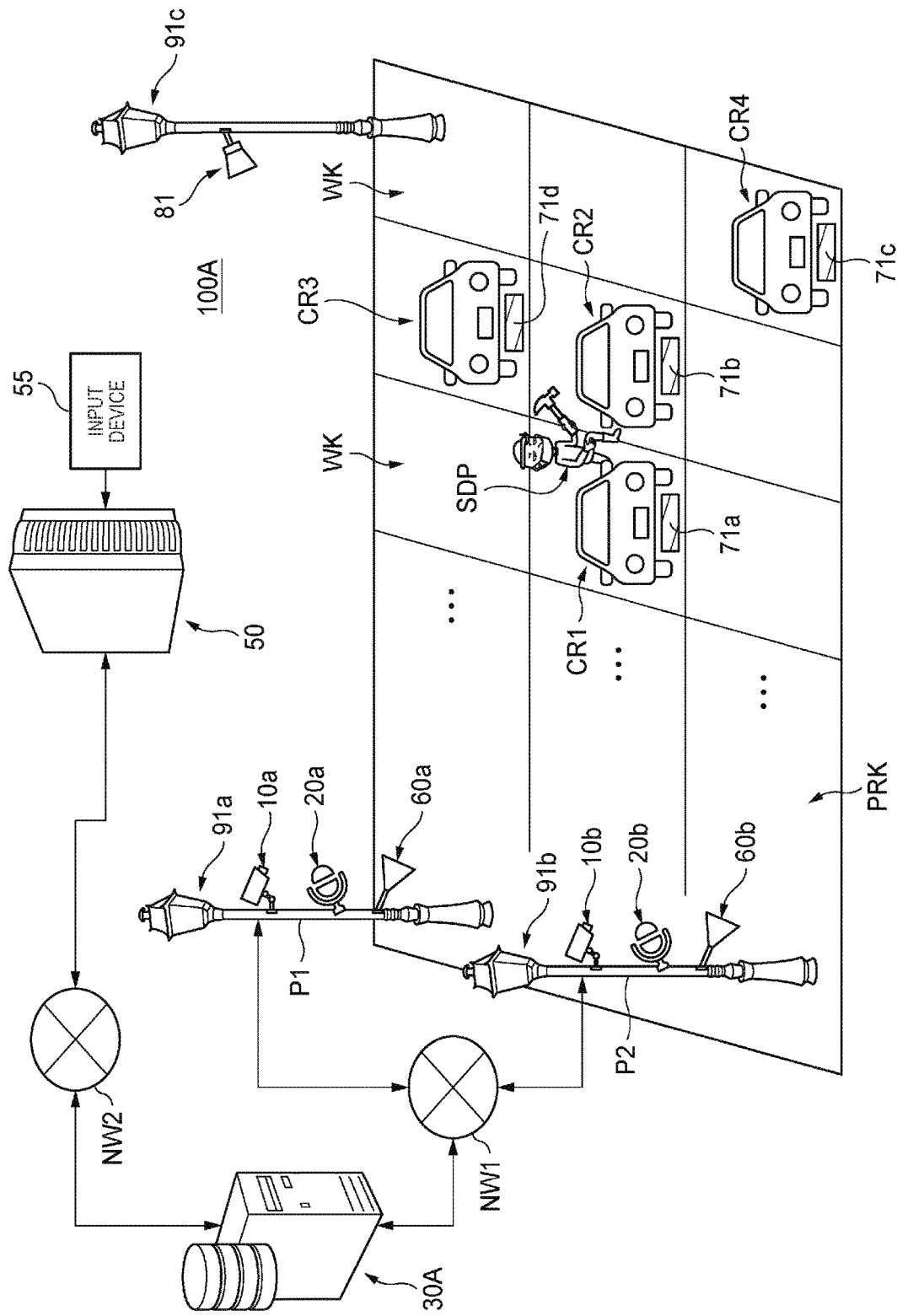
FIG. 5 is a diagram schematically illustrating a second example of a system configuration of a parking place surveillance system according to Exemplary Embodiment 1.
Figure 6:
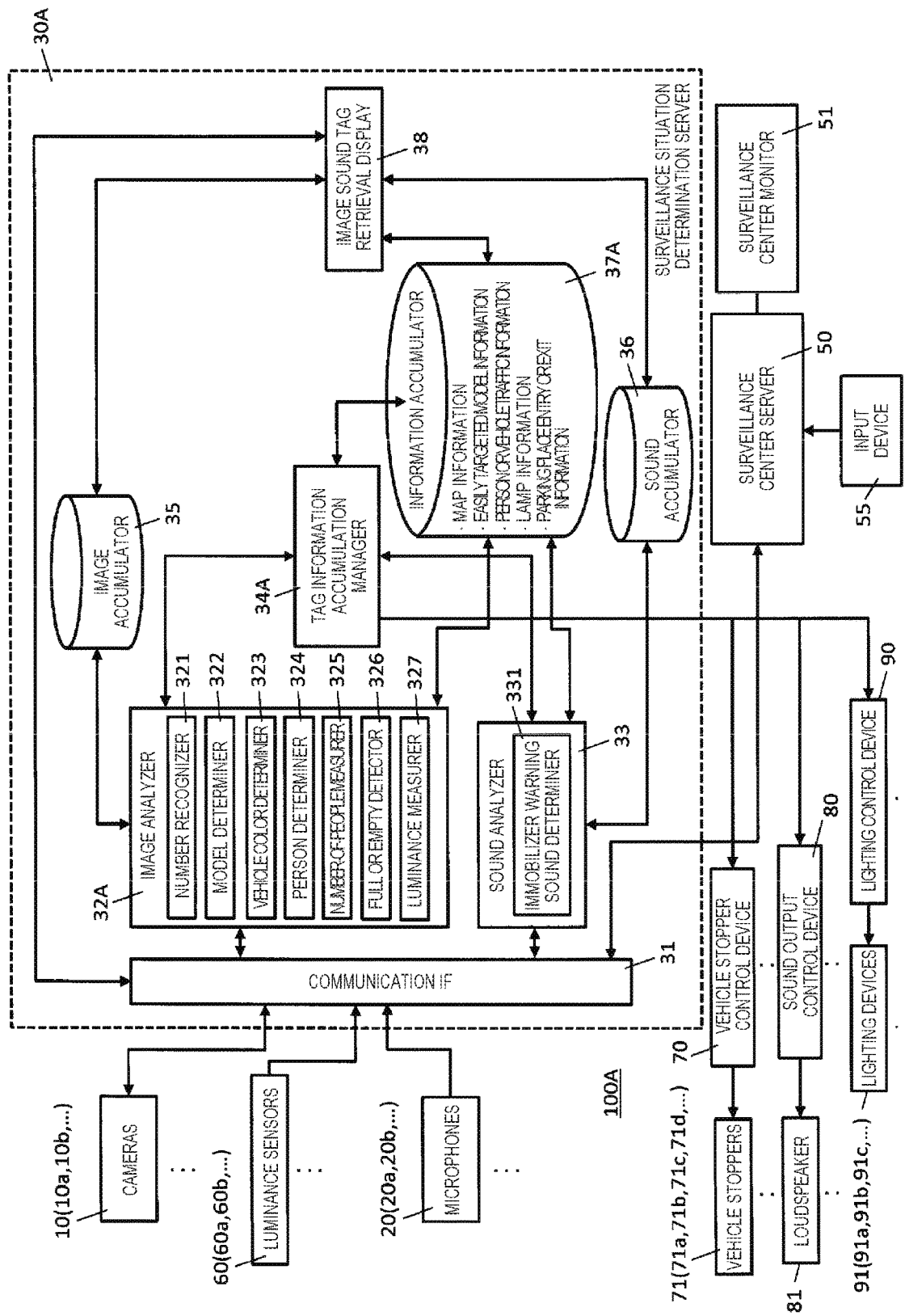
FIG. 6 is a block diagram illustrating a second example of the system configuration of the parking place surveillance system in detail according to Exemplary Embodiment 1.

FIG. 5 is a diagram schematically illustrating a second example of a system configuration of a parking place surveillance system according to Exemplary Embodiment 1. FIG. 6 is a block diagram illustrating a second example of the system configuration of the parking place surveillance system in detail according to Exemplary Embodiment 1.

In description of FIGS. 5 and 6, the same reference numerals are given to the same configurations as the configurations described in FIGS. 1 and 2 and the description thereof will be simplified or omitted.

Parking place surveillance system 100A is configured to include a plurality of cameras 10a and 10b, a plurality of microphones 20a and 20b, and a plurality of luminance sensors 60a and 60b installed in parking place PRK, surveillance situation determination server 30A, surveillance center server 50, and input device 55. In parking place PRK, a plurality of poles P1, P2, and P3 are erected. For example, camera 10a, microphone 20a, luminance sensor 60a, and lighting device 91a are mounted on pole P1, camera 10b, microphone 20b, luminance sensor 60b, and lighting device 91b are mounted on pole P2, and loudspeaker 81 and lighting device 91c are mounted on pole P3. Hereinafter, in a case in which it is not necessary to distinguish luminance sensors 60a and 60b from each other, luminance sensors 60a and 60b are collectively written as "luminance sensors 60". Similarly, in a case in which it is not necessary to distinguish lighting devices 91a, 91b, and 91c from each other, lighting devices 91a, 91b, and 91c are collectively written as "lighting devices 91".

To facilitate the description in FIG. 5, one camera, one luminance sensor, one microphone, and one light device are mounted on one pole, but the numbers of cameras, microphone, luminance sensors, light devices mounted on one pole are not limited. To facilitate the description in FIG. 5, three poles are illustrated, but the number of installed poles is not limited to 3. Microphones 20a and 20b and luminance sensors 60a and 60b may be configured to be included in cameras 10a and 10b, respectively.

In parking spaces WK of parking place PRK, for example, vehicle stoppers (for example, vehicle stoppers 71a, 71b, 71c, and 71d) with flap plates are disposed from the ground. Hereinafter, in a case in which it is not necessary to distinguish vehicle stoppers 71a, 71b, 71c, and 71d from each other, vehicle stoppers 71a, 71b, 71c, and 71d are collectively referred to as "vehicle stoppers 71". Since a total of four vehicles CR1, CR2, CR3, and CR4 are parked in FIG. 5, four vehicle stoppers 71a, 71b, 71c, and 71d are operated to stop vehicles CR1, CR2, CR3, and CR4 so that vehicles CR1, CR2, CR3, and CR4 do not easily go out.

Luminance sensor 60 measures luminance (that is, brightness) around the pole of parking place PRK in which luminance sensor 60 is mounted and normally or periodically transmits identification information of luminance sensor 60 and a measurement result to surveillance situation determination server 30A via network NW1. Information (for example, identification information) regarding luminance sensor 60 is stored in information accumulator 37A of surveillance situation determination server 30A.

Surveillance situation determination server 30A which is an example of a server is configured to include a communication IF 31, image analyzer 32A, sound analyzer 33, tag information accumulation manager 34A, image accumulator 35, sound accumulator 36, information accumulator 37A, and image sound tag retrieval display 38.

Image analyzer 32A is configured using, for example, a processor such as a CPU, an MPU, or a DSP, performs various kinds of image analysis using a captured image transmitted from camera 10 and the luminance measurement result transmitted from luminance sensor 60, and stores various image analysis result including the captured image in image accumulator 35. Image analyzer 32A includes number recognizer 321, model determiner 322, vehicle color determiner 323, person determiner 324, number-of-people measurer 325, full or empty detector 326, and luminance measurer 327. Image analyzer 32A may be installed inside camera 10.

Number-of-people measurer 325 is configured using, for example, a processor such as a CPU, an MPU, or a DSP and measures (counts) the number of people shown in a captured image at each predetermined time using the captured image transmitted from camera 10. Number-of-people measurer 325 nay measure (count) the number of people shown in the captured image using the determination result of person determiner 324. Number-of-people measurer 325 stores a measurement result of the number of people shown in the captured image as person or vehicle traffic information in information accumulator 37A.

Full or empty detector 326 is configured using, for example, a processor such as a CPU, an MPU, or a DSP and detects whether a vehicle is parked or not in each parking space WK (that is, a full or empty state in each parking space WK) shown in a captured image using the captured image transmitted from camera 10. Full or empty detector 326 stores a detection result of the full or empty state in each parking space WK as person or vehicle traffic information and parking place entry or exit information in information accumulator 37A.

Luminance measurer 327 is configured using, for example, a processor such as a CPU, an MPU, or a DSP and measures lightness (that is, brightness) of light of a lamp (for example, a lamp on the top of each of poles P1, P2, and P3) in parking place PRK every hour using a captured image transmitted from camera 10 and the luminance measurement result transmitted from luminance sensor 60. Luminance measurer 327 stores a lightness measurement result of light of the lamp (for example, the lamp on the top of each of poles P1, P2, and P3) in parking place PRK as lamp information in information accumulator 37A.

Tag information accumulation manager 34A is configured using, for example, a processor such as a CPU, an MPU, or a DSP and performs tagging of a plurality of pieces of information or data regarding a harming behavior (for example, vehicle break-in) executed on a parked vehicle (for example, vehicle CR2 targeted by suspicious person SDP) in parking place PRK using the image analysis result of image analyzer 32A and the sound analysis result of sound analyzer 33. Tag information accumulation manager 34A records the plurality of pieces of tagged information or data in information accumulator 37A. Tag information accumulation manager 34A may also be installed inside camera 10 or microphone 20.

Information accumulator 37A which is an example of an accumulator is configured using, for example, an HDD or a semiconductor memory such as a flash memory and stores various kinds of information or data. Information accumulator 37A stores, for example, the installation position information (for example, information of latitude, longitude, and height) of each of camera 10 and microphone 20 or easily targeted model information. Information accumulator 37A further stores the person or vehicle traffic information, the lamp information, and the parking place entry or exit information. The person or vehicle traffic information indicates a measurement result of the number of people coming and going in parking place PRK or information regarding the number of vehicles going in and out parking place PRK and is generated based on, for example, the measurement result of number-of-people measurer 325. The lamp information indicates lightness (that is, brightness) of light of the lamp (for example, the lamp on the top of each of poles P1, P2, and P3) in parking place PRK and is generated based on, for example, the measurement result of luminance measurer 327. The parking place entry or exit information indicates information regarding entry of vehicles to parking place PRK or information regarding exit of vehicles from parking place PRK and is generated based on, for example, the measurement result of number-of-people measurer 325 and the detection result of full or empty detector 326.

Vehicle stopper control device 70 controls operation or non-operation of the vehicle stopper in accordance with whether there is a control signal output from tag information accumulation manager 34.

Vehicle stopper 71 includes a flap plate and is disposed to correspond to each parking space WK of parking place PRK. In a case in which a vehicle is parked in parking space WK corresponding to vehicle stopper 71, vehicle stopper 71 is operated in accordance with a control signal from vehicle stopper control device 70 and fixes a parking state so that, for example, the vehicle does not easily go out.

Sound output control device 80 controls whether a given warning sound is output from loudspeaker 81 in accordance with there is a control signal output from tag information accumulation manager 34.

Loudspeaker 81 is mounted on, for example, pole P3 and outputs a sound signal of the given warning sound transmitted from sound output control device 80.

Lighting control device 90 controls lighting device 91 such that lighting device 91 is turned on, blinks, and is turned off in accordance with there is a control signal output from tag information accumulation manager 34.

Lighting device 91 is installed, for example, on the top of each pole in parking place PRK and is turned on, blinks, or is turned off in accordance with the control signal from lighting control device 90.

Next, an operation procedure at the time of setting a priority surveillance target vehicle in parking place surveillance system 100A according to the exemplary embodiment will be described with reference to FIG. 7. Harming behaviors (for example, vehicle break-in) on vehicles occur many times at locations or times at which the number of people or vehicles in the parking place are small or locations or times at which light of the lamps is dark. In the technology of the related art included in Japanese Patent Unexamined Publication No. 2008-152460 described above, there is a problem that vehicles at locations or times at which such harming behaviors occur may not be surveilled in priority.

Accordingly, in parking place surveillance system 100A, information regarding locations or times at which stealing or the like easily occur is maintained and vehicles at the locations or times at which stealing or the like easily occur in the parking place are set as priority surveillance target vehicles which are necessary to be surveilled in priority.

Figure 7:
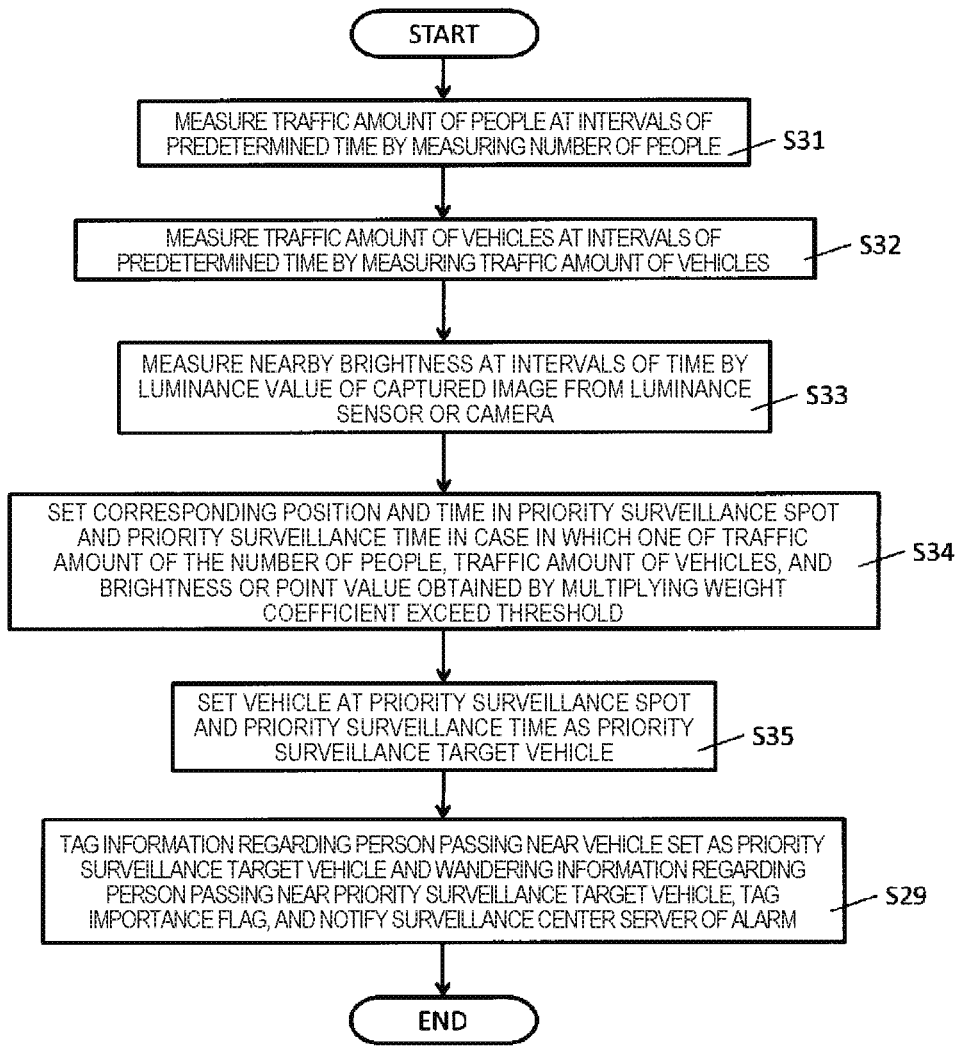
FIG. 7 is a flowchart illustrating an example of an operation procedure in detail at the time of setting a priority surveillance target vehicle by the parking place surveillance system according to Exemplary Embodiment 1.

FIG. 7 is a flowchart illustrating an example of an operation procedure in detail at the time of setting a priority surveillance target vehicle by parking place surveillance system 100A according to Exemplary Embodiment 1.

Each process illustrated in FIG. 7 is performed by surveillance situation determination server 30A illustrated in FIG. 6. Each process of FIG. 7 may be performed earlier than each process of FIG. 3, may be performed in parallel to each process of FIG. 3, or may be performed later than each process of FIG. 3. As the premise of description in FIG. 7, when various thresholds transmitted from surveillance center server 50 are received via communication IF 31 through an operation by the surveillance staff using input device 55, image sound tag retrieval display 38 registers and stores the various thresholds in information accumulator 37. Tag information accumulation manager 34 sets the various thresholds in image analyzer 32A (specifically, number-of-people measurer 325, full or empty detector 326, and luminance measurer 327). The various thresholds mentioned here are, for example, thresholds indicating locations or periods of time at which an occurrence frequency of a harming behavior such as vehicle break-in or stealing on a parked vehicle is statistically high.

In FIG. 7, when a captured image of parking place PRK transmitted from camera 10 is received via communication IF 31, image analyzer 32A measures (counts) the number of people (that is, a traffic amount of people) shown in the captured image at each predetermined time using the captured image (S31). Image analyzer 32A stores a measurement result of the number of people shown in the captured image in image accumulator 35.

Image analyzer 32A measures (counts) the number of vehicles (that is, a traffic amount of vehicles) shown in the captured image at each predetermined time using the captured image of parking place PRK transmitted from camera 10 (S32). Image analyzer 32A stores a measurement result of the number of vehicles shown in the captured image in image accumulator 35.

Image analyzer 32A measures the lightness (that is, brightness) of light of the lamp (for example, the lamp on the top of each of poles P1, P2, and P3) of parking place PRK at each predetermined time using the captured image transmitted from camera 10 or the luminance measurement result transmitted from luminance sensor 60 (S33). Image analyzer 32A stores a measurement result of the lightness (that is, brightness) of the light of the lamp (for example, the lamp on the top of each of poles P1, P2, and P3) of parking place PRK at each predetermined time in image accumulator 35.

In a case in which one of a traffic amount of the number of people at each predetermined time, a traffic amount of vehicles at each predetermined time, and brightness at each predetermined time exceed respectively set thresholds, image analyzer 32A sets a corresponding time and position in a priority surveillance time and a priority surveillance spot, respectively, based on times at which the traffic amount of the number of people, the traffic amount of the vehicles, and the brightness exceed the thresholds or the installation position of camera 10 (S34). In a case in which point values obtained by multiplying all of three items, the traffic amount of the number of people at each predetermined time, the traffic amount of vehicles at each predetermined time, and the brightness at each predetermined time, by inherent weight coefficients of the traffic amount of the number of people, the traffic amount of vehicles, and the brightness exceed the above-described thresholds, image analyzer 32A sets a corresponding time and position in a priority surveillance time and a priority surveillance spot, respectively, based on times at which the traffic amount of the number of people, the traffic amount of the vehicles, and the brightness exceed the thresholds or the installation position of camera 10 (S34).

Image analyzer 32A sets a vehicle at the priority surveillance time or the priority surveillance spot installed in step S34 as a priority surveillance target vehicle (S35). The process of step S35 may be performed by tag information accumulation manager 34. After step S35, the process of step S29 illustrated in FIG. 4 is performed.

In this way, surveillance situation determination server 30A maintains information regarding a parking position or a parking time at which an occurrence frequency of a harming behavior is statistically high, sets a vehicle at the parking position or the parking time in parking place PRK as a priority surveillance target vehicle, and transmits an instruction to image the priority surveillance target vehicle to camera 10. Camera 10 images the vehicle set as the priority surveillance target vehicle in accordance with the imaging instruction transmitted from surveillance situation determination server 30A. Thus, in a case in which a vehicle at the parking position or the parking time at which the vehicle is statistically easily targeted is detected to be parked before a harming behavior is executed by, for example, suspicious person SDP, surveillance situation determination server 30A can acquire a captured image of the vehicle in advance. Therefore, even in a case in which vehicle break-in or stealing occurs on the vehicle set as the priority surveillance target vehicle, the vehicle break-in or stealing can be found early.

Surveillance situation determination server 30A acquires information regarding a person coming and going near the priority surveillance target vehicle using a captured image of the priority surveillance target vehicle (an example of the surveillance target vehicle) and records the information regarding the priority surveillance target vehicle and the information regarding the person coming and going in association with each other (tagging) in information accumulator 37A. Thus, surveillance situation determination server 30A can record the fact that a suspicious person (for example, suspicious person SDP) hanging around near the priority surveillance target vehicle as information. Thus, for example, even in a case in which vehicle break-in or stealing actually occurs on the priority surveillance target vehicle, it is possible to grasp the details of the person quickly using the information regarding the person associated with the information regarding the priority surveillance target vehicle.

Surveillance situation determination server 30A notifies surveillance center server 50 that the information regarding the priority surveillance target vehicle (an example of the surveillance target vehicle) and the information regarding the person coming and going near the vehicle set as the priority surveillance target vehicle is recorded in association with each other (tagging) in information accumulator 37A. Thus, since the surveillance staff can early grasp that the suspicious person is detected near the vehicle set as the priority surveillance target vehicle, it is possible to take appropriate measures based on this fact.

Next, an operation procedure at the time of detecting replacement of a number plate in parking place surveillance system 100A according to the exemplary embodiment will be described with reference to FIG. 8. A person stealing a vehicle replaces the number plate of a vehicle parked in a parking place with another number plate and runs away many times so that a runaway destination is not known. In the technology of the related art included in Japanese Patent Unexamined Publication No. 2008-152460 described above, there is a problem that replacement of a number plate by a person stealing a vehicle in a parking place may not be detected.

Accordingly, in parking place surveillance system 100A, a number plate of a vehicle at the time of entry to a parking place is detected, information regarding the number plate is maintained, and the number plate is detected periodically or at the time of exit of the vehicle to acquire information regarding the number plate. In parking place surveillance system 100A, whether a number plate is replaced or not is surveilled by comparing the acquired information regarding the number plate to the information regarding the number plate acquired at the time of entry.

Figure 8:
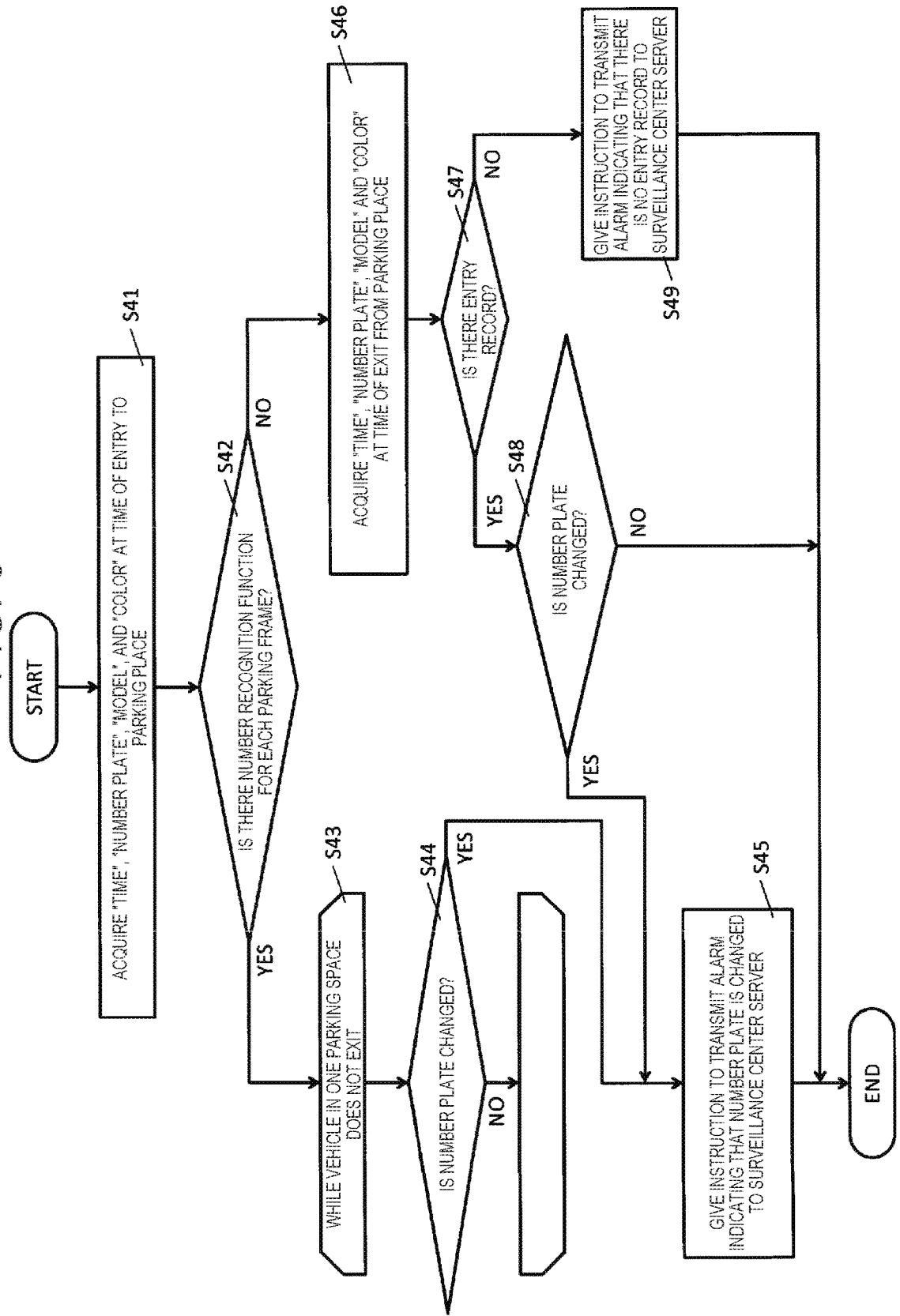
FIG. 8 is a flowchart illustrating an example of an operation procedure in detail at the time of detecting replacement of a number plate in the parking place surveillance system according to Exemplary Embodiment 1.

FIG. 8 is a flowchart illustrating an example of an operation procedure in detail at the time of detecting replacement of a number plate in parking place surveillance system 100A according to Exemplary Embodiment 1.

Each process illustrated in FIG. 8 is performed by surveillance situation determination server 30A illustrated in FIG. 6. Each process of FIG. 8 may be performed earlier than each process of FIG. 3, may be performed in parallel to each process of FIG. 3, or may be performed later than each process of FIG. 3.

In FIG. 8, when entry of a vehicle to parking space WK of parking place PRK is detected, image analyzer 32A determines and acquire an entry time, a number plate, a model, and a color of the vehicle using a captured image transmitted from camera 10 (S41). Image analyzer 32A stores the acquired entry time, number plate, model, and color of the vehicle as parking place entry or exit information in association with each other in information accumulator 37A.

Image analyzer 32A determines whether there is a number plate reading function for each parking space WK of one vehicle in parking place PRK (S42). In a case in which image analyzer 32A determines that there is the number plate reading function for each parking space WK of one vehicle in parking place PRK (YES in S42), image analyzer 32A performs a process of step S43 while periodically performing a process of reading the number plate for each parking space WK. That is, image analyzer 32A periodically performs the process of reading the number plate of the parked vehicle in parking space WK for one vehicle in sequence until the parked vehicle exits and determines whether the number plate of any parked vehicle is changed (S44).

In a case in which image analyzer 32A determines that the number plate of any parked vehicle is not changed (NO in S44), image analyzer 32A repeats the determination of step S44 until determining that the number plate of any parked vehicle is changed. Conversely, in a case in which image analyzer 32A determines that the number plate of any parked vehicle is changed (YES in S44), image analyzer 32A ends the process of step S43 and notifies tag information accumulation manager 34A of a message indicating that the number plate of any parked vehicle is changed. Tag information accumulation manager 34A transmits a control signal of an alarm (that is, warning indication) indicating that the number plate of the parked vehicle is changed (in other words, the number plate is replaced) in accordance with the notification from image analyzer 32A to surveillance center server 50 via communication IF 31 (S45). Thus, surveillance center server 50 can output a given sound of the alarm (that is, warning indication) in accordance with the control signal transmitted from surveillance situation determination server 30A in step S45 so that an attention of the surveillance staff can be attracted.

Conversely, in a case in which image analyzer 32A determines that there is no number plate reading function for each parking space WK of one vehicle in parking place PRK (NO in S42), image analyzer 32A determines an entry time, the number plate, the model, and the color of the vehicle at the time of detecting exit of the vehicle from parking space WK of parking place PRK using a captured image transmitted from camera 10 (S46).

After step S46, image analyzer 32A determines whether an entry record of the vehicle of which the exit is detected in step S46 is maintained in the parking place entry or exit information of information accumulator 37A (S47). In a case in which image analyzer 32A determines that the entry record of the vehicle of which the exit is detected in step S46 is maintained in the parking place entry or exit information of information accumulator 37A (YES in S47), image analyzer 32A determines whether the number plate of the vehicle is changed (S48). In a case in which image analyzer 32A determines that the number plate of the vehicle is not changed (NO in S48), the process of surveillance situation determination server 30A ends.

Conversely, in a case in which image analyzer 32A determines that the number plate of the vehicle is changed (YES in S48), image analyzer 32A notifies tag information accumulation manager 34A of a message indicating the change in the number plate of the vehicle. Tag information accumulation manager 34A transmits a control signal of an alarm (that is, warning indication) indicating that the number plate of the parked vehicle is changed (in other words, the number plate is replaced) in accordance with the notification from image analyzer 32A to surveillance center server 50 via communication IF 31 (S45). Thus, surveillance center server 50 can output a given sound of the alarm (that is, warning indication) in accordance with the control signal transmitted from surveillance situation determination server 30A in step S45 so that an attention of the surveillance staff can be attracted.

Conversely, in a case in which image analyzer 32A determines that the entry record of the vehicle of which the exit is detected in step S46 is not maintained in the parking place entry or exit information of information accumulator 37A (NO in S47), image analyzer 32A notifies tag information accumulation manager 34A of a message indicating that there is no entry record of the vehicle. Tag information accumulation manager 34A transmits a control signal of an alarm (that is, warning indication) indicating that there is no entry record of the vehicle (in other words, there is a possibility of the number plate being replaced) in accordance with the notification from image analyzer 32A to surveillance center server 50 via communication IF 31 (S49). Thus, surveillance center server 50 can output a given sound of the alarm (that is, warning indication) in accordance with the control signal transmitted from surveillance situation determination server 30A in step S49 so that an attention of the surveillance staff can be attracted.

In this way, surveillance situation determination server 30A acquires information regarding the number plate of the vehicle at the time of entry of the vehicle to parking space WK of the parking place using a captured image of parking place PRK transmitted from camera 10. Surveillance situation determination server 30A repeatedly acquires the information regarding the number plate of the vehicle and notifies surveillance center server 50 that the change in the number plate occurs in accordance with detection indicating that the acquired number plate of the vehicle does not match the number plate at the time of entry of the vehicle. Thus, surveillance center server 50 can allow the surveillance staff to grasp the replacement of the number plate after the vehicle enters parking place PRK by outputting a given sound of an alarm (that is, warning indication), and thus can take appropriate measures.

Surveillance situation determination server 30A acquires information regarding the number plate of the vehicle at the time of entry of the vehicle to parking space WK of parking place PRK using a captured image of parking place PRK transmitted from camera 10. Surveillance situation determination server 30A acquires information regarding the number plate of the vehicle at the time of exit of the vehicle from parking space WK of parking place PRK using a captured image of parking place PRK transmitted from camera 10. Surveillance situation determination server 30A notifies surveillance center server 50 that the change in the number plate occurs in accordance with detection indicating that the information regarding the number plate read at the time of entry does not match the information regarding the number plate read at the time of exit. Thus, surveillance center server 50 can allow the surveillance staff to grasp the replacement of the number plate while the vehicle enters parking place PRK and exits by outputting a given sound of an alarm (that is, warning indication), and thus can take appropriate measures.

Next, an operation procedure at the time of a threat against a harming person in parking place surveillance system 100A according to the exemplary embodiment will be described with reference to FIG. 9. In the technology of the related art included in Japanese Patent Unexamined Publication No. 2008-152460 described above, there is a problem that the surveillance staff may not appropriate take measures even when it can be detected in a captured image of the camera or the like that an executing person actually executes vehicle break-in or vehicle stealing.

Accordingly, in parking place surveillance system 100A, in a case in which it is detected in a captured image of the camera or the like that an executing person actually executes vehicle break-in or vehicle stealing, at least one of a lighting device, a loudspeaker, and a vehicle stopper is used to attract an attention of the executing person or threaten the executing person.

Figure 9:
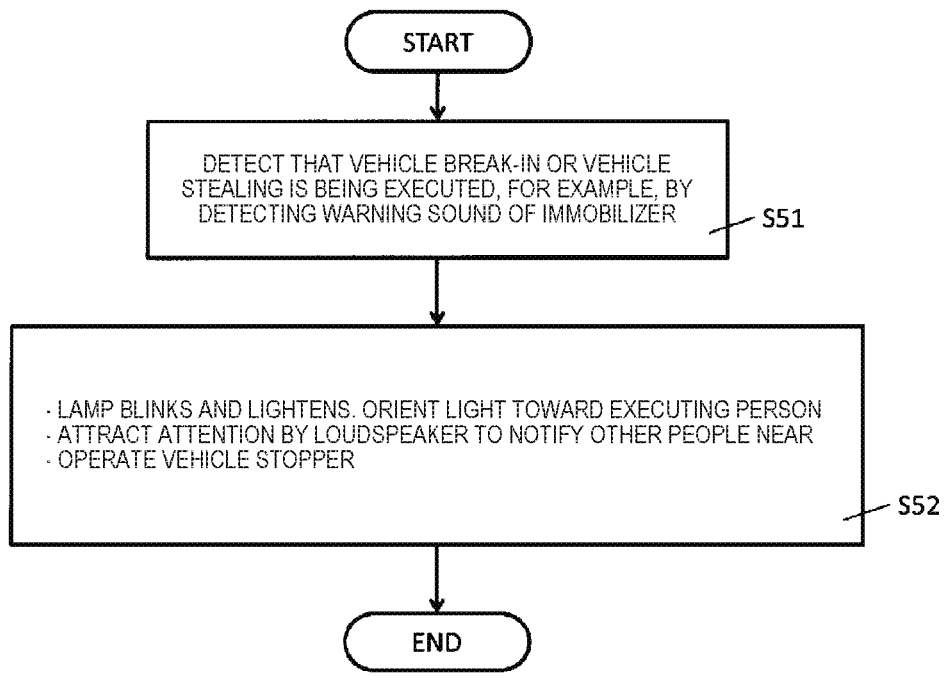
FIG. 9 is a flowchart illustrating an example of an operation procedure in detail at the time of a threat against a harming person in the parking place surveillance system according to Exemplary Embodiment 1.

FIG. 9 is a flowchart illustrating an example of an operation procedure in detail at the time of a threat against a harming person in parking place surveillance system 100A according to Exemplary Embodiment 1.

Each process illustrated in FIG. 9 is performed by surveillance situation determination server 30A illustrated in FIG. 6. Each process of FIG. 9 may be performed earlier than each process of FIG. 3, may be performed in parallel to each process of FIG. 3, or may be performed later than each process of FIG. 3.

In FIG. 9, immobilizer warning sound determiner 331 detects a warning sound started to be output based on a harming behavior (for example, vehicle break-in) executed by suspicious person SDP by the immobilizer mounted on a vehicle (for example, vehicle CR2) using a tone signal transmitted from microphone 20 (S51). Immobilizer warning sound determiner 331 outputs a message indicating the detection of the warning sound to tag information accumulation manager 34A. Thus, tag information accumulation manager 34A can recognize that a harming behavior (for example, vehicle break-in or vehicle stealing) has been executed or is being executed currently on one of the vehicles parked in parking place PRK by receiving the message from immobilizer warning sound determiner 331 (S51).

After step S51, tag information accumulation manager 34A outputs a control signal for blinking lighting devices 91

(that is, lamps) installed on the top of poles P1, P2, and P3 installed in parking place PRK to lighting control device 90. Lighting control device 90 blinks each lighting device 91 in accordance with the control signal from tag information accumulation manager 34A to lighten the environs of a scene in which the harming behavior (for example, vehicle break-in or stealing) in parking place PRK (S52).

Although not illustrated in FIG. 9, tag information accumulation manager 34A can specifically specify an occurrence position of the harming behavior by performing the processes of steps S2 to S9 illustrated in FIG. 3 after step S51. Accordingly, tag information accumulation manager 34A may output a control signal for orienting a light of lighting device 91 to lighten the person executing the harming behavior at a pinpoint to lighting control device 90. The control signal includes information regarding the occurrence position of the harming behavior. Lighting control device 90 orients the light of lighting device 91 to lighten the executing person at the pinpoint in accordance with the control signal from tag information accumulation manager 34A (S52). Thus, for example, people near the executing person can notice the executing person who is executing the harming behavior when the light of lighting device 91 is caused to blink, and thus can make contact with police or the like to suppress the crime of the executing person or remember features of the executing person so that early arrest of the executing person can be expected.

After step S51, tag information accumulation manager 34A outputs a control signal for outputting a given warning sound from loudspeaker 81 of pole P3 installed in parking place PRK to sound output control device 80. Sound output control device 80 rings out an alarm sound in the environs of the scene in which the harming behavior (for example, vehicle break-in or stealing) in parking place PRK by outputting the given warning sound (that is, the alarm sound) from loudspeaker 81 in accordance with the control signal from tag information accumulation manager 34A (S52). The present disclosure is not limited to the given warning sound (that is, the alarm sound). For example, a fixed phrase sound such as "Hey! You. What are you doing there!" may be output from loudspeaker 81. Information regarding the fixed phrase sound is retained in advance in sound output control device 80 or tag information accumulation manager 34A. Thus, for example, people near the executing person can notice the executing person who is executing the harming behavior when the alarming sound from loudspeaker 81 is output, and thus can make contact with police or the like to suppress the crime of the executing person or remember features of the executing person so that early arrest of the executing person can be expected.

Although not illustrated in FIG. 9, tag information accumulation manager 34A can specifically specify an occurrence position of the harming behavior by performing the processes of steps S2 to S9 illustrated in FIG. 3 after step S51. Accordingly, after step S51, tag information accumulation manager 34A outputs a control signal for operating vehicle stopper 71 installed in parking place PRK to vehicle stopper control device 70. The control signal includes information regarding the occurrence position of the harming behavior. Vehicle stopper control device 70 operates the flap plate of vehicle stopper 71 at a pinpoint in accordance with the control signal from tag information accumulation manager 34A so that the vehicle does not easily go out from that position (S52). Thus, for example, people near the executing person can notice the executing person who attempts to steal the vehicle by force from vehicle stopper 71 and run away, and thus can make contact with police or the like to suppress the crime of the executing person or remember features of the executing person so that early arrest of the executing person can be expected.

In this way, when the warning sound starting based on the harming behavior on the vehicle in parking place PRK and arriving from the vehicle is detected, surveillance situation determination server 30A causes lighting device 91 installed in parking place PRK to blink. Thus, for example, people near the executing person can notice the executing person who is executing the harming behavior when the light of lighting device 91 blinks, and thus can make contact with police or the like to suppress the crime of the executing person or remember features of the executing person so that early arrest of the executing person can be expected.

When the warning sound starting based on the harming behavior on the vehicle in parking place PRK and arriving from the vehicle is detected, surveillance situation determination server 30A causes loudspeaker 81 installed in parking place PRK to output a warning sound (that is, an alarm sound). Thus, for example, people near the executing person can notice the executing person who is executing the harming behavior when the given alarming sound or the fixed phrase sound is output from loudspeaker 81, and thus can make contact with police or the like to suppress the crime of the executing person or remember features of the executing person so that early arrest of the executing person can be expected.

When the warning sound starting based on the harming behavior on the vehicle in parking place PRK and arriving from the vehicle is detected, surveillance situation determination server 30A operates one vehicle stopper 71 installed in parking place PRK. Thus, for example, people near the executing person can notice the executing person who attempts to steal the vehicle by force from vehicle stopper 71 and run away, and thus can make contact with police or the like to suppress the crime of the executing person or remember features of the executing person so that early arrest of the executing person can be expected.

Next, an operation procedure at the time of detection of a vehicle parked in parking place PRK for a long time in parking place surveillance system 100A according to the exemplary embodiment will be described with reference to FIG. 10. In a case in which a crime incident such as violence occurs in a parking place, a ruffian parks a vehicle in the parking place for a long time and hides in the vehicle to aim at a target as a criminal way many times. However, in the technology of the related art included in Japanese Patent Unexamined Publication No. 2008-152460 described above, there is a problem that a person executing a crime such as the above-described violence may not be detected beforehand since surveilling of a vehicle parked for a long time in a parking place is not considered.

Accordingly, parking place surveillance system 100A detects that a vehicle is parked for a long time in a parking place or a person does not get out from the vehicle parked for a long time in the parking place and notifies the surveillance center server that the vehicle is parked for a long time based on the detection.

Figure 10:
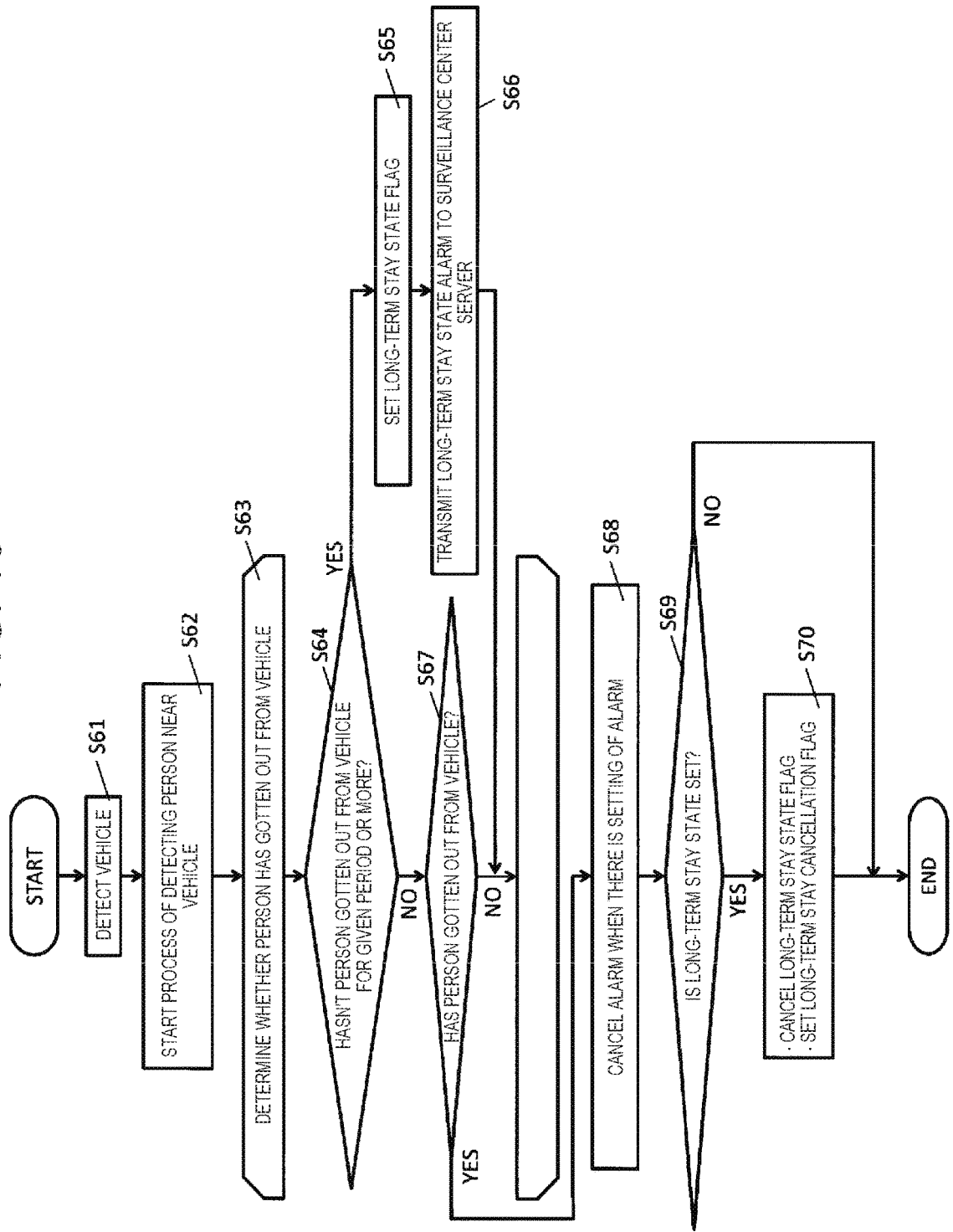
FIG. 10 is a flowchart illustrating an example of an operation procedure in detail at the time of detecting a vehicle which is parked for a long time in a parking place in the parking place surveillance system according to Exemplary Embodiment 1.

FIG. 10 is a flowchart illustrating an example of an operation procedure in detail at the time of detecting a vehicle which is parked for a long time in a parking place in parking place surveillance system 100A according to Exemplary Embodiment 1.

Each process illustrated in FIG. 10 is performed by surveillance situation determination server 30A illustrated in FIG. 6. Each process of FIG. 10 may be performed earlier than each process of FIG. 3, may be performed in parallel to each process of FIG. 3, or may be performed later than each process of FIG. 3.

In FIG. 10, image analyzer 32A detects a vehicle in parking place PRK using a captured image of parking place PRK transmitted from camera 10 (S61). The vehicle detected in step S61 may be a vehicle which has just enter parking place PRK or may be a vehicle which has been parked for a predetermined time after the parking of the vehicle in parking place PRK.

Image analyzer 32A starts a process of detecting a person near the vehicle detected in step S61 (S62). The process of step S62 is performed to determine whether a person hides in a parked vehicle for a long time and confirm whether the person is a ruffian or not based on the fact that a possibility of the person being the ruffian is statistically low when the person has gotten out from the parked vehicle.

Specifically, image analyzer 32A determines whether the person has gotten out from the vehicle detected in step S61 using the captured image of parking place PRK transmitted from camera 10 (S63). That is, image analyzer 32A determines whether the person has not gotten out from the vehicle detected in step S61 for a given time or more using the captured image of parking place PRK transmitted from camera 10 (S64).

In a case in which image analyzer 32A determines that the person has not gotten out from the vehicle detected in step S61 for the given time or more (YES in S64), image analyzer 32A sets a long-term stay state flag in the vehicle detected in step S61 (S65). The long-term stay state flag indicates a state in which a person (for example, a driver) is in the vehicle or is hiding in the vehicle since the vehicle detected in step S61 has been parked in parking place PRK for a long time (that is, for the given time or more in step S64) and the person has not gotten out from the vehicle.

Image analyzer 32A notifies tag information accumulation manager 34A of a message indicating that the long-term stay state flag is set in the vehicle detected in step S61. Tag information accumulation manager 34A transmits the fact that the long-term stay state flag is set in the vehicle detected in step S61 and an alarm indicating that there is the long-term stay state (that is, warning indication) in accordance with the notification from image analyzer 32A to surveillance center server 50 via communication IF 31 (S66). Thus, surveillance center server 50 can allow the surveillance staff to grasp that the person has not gotten out now from the vehicle parked in parking place PRK for a long time in accordance with the indication of the alarm transmitted from surveillance situation determination server 30A in step S66 so that an attention of the surveillance staff to the vehicle can be attracted.

Conversely, in a case in which the person has gotten out from the vehicle detected in step S61 before the given time or more (NO in S64 and YES in S67), image analyzer 32A determines that a possibility of the person being an executing person such as a ruffian is low and performs a process of step S68. That is, in a case in which the alarm indicating that there is the long-term stay state is set by tag information accumulation manager 34A in step S66, image analyzer 32A cancels the setting of the alarm indicating that there is the long-term stay state (S68). In a case in which the alarm indicating that there is the long-term stay state is not set by tag information accumulation manager 34A in step S66, the process of step S68 may be omitted.

After step S68, image analyzer 32A determines whether the long-term stay state flag is set in the vehicle detected in step S61 (S69). In a case in which image analyzer 32A determines that the long-term stay state flag is not set in the vehicle detected in step S61 (NO in S69), the process of surveillance situation determination server 30A ends.

Conversely, in a case in which image analyzer 32A determines that the long-term stay state flag is set in the vehicle detected in step S61 (YES in S69), image analyzer 32A cancels the long-term stay state flag set in the vehicle detected in step S61 (S70) and further sets a long-term stay cancellation flag (S70). The long-term stay cancellation flag indicates that it is not necessary to set the long-term stay state flag on the assumption that although the long-term stay state flag is set, the person has gotten out from the vehicle in which the long-term stay state flag is set and thus a possibility of the person being an executing person of a crime such as ruffian is low.

Image analyzer 32A notifies tag information accumulation manager 34A of a message indicating that the setting of the long-term stay state flag in the vehicle detected in step S61 is canceled and the long-term say cancellation flag is set. Tag information accumulation manager 34A may transmit the fact that the long-term stay state flag is canceled for the vehicle detected in step S61, the long-term stay cancellation flag is set, and indication of stop of the alarm indicating that there is the long-term stay state (that is, the warning indication) in accordance with the notification from image analyzer 32A to surveillance center server 50 via communication IF 31. Thus, surveillance center server 50 can allow the surveillance staff to grasp that the person has gotten out now from the vehicle in which the long-term stay state flag is set in parking place PRK for a long time in accordance with the indication of the stop of the alarm transmitted from surveillance situation determination server 30A so that the surveillance of the surveillance staff on the vehicle can be reduced.

In this way, surveillance situation determination server 30A detects the vehicle in parking place PRK, and then sets the long-term stay state flag in the vehicle and notifies surveillance center server 50 of the indication of the alarm (that is, warning) in a case in which the person has not gotten out from the detected vehicle for a given time or more. Thus, surveillance center server 50 can allow the surveillance staff to grasp that the person has not gotten out now from the vehicle parked in parking place PRK for a long time for the given time or more in accordance with the indication of the alarm transmitted from surveillance situation determination server 30A so that an attention of the surveillance staff to the vehicle can be attracted.

For example, the surveillance staff or a police officer receiving contact from the surveillance staff can go to the parking place and execute a police check or the like to the person getting on the vehicle in which the long-term stay state flag is set, so that an incident such as violence can be prevented in advance. In a case in which a certain incident or accident occurs, the surveillance staff or the police officer receiving contact from the surveillance staff can efficiently examine a reason caused due to the incident or the accident by retrieving information accumulator 37A of surveillance situation determination server 30A using the long-term stay state flag as a key.

Surveillance situation determination server 30A stops notifying surveillance center server 50 of the indication of the alarm (that is, warning) when it is detected that the person has gotten out from the vehicle at the time of the long-term stay state of the vehicle. Thus, surveillance center server 50 can allow the surveillance staff to grasp that the person has gotten out now from the vehicle in which the long-term stay state flag is set in parking place PRK for a long time in accordance with the indication of the stop of the alarm transmitted from surveillance situation determination server 30A so that the surveillance of the surveillance staff on the vehicle can be reduced.

Background to Second Exemplary Embodiment

In order to surveil a full or empty situation of parking in a parking place (that is, the parking place is full of parked vehicles or spaces for parked vehicles are empty), for example, determination is considered to be performed using a captured image of the camera. Although Japanese Patent Unexamined Publication No. 2008-152460 described above is not particularly mentioned, an operation of causing individual cameras to capture imaging ranges of parking places separately is realized, for example, in such a manner that a plurality (for example, two) of cameras are mounted on a pole installed in a parking place, one camera is oriented to the left of the pole, and another single camera is oriented to the right of the pole. However, in this management, there is a problem that it is necessary to adjust angles of the cameras in accordance with installation height of the cameras and the angles are adjusted at high positions, and therefore a considerable number of processes is necessary to adjust the angles of views.

There is also a problem that since the angle of view of each camera is fixed, imaging is not performed out of the angle of view and it is difficult to surveil a broad parking place. Further, in a case in which the parking place is surveilled using a plurality of cameras, it is not easy to determine whether a number plate, a model, and a color of a vehicle imaged by each camera and a face image of a person coming out from the vehicle are identical to a number plate, a model, and a color of a vehicle imaged by another camera and a face image of a person coming out from the vehicle. Therefore, there is also a problem that a considerable number of processes is necessary in a work of a correspondent relation when a parking violation or an incident occurs.

Exemplary Embodiment 2

Accordingly, in Exemplary Embodiment 2, an example of a parking place surveillance system that can image a parking place widely using one omnidirectional camera, simplify a work of adjusting an angle of view, and simply match each piece of information regarding a vehicle or a person detected in the parking place, and surveil a full or empty state in the parking place will be described.

Figure 11:
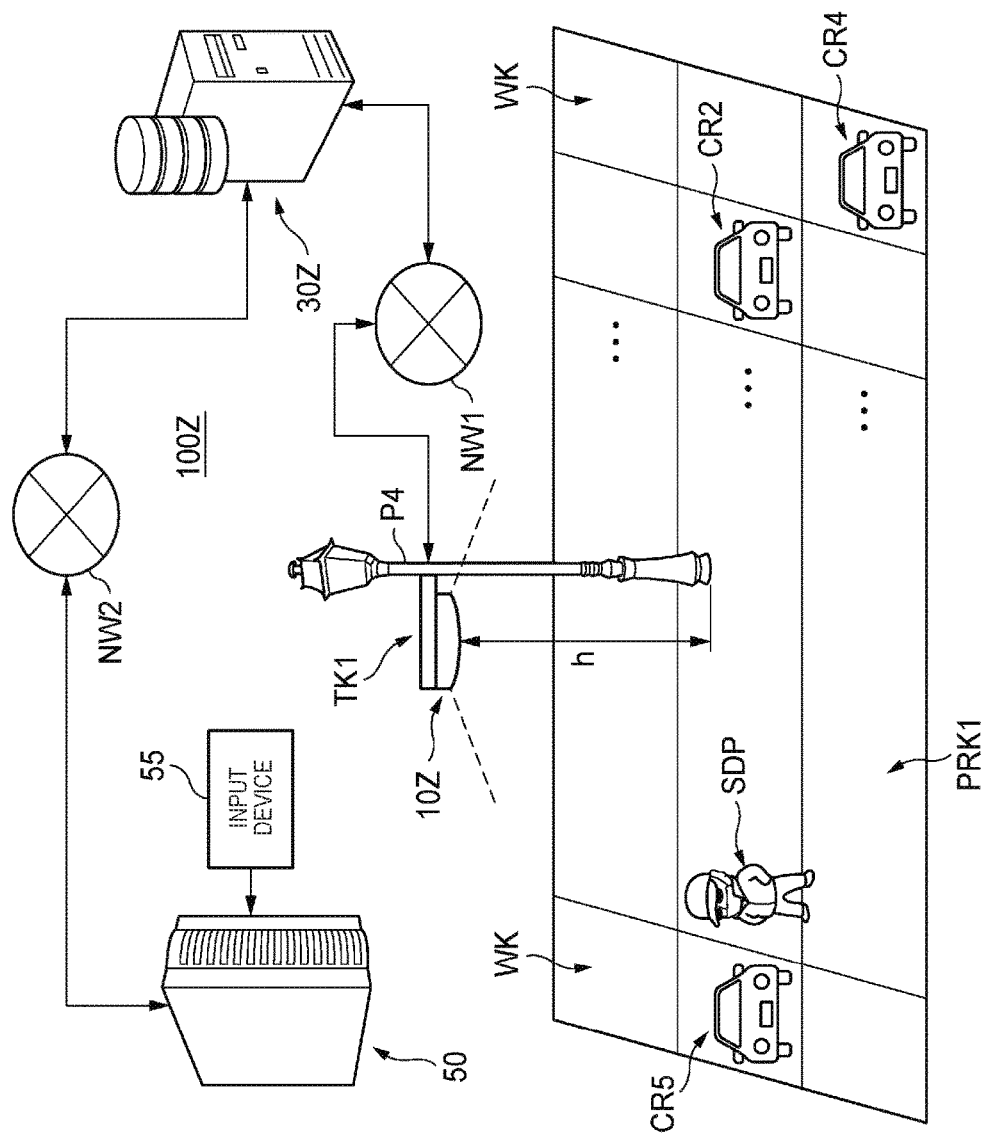
FIG. 11 is a diagram schematically illustrating an overview of an example of a system configuration of a parking place surveillance system according to Exemplary Embodiment 2.
Figure 12:
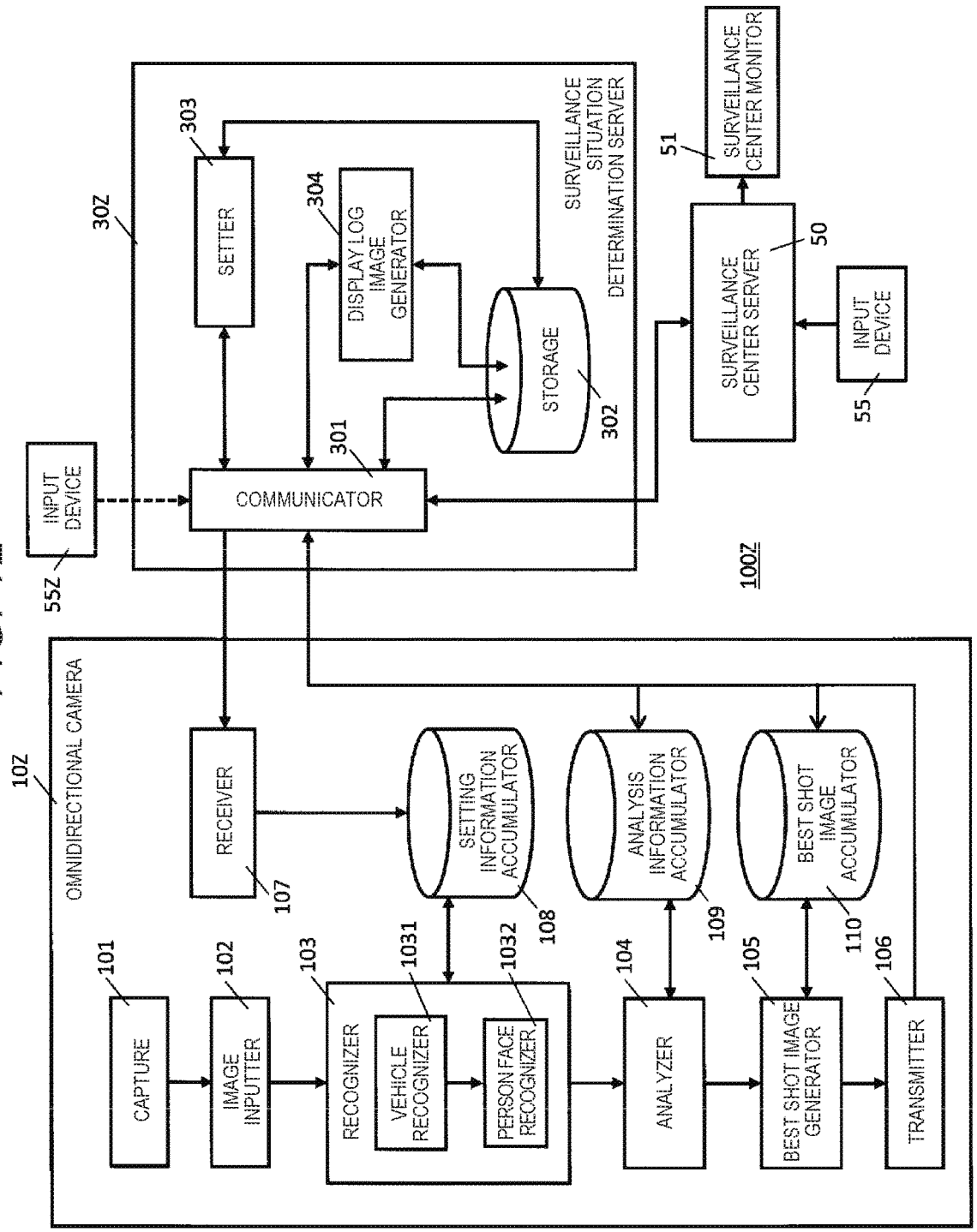
FIG. 12 is a block diagram illustrating an example of a system configuration of the parking place surveillance system in detail according to Exemplary Embodiment 2.

FIG. 11 is a diagram schematically illustrating an overview of an example of a system configuration of parking place surveillance system 100Z according to Exemplary Embodiment 2. FIG. 12 is a block diagram illustrating an example of a system configuration of parking place surveillance system 100Z in detail according to Exemplary Embodiment 2.

In description of FIGS. 11 and 12, the same reference numerals are given to the same configurations as the configurations described in FIGS. 1, 2, 5, and 6 and the description thereof will be simplified or omitted.

Parking place surveillance system 100Z is configured to include omnidirectional camera 10Z installed in parking place PRK1, surveillance situation determination server 30Z, surveillance center server 50, and input device 55. In parking place PRK1, pole P4 is erected and omnidirectional camera 10Z is installed on pole P4 through mounting bracket TK1. Omnidirectional camera 10Z is installed at a position of height h from the ground.

To simplify description of FIG. 11, only one pole is illustrated in parking place PRK1, but the number of installed poles is not limited to 1.

Omnidirectional camera 10Z and surveillance situation determination server 30Z are connected to be able to communicate with each other via network NW1. Surveillance situation determination server 30Z and surveillance center server 50 are connected to be able to communicate with each other via network NW2.

In parking place PRK1, parking spaces WK (examples of parking regions) in which a plurality of vehicles CR2, CR4, and CR5 can be parked are installed. FIG. 11 illustrates a situation in which a total of three vehicles CR2, CR4, and CR5 are parked in parking spaces WK. FIG. 11 illustrates a situation in which suspicious person SDP (for example, a person breaking into a vehicle) who is a malicious third person is attempting to execute a behavior (for example, vehicle break-in) of harming vehicle CR5 which is a parked vehicle.

Omnidirectional camera 10Z is mounted on pole P4 through mounting bracket TK1 so that an entire region of parking place PRK1 is included in an imaging range. That is, omnidirectional camera 10Z can capture an omnidirectional image including the entire region of parking place PRK1 as the imaging range. Omnidirectional camera 10Z acquires the omnidirectional image of parking place PRK1 obtained through the imaging and normally or periodically transmits identification information of omnidirectional camera 10Z and the omnidirectional image to surveillance situation determination server 30Z via network NW1. Information regarding omnidirectional camera 10Z (for example, installation position information) is stored in setting information accumulator 108 of omnidirectional camera 10Z. The installation position information of omnidirectional camera 10Z is, for example, latitude, longitude, and height.

Omnidirectional camera 10Z is configured to include capture 101, image inputter 102, recognizer 103, analyzer 104, best shot image generator 105, transmitter 106, receiver 107, setting information accumulator 108, analysis information accumulator 109, and best shot image accumulator 110. Recognizer 103 includes vehicle recognizer 1031 and person face recognizer 1032.

Capture 101 includes at least a lens and an image sensor. The lens condenses light incident from the outside of omnidirectional camera 10Z and forms an image on a predetermined imaging surface of the image sensor. As the lens, for example, a fisheye lens is used to be able to capture an omnidirectional image of 360 degrees. The image sensor is, for example, a solid-state image sensor such as a charged-coupled device (CCD) or a complementary metal oxide semiconductor (CMOS) and converts an optical image formed on the imaging surface into an electric signal.

Image inputter 102 is configured using, for example, a processor such as a CPU, an MPU, or a DSP, performs predetermined signal processing using the electric signal from capture 101 to generate data (frame) of a captured image defined in conformity to RGB (red, green, and blue) or YUV (luminance and color difference) which can be recognized by human beings, and outputs the data to recognizer 103.

Recognizer 103 is configured using, for example, a processor such as a CPU, an MPU, or a DSP and detects, recognizes, and tracks an object (for example, a vehicle, a person, or the face of a person in parking place PRK1) using the omnidirectional image from image inputter 102 and a setting value transmitted from surveillance situation determination server 30Z. Recognizer 103 outputs processed results obtained by detecting, recognizing, and tracking the object to analyzer 104.

Here, the setting value is a value indicating the size (for example, a pixel value) of the object (for example, a vehicle, a person, or the face of a person in parking place PRK1) recognized by recognizer 103 and is set in advance for each object. When recognizer 103 detects the object, recognizer 103 can recognize what the detected object is specifically and can track and grasp a movement route of the object as necessary.

Vehicle recognizer 1031 is configured using, for example, a processor such as a CPU, an MPU, or a DSP and detects a vehicle which is an example of the object using the omnidirectional image from image inputter 102 and a setting value for recognizing a vehicle. Vehicle recognizer 1031 recognizes the detected vehicle by recognizing which vehicle the vehicle is specifically or tracking a movement route of the vehicle. Vehicle recognizer 1031 outputs processed results obtained by detecting, recognizing, and tracking the vehicle to analyzer 104.

Figure 13:
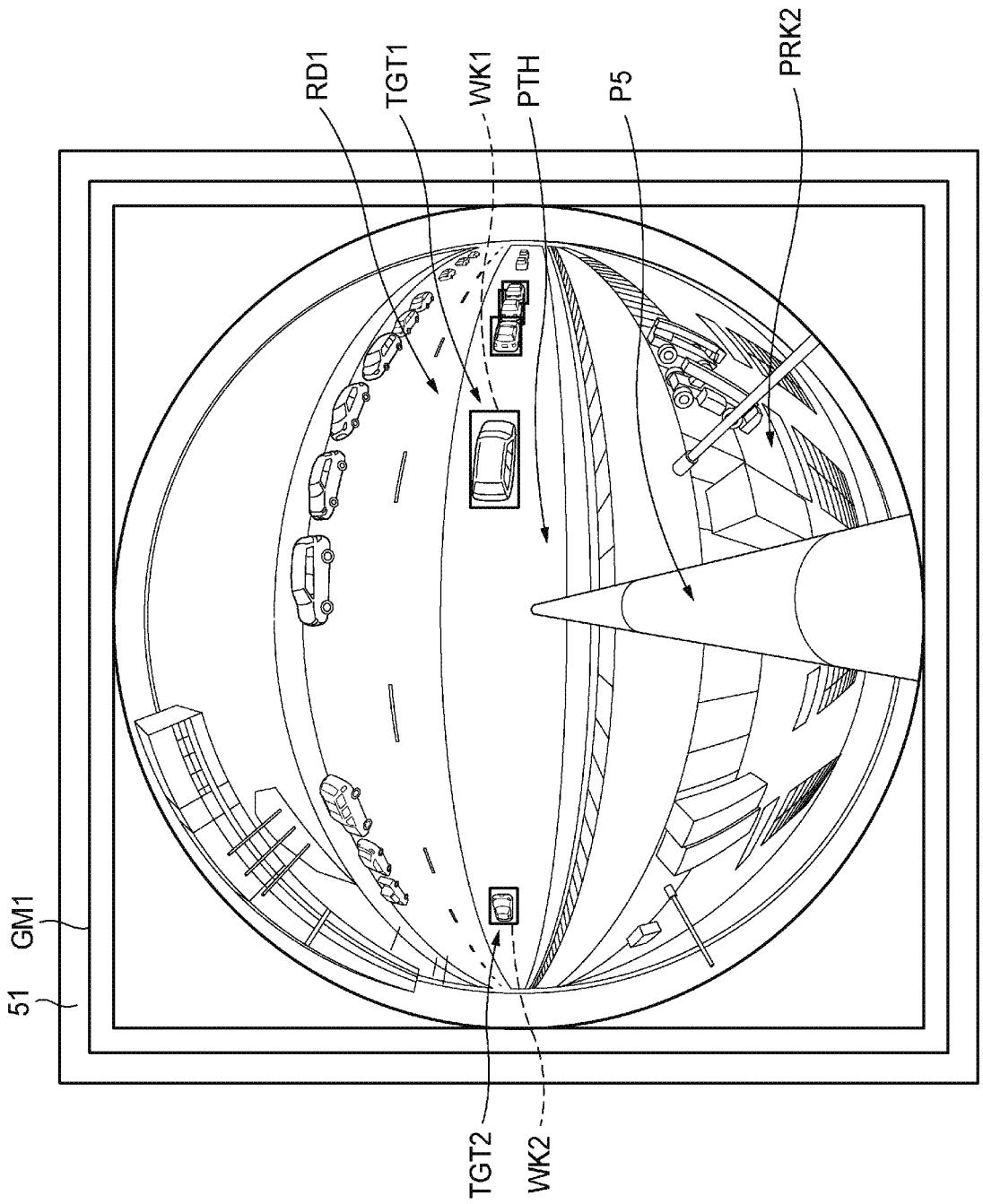
FIG. 13 is a diagram illustrating an example of an omnidirectional image captured by an omnidirectional camera according to Exemplary Embodiment 2.

FIG. 13 is a diagram illustrating an example of an omnidirectional image captured by omnidirectional camera 10Z according to Exemplary Embodiment 2.

The omnidirectional image illustrated in FIG. 13 is displayed on, for example, a display screen GM1 of surveillance center monitor 51 connected to surveillance center server 50. In the middle of the omnidirectional image illustrated in FIG. 13, pole P5 on which omnidirectional camera 10Z mounted is shown. Parking place PRK2 which is an example of a surveillance area is shown on the lower side of the ground of pole P5 in FIG. 13, and pedestrian road PTH, road RD1, and a pedestrian road opposite with road RD1 interposed therebetween are shown on the opposite side to parking place PRK2. Thus, broad imaging can be performed.

When the omnidirectional image illustrated in FIG. 13 is input, vehicle recognizer 1031 detects, for example, vehicle TGT1 near pole P5, generates detection range WK1 surrounding vehicle TGT1, and generates positional information (for example, coordinates) of detection range WK1 together. The positional information of detection range WK1 is used in, for example, a process (for example, display on surveillance center monitor 51) of surveillance situation determination server 30Z. Similarly, when the omnidirectional image illustrated in FIG. 13 is input, vehicle recognizer 1031 detects, for example, vehicle TGT2 distant from pole P5, generates detection range WK2 surrounding vehicle TGT2, and generates positional information (for example, coordinates) of detection range WK2 together. The positional information of detection range WK2 is used in, for example, a process (for example, display on surveillance center monitor 51) of surveillance situation determination server 30Z.

Person face recognizer 1032 is configured using, for example, a processor such as a CPU, an MPU, or a DSP and detects a person or the face of the person who is an example of an object using the omnidirectional image from image inputter 102 and each setting value for recognizing a person or the face of the person. Person face recognizer 1032 grasps the detected person or the face of the person by recognizing which person or which face of the person the person or the face of the person is specifically or tracking a movement route of the person or the face of the person. Person face recognizer 1032 outputs processed results obtained by detecting, recognizing, and tracking the person or the face of the person to analyzer 104.

Analyzer 104 is configured using, for example, a processor such as a CPU, an MPU, or a DSP and performs various analysis processes on each object using the processed results obtained by detecting, recognizing, and tracking the object and output from recognizer 103. Analyzer 104 stores the various analysis results in analysis information accumulator 109. Here, analyzer 104 may perform the various analysis processes in accordance with a method disclosed in, for example, Japanese Patent Unexamined Publication No. 2014-022970 (for example, see a target feature analyzer or a bandwidth component detector in FIG. 1).

For example, in a case in which the object is a vehicle, analyzer 104 performs a process of determining whether the vehicle is parked. Specifically, analyzer 104 analyzes a movement trajectory of the vehicle and determines whether the vehicle is parked in predetermined parking space WK in parking place PRK1. Analyzer 104 determines whether a position at which the vehicle is parked is a parking-permitted position or a parking-prohibited position (that is, whether the vehicle is parked illegally). In a case in which analyzer 104 determines that the position is in a parking-permitted area, analyzer 104 calculates and determines how many vehicles can be parked in parking place PRK1.

Best shot image generator 105 is configured using, for example, a processor such as a CPU, an MPU, or a DSP, generates a best shot image of each object (for example, a vehicle, a person, or the face of the person) using an output of analyzer 104 and the omnidirectional image output from image inputter 102, and outputs the generated best shot image or metadata of the best shot image to transmitter 106 or stores the generated best shot image or the metadata of the best shot image in best shot image accumulator 110. The metadata may include a thumbnail image of the best shot image. Since a method of generating the best shot image is disclosed in detail in, for example, Japanese Patent Unexamined Publication No. 2014-022970 (for example, see an image selector in FIG. 1 and FIG. 8), the description thereof will be omitted here.

Best shot image generator 105 selects and generates, for example, a front image when the vehicle enters an angle of view of omnidirectional camera 10Z. That is, the front image is an image in which it is easy to recognize a number plate of a vehicle the face of a person getting on the vehicle and which is highly likely to contribute to a process on the rear stage in surveillance situation determination server 30Z. Best shot image generator 105 cuts and resizes the front image shown in a front view of the object from the omnidirectional image from image inputter 102 and stores the resized image as a best shot image in best shot image accumulator 110.

For example, at a timing at which a vehicle enters the angle of view of omnidirectional camera 10Z, there is a tendency to easily extract a face on the front side. At a timing at which a vehicle is detected to be parked, it is difficult to cut and acquire a front image of the face of a person getting on the vehicle. For this reason, best shot image generator 105 preferably cuts and resizes a front image of an object using an omnidirectional image at a timing at which the object enters the angle of view of omnidirectional camera 10Z to generate the front image.

Transmitter 106 transmits the best shot image or the metadata of the best shot image output from best shot image generator 105 to surveillance situation determination server 30Z. Transmitter 106 may acquire the best shot image or the metadata of the best shot image from best shot image accumulator 110 and transmit the best shot image or the metadata of the best shot image to surveillance situation determination server 30Z. Transmitter 106 may acquire the various analysis results obtained by processing the omnidirectional image from image inputter 102 by analyzer 104 from analysis information accumulator 109 and transmit the various analysis results to surveillance situation determination server 30Z.

Receiver 107 receives information regarding the height of omnidirectional camera 10Z or the setting value (see the above description) of each object transmitted from surveillance situation determination server 30Z and stores the information in setting information accumulator 108. In FIG. 12, transmitter 106 and receiver 107 which are separately included has been described, but it is regardless to say that transmitter 106 and receiver 107 may be collectively configured as a communicator.

Setting information accumulator 108 is configured using, for example, a semiconductor memory or a hard disk device and stores the information regarding the height of omnidirectional camera 10Z or the setting value (see the above description) of each object output from receiver 107. Setting information accumulator 108 stores various kinds of setting information necessary in an operation of omnidirectional camera 10Z.

Analysis information accumulator 109 is configured using, for example, a semiconductor memory or a hard disk device and stores various analysis results by analyzer 104.

Best shot image accumulator 110 is configured using, for example, a semiconductor memory or a hard disk device and analyzes the best shot image generated by best shot image generator 105. The best shot image is stored in association with, for example, a generation time of the best shot image. Further, in a case in which an object of the best shot image is a vehicle, information regarding a person getting on the vehicle may also be associated to be stored.

Surveillance situation determination server 30Z is configured to include communicator 301, storage 302, setter 303, and display log image generator 304. Surveillance situation determination server 30Z illustrated in FIG. 12 may have an internal configuration of surveillance situation determination server 30 illustrated in FIG. 2 or surveillance situation determination server 30A illustrated in FIG. 6.

Communicator 301 acquires the information regarding the height of omnidirectional camera 10Z or the setting value (see the above description) of each object input through an operation on input device 55Z used by a user using surveillance situation determination server 30Z and stores the information in setter 303. Communicator 301 communicates with omnidirectional camera 10Z via network NW1 (see FIG. 11) and communicates with surveillance center server 50 via network NW2 (see FIG. 11). Communicator 301 stores information or data transmitted from omnidirectional camera 10Z in storage 302.

Storage 302 which is an example of an accumulator is configured using, for example, a semiconductor memory or a hard disk device and stores information or data output from communicator 301 or stores data of a still image or a moving image generated by display log image generator 304.

Setter 303 is configured using, for example, a processor such as a CPU, an MPU, or a DSP and retains the information regarding the height of omnidirectional camera 10Z or a setting value of the size of an object (for example, a vehicle, a person, or the face of the person) detected by omnidirectional camera 10Z. Each setting value for determining the size of each object is changed in accordance with height h of omnidirectional camera 10Z. That is, the setting value of the size of each object is set in accordance with the value of an installation height (height h) of omnidirectional camera 10Z. Setter 303 transmits the information regarding the height of omnidirectional camera 10Z or the information regarding the setting value for determining the size of each object to omnidirectional camera 10Z via communicator 301 and sets the information in omnidirectional camera 10Z.

Display log image generator 304 is configured using, for example, a processor such as a CPU, an MPU, or a DSP and generates various images using the information or the data (for example, the best shot image of each object and the metadata of the best shot image) transmitted from omnidirectional camera 10Z or controls display of the images on surveillance center monitor 51. The various images are assumed to include still image and moving images.

Display log image generator 304 generates, for example, a moving image or a still image of a scene in which a vehicle is stopped and a person is getting out. Display log image generator 304 generates, for example, a moving image or a still image of a scene when a person approaches a vehicle. The moving image or the still image can be used as an evidence image, for example, when an incident such as stealing of a vehicle occurs. Display log image generator 304 generates, for example, a moving image or a still image of a scene until a person returns to a vehicle, gets on the vehicle, and departures. Display log image generator 304 generates, for example, a still image of a number plate of a vehicle. Display log image generator 304 generates, for example, a still image of the face of the whole body of a person getting on a vehicle.

Input device 55Z is configured using, for example, a mouse, a keyboard, a touch panel, or a touch pad and outputs information or data in accordance with an input operation by a user (for example, a surveillance staff different from a surveillance staff using surveillance center server 50) using surveillance situation determination server 30Z to communicator 301.

Next, operation procedures of omnidirectional camera 10Z and surveillance situation determination server 30Z in parking place surveillance system 100Z according to the exemplary embodiment will be described with reference to FIGS. 14A and 14B.

Figure 14A:
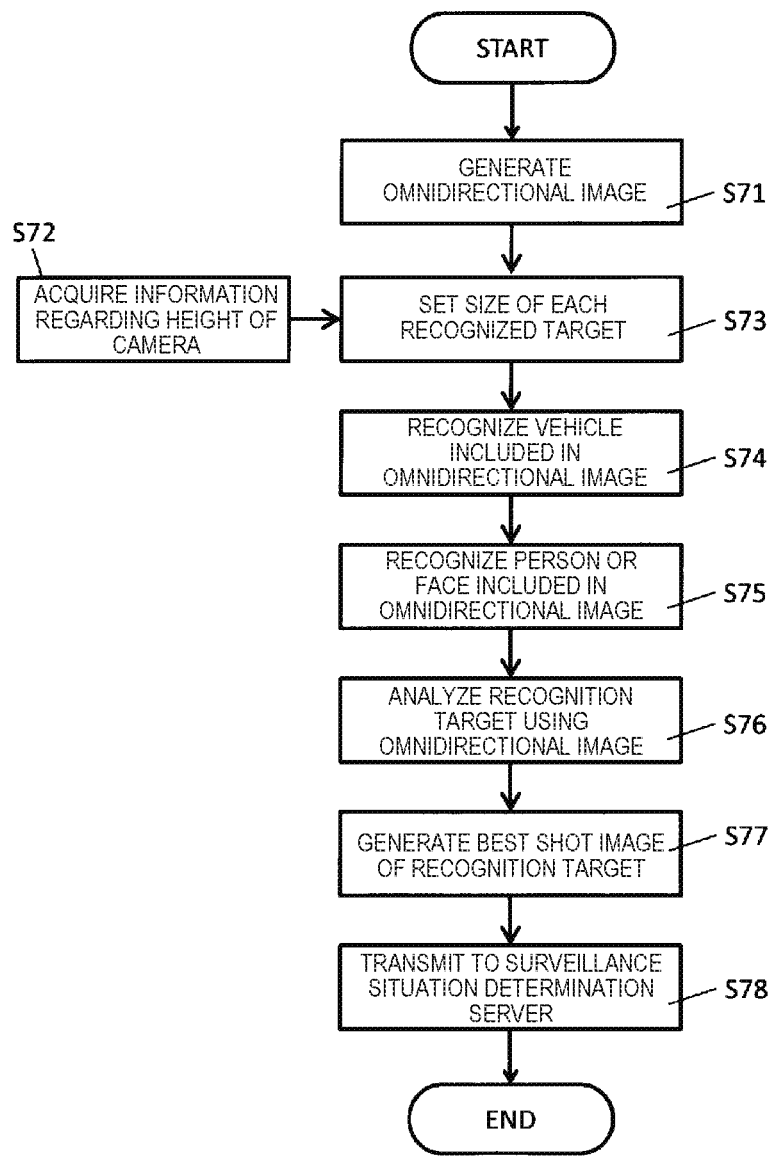
FIG. 14A is a flowchart illustrating an example of an operation procedure of the omnidirectional camera in detail according to Exemplary Embodiment 2.

FIG. 14A is a flowchart illustrating an example of an operation procedure of omnidirectional camera 10Z in detail according to Exemplary Embodiment 2. FIG. 14B is a flowchart illustrating an example of an operation procedure of surveillance situation determination server 30Z in detail according to Exemplary Embodiment 2.

In FIG. 14A, capture 101 images an omnidirectional image of parking place PRK1 (see FIG. 11) which is a subject and outputs the omnidirectional image to image inputter 102. Image inputter 102 generates data (frame) of an omnidirectional image defined in conformity to RGB (red, green, and blue) or YUV (luminance and color difference) which can be recognized by human beings (S71).

Recognizer 103 acquires the information regarding the height of omnidirectional camera 10Z stored in setting information accumulator 108 (S72) and sets a setting value for specifying the size of each object (S73). The processes of steps S72 and S73 may be performed as the premise of the description of FIG. 14A.

Vehicle recognizer 1031 detects or recognizes a vehicle included (in other words, shown) in the omnidirectional image using the omnidirectional image generated in step S71 and the setting value indicating the size of the vehicle set in step S73 (S74).

Person face recognizer 1032 detects and recognizes a person or the face of the person included (in other words, shown) in the omnidirectional image using the omnidirectional image generated in step S71 and each setting value indicating the person or the face of the person and set in step S73 (S75).

Analyzer 104 performs various analysis processes on each object by tracking the vehicle detected in step S74 or tracking the person or the face of the person detected in step S75 (S76).

Best shot image generator 105 generates a best shot image of each object (for example, a vehicle, a person, or the face of the person) using the output of analyzer 104 and the omnidirectional image output from image inputter 102 and stores the generated best shot image or the metadata of the best shot image in best shot image accumulator 110 (S77).

Transmitter 106 transmits the best shot image or the metadata of the best shot image output from best shot image generator 105 to surveillance situation determination server 30Z (S78).

In FIG. 14B, communicator 301 receives the information or the data (for example, the best shot image or the metadata of the best shot image) transmitted from omnidirectional camera 10Z (S81).

Display log image generator 304 generates various images using the information or the data (for example, best shot image of each object or the metadata of the best shot image) transmitted from omnidirectional camera 10Z (S82) and stores the generated various images in storage 302 (S83). Since the examples of the various images have been described above, the description thereof will be omitted here.

Display log image generator 304 transmits data of the various images generated in step S82 to surveillance center server 50 via communicator 301 and network NW2 (S84).

Surveillance center server 50 receives the data of the various images transmitted from surveillance situation determination server 30Z and displays the data of the various images on surveillance center monitor 51 (S85; see FIG. 13).

As described above, in parking place surveillance system 100Z according to the exemplary embodiment, omnidirectional camera 10Z can capture an omnidirectional image of parking place PRK2 that has parking space WK (an example of a parking region) for each vehicle. Omnidirectional camera 10Z surveils a parking situation (in other words, a full or empty state of parking) of each parking space WK in accordance with whether a vehicle is parked or not in each parking space WK. Thus, in parking place surveillance system 100Z, by analyzing an omnidirectional image of omnidirectional camera 10Z using one omnidirectional camera 10Z, it is possible to detect that a vehicle is parked and surveil fullness or emptiness of the parking place. That is, by using omnidirectional camera 10Z, it is possible to perform omnidirectional surveillance of parking place PRK1 at 360 degrees in addition to a location immediately below omnidirectional camera 10Z.

In a case in which a plurality (for example, two) of cameras are used as in a technology of the related art, it is necessary to adjust angles of the cameras or an angle of view between the cameras. As in the exemplary embodiment, however, in a case in which omnidirectional camera 10Z is used, it is possible to simply complete adjustment for specifying the size of each object by installing omnidirectional camera 10Z horizontally to a road by inputting and setting information regarding height h which is an installation height. The information regarding height h is preferably input to improve detection precision. However, even when the information regarding height h is not input, a fixed setting value may be used.

By using omnidirectional camera 10Z, it is possible to acquire not only information regarding one lane of a road immediately below omnidirectional camera 10Z but also information regarding a nearby line or sidewalk using one omnidirectional camera 10Z as illustrated in FIG. 13. Thus, the surveillance staff can perform an operation (for example, performing management in which some areas are used as roads rather than a parking place at a congestion time) in accordance with not only congestion prediction information of parking place PRK but also in a road congestion situation.

When omnidirectional camera 10Z detects a vehicle within an angle of view of an omnidirectional image, omnidirectional camera 10Z tracks a movement of the vehicle, acquires a best shot image of the vehicle and information (an example of metadata of a best shot image) regarding the vehicle, and transmits the best shot image and the information to surveillance situation determination server 30Z. Surveillance situation determination server 30Z records the best shot image of the vehicle transmitted from omnidirectional camera 10Z and the information regarding the vehicle in association with each other (by tagging) in storage 302. Thus, when the surveillance staff retrieves the tagged information or data on surveillance situation determination server 30Z using parking violence or an occurrence time at the time of occurrence of an incident, the surveillance staff can instantaneously grasp number plate information or a model of the vehicle along with the corresponding parking information (for example, a parking start time). Further, in a case in which a sidewalk is surveilled as an application, a front image of a pedestrian can also be acquired and information such as an age and sex can be acquired to be used for marketing.

When omnidirectional camera 10Z detects a person getting on a vehicle shown in an angle of view of an omnidirectional image, omnidirectional camera 10Z tracks a movement of the person, acquires a best shot image of the person and information regarding the person, and transmits the best shot image and the information to surveillance situation determination server 30Z. Surveillance situation determination server 30Z records the best shot image of the person transmitted from omnidirectional camera 10Z and the information regarding the person in association with the best shot image of the vehicle and the information regarding the vehicle (by tagging) in storage 302. Thus, when the surveillance staff retrieves the tagged information or data on surveillance situation determination server 30Z using parking violence or an occurrence time at the time of occurrence of an incident, the surveillance staff can instantaneously grasp number plate information or a model and an image of a face shown or a whole person in a front view of the person along with the corresponding parking information (for example, a parking start time).

In Exemplary Embodiment 2, the processes performed in omnidirectional camera 10Z (specifically, the processes from steps S73 to S77 in FIG. 14A) may be performed in surveillance situation determination server 30Z.

Background to Third Exemplary Embodiment

In technologies of the related including Japanese Patent Unexamined Publication No. 2008-152460 described, when number plates of a plurality of vehicles parked in predetermined areas of a parking place are recognized, for example, captured images captured by cameras having fixed angles of views are used. Therefore, there is a problem that the number plates of all the vehicles parked in the parking place may not be accurately recognized. This is because, for example, in a case in which a vehicle is parked in an area outside of the fixed angle of view of a camera, a number plate of the vehicle is not accurately imaged, and therefore recognition of the number plate fails.

Exemplary Embodiment 3

Accordingly, in Exemplary Embodiment 3, an example of a parking place surveillance system that accurately recognizes a number plate using a captured image of each vehicle obtained by imaging a plurality of vehicles parked in a parking place in focus using a PTZ camera that has a pan, tilt, and zoom functions and records information regarding the number plate and a captured image of the vehicle in association with each other will be described.

Figure 16:
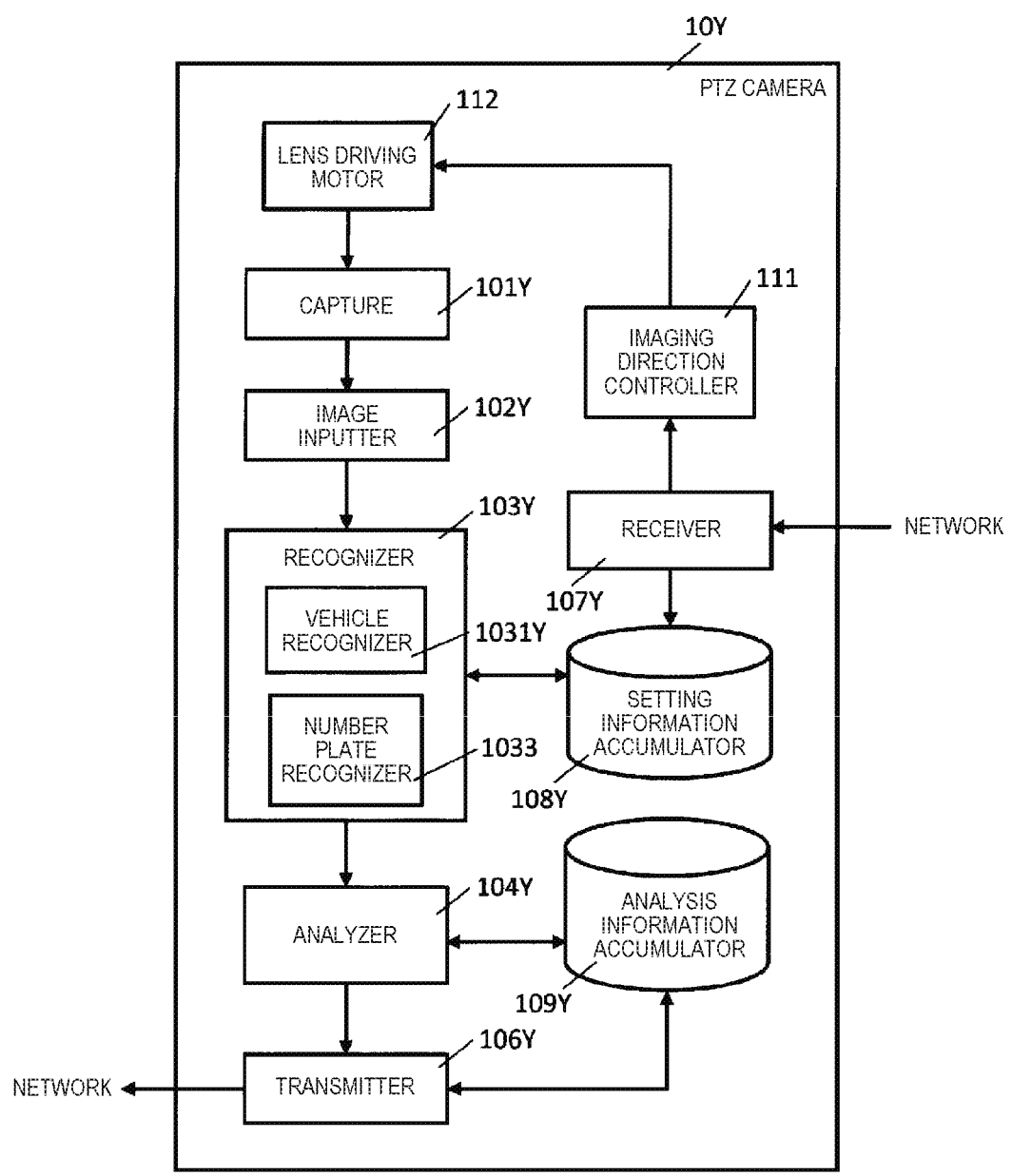
FIG. 16 is a block diagram illustrating an example of an internal configuration of a PTZ camera in detail according to Exemplary Embodiment 3.

FIG. 15 is a diagram schematically illustrating an overview of an example of a system configuration of parking place surveillance system 100Y according to Exemplary Embodiment 3. FIG. 16 is a block diagram illustrating an example of an internal configuration of PTZ camera 10Y in detail according to Exemplary Embodiment 3.

In description of FIGS. 15 and 16, the same reference numerals are given to the same configurations as the configurations described in FIGS. 1, 2, 5, 6, 11, and 12 and the description thereof will be simplified or omitted.

Parking place surveillance system 100Y is configured to include omnidirectional camera 10Z installed in parking place PRK3 in, for example, a factory, PTZ camera 10Y, surveillance situation determination server 30A, surveillance center server 50, and input device 55. Omnidirectional camera 10Z and PTZ camera 10Y are mounted at positions of predetermined installation heights of different poles not illustrated in FIG. 15. Omnidirectional camera 10Z and PTZ camera 10Y may be mounted at positions of different installation heights of the same pole not illustrated in FIG. 15.

In parking place PRK3 in the factory, berth BTH in which a plurality of vehicles TR1, TR2, TR3, TR4, TR5, TR6, TR7, TR8, and TR9 can be parked is installed. Vehicles TR1 to TR9 are, for example, trucks that carry out things manufactured in the factory or carry in things sent to the factory. However, vehicles TR1 to TR9 are not limited to the trucks. In berth BTH illustrated in FIG. 15, a parking lot can be allocated as each parking space. Specifically, the parking lots with parking lot numbers 1 to 9 can be allocated to correspond to vehicles TR1 to TR9.

Omnidirectional camera 10Z, PTZ camera 10Y, and surveillance situation determination server 30A (see FIG. 6) are connected to be able to communicate with each other via network NW1. Surveillance situation determination server 30A and surveillance center server 50 are connected to be able to communicate with each other via network NW2.

Omnidirectional camera 10Z is mounted on a pole (not illustrated) so that the entire region of berth BTH of parking place PRK3 is included as an imaging range. Omnidirectional camera 10Z acquires an omnidirectional image including berth BTH of parking place PRK3 obtained through imaging and normally or periodically transmits identification information of omnidirectional camera 10Z and the omnidirectional image to surveillance situation determination server 30A via network NW1. Information (for example, installation position information) regarding omnidirectional camera 10Z is stored in setting information accumulator 108 (see FIG. 12) of omnidirectional camera 10Z. The installation position information of omnidirectional camera 10Z is, for example, latitude, longitude, and height.

PTZ camera 10Y is mounted on a pole (not illustrated) erected in parking place PRK3, can image cover range Dcv (in other words, imaging range AR1), and images a specific vehicle (for example, vehicle TR1) using the vehicle as a center toward the imaging range in accordance with a control signal from surveillance situation determination server 30A. A distance of cover range Dcv is determined in accordance with an imaging angle of view θ and the distance from PTZ camera 10Y. The distance from PTZ camera 10Y is, for example, a length equivalent to a radius of imaging range AR1 (that is, a sector) of PTZ camera 10Y with reference to FIG. 15. PTZ camera 10Y recognizes a number plate mounted on a vehicle using a captured image of one vehicle obtained through imaging and normally or periodically transmits a recognition result of the number plate and the identification information of PTZ camera 10Y to surveillance situation determination server 30A via network NW1. Information (for example, installation position information) regarding PTZ camera 10Y is stored in setting information accumulator 108Y (see FIG. 16) of PTZ camera 10Y. The installation position information of PTZ camera 10Y is, for example, latitude, longitude, and height.

PTZ camera 10Y is configured to include capture 101Y, image inputter 102Y, recognizer 103Y, analyzer 104Y, transmitter 106Y, receiver 107Y, setting information accumulator 108Y, analysis information accumulator 109Y, imaging direction controller 111, and lens driving motor 112. Recognizer 103Y includes vehicle recognizer 1031Y and number plate recognizer 1033.

Capture 101Y includes at least a lens and an image sensor. The lens condenses light incident from the outside of omnidirectional camera 10Z and forms an image on a predetermined imaging surface of the image sensor. As the lens, for example, a lens satisfying the imaging angle of view θ is used. The image sensor is, for example, a solid-state image sensor such as a CCD or a CMOS and converts an optical image formed on the imaging surface into an electric signal.

Image inputter 102Y is configured using, for example, a processor such as a CPU, an MPU, or a DSP, performs predetermined image processing using the electric signal from capture 101Y to generate data (frame) of a captured image defined in conformity to RGB or YUV which can be recognized by human beings, and outputs the data to recognizer 103Y.

Recognizer 103Y is configured using, for example, a processor such as a CPU, an MPU, or a DSP and detects, recognizes, and tracks an object (for example, a vehicle or a number plate of the vehicle present in each parking lot of berth BTH of parking place PRK3) using the captured image from image inputter 102Y. Recognizer 103Y outputs processed results obtained by detecting, recognizing, and tracking the object to analyzer 104Y.

Vehicle recognizer 1031Y is configured using, for example, a processor such as a CPU, an MPU, or a DSP and detects a vehicle which is an example of the object using the captured image from image inputter 102Y. Vehicle recognizer 1031Y grasps the detected vehicle by recognizing which vehicle the vehicle is specifically or tracking a movement route of the vehicle. Vehicle recognizer 1031Y outputs processed results obtained by detecting, recognizing, and tracking the vehicle to analyzer 104Y.

Number plate recognizer 1033 is configured using, for example, a processor such as a CPU, an MPU, or a DSP and detects a number plate of a vehicle which is an example of an object using the captured image from image inputter 102Y. Number plate recognizer 1033 recognizes information regarding the detected number plate. Number plate recognizer 1033 outputs processed results obtained by detecting and recognizing the number plate to analyzer 104Y.

Analyzer 104Y is configured using, for example, a processor such as a CPU, an MPU, or a DSP and performs various analysis processes on each object using the processed results obtained by detecting, recognizing, and tracking the object and output from recognizer 103Y. Analyzer 104Y stores the various analysis results in analysis information accumulator 109Y. Here, analyzer 104Y may perform the various analysis processes in accordance with a method disclosed in, for example, Japanese Patent Unexamined Publication No. 2014-022970 (for example, see a target feature analyzer or a bandwidth component detector in FIG. 1).

For example, in a case in which the object is a vehicle, analyzer 104Y performs a process of determining whether the vehicle is parked. Specifically, analyzer 104Y analyzes a movement trajectory of the vehicle and determines whether the vehicle is parked in a predetermined parking lot in parking place PRK3. Analyzer 104Y determines whether a position at which the vehicle is parked is a parking-permitted position or a parking-prohibited position (that is, whether the vehicle is parked illegally). In a case in which analyzer 104Y determines that the position is in a parking-permitted area, analyzer 104Y calculates and determines how many vehicles can be parked in the parking lots of berth BTH of parking place PRK3.

Transmitter 106Y transmits the analysis result of analyzer 104Y or the recognition result of number plate recognizer 1033 to surveillance situation determination server 30A. Transmitter 106Y may acquire various analysis results obtained by processing a captured image from image inputter 102Y by analyzer 104Y from analysis information accumulator 109 and transmit the various analysis results to surveillance situation determination server 30A.

Receiver 107Y receives an imaging instruction transmitted from surveillance situation determination server 30A and outputs the imaging instruction to imaging direction controller 111. Receiver 107Y receives various kinds of setting information regarding PTZ camera 10Y and stores the setting information in setting information accumulator 108Y. In FIG. 16, transmitter 106Y and receiver 107Y which are separately included has been described, but it is regardless to say that transmitter 106Y and receiver 107Y may be collectively configured as a communicator.

Setting information accumulator 108Y is configured using, for example, a semiconductor memory or a hard disk device and stores the various kinds of setting information (for example, information regarding the height of PTZ camera 10Y) output from receiver 107Y. Setting information accumulator 108Y stores various kinds of setting information necessary in an operation of PTZ camera 10Y.

Analysis information accumulator 109Y is configured using, for example, a semiconductor memory or a hard disk device and stores various analysis results by analyzer 104Y.

Imaging direction controller 111 is configured using, for example, a processor such as a CPU, an MPU, or a DSP, controls at least one of a pan direction and a tilt direction as an imaging direction of PTZ camera 10Y in accordance with an imaging instruction (for example, an instruction to change an angle of view for imaging a vehicle which is a number plate recognition target) transmitted from surveillance situation determination server 30A, and outputs a control signal for changing a zoom magnification to lens driving motor 112 as necessary.

Lens driving motor 112 drives a lens included in capture 101Y in accordance with a control signal from imaging direction controller 111, changes the imaging direction, and adjusts a focal distance of the lens to change the zoom magnification.

Next, operation procedures at the time of recognizing a number plate in parking place surveillance system 100Y according to the exemplary embodiment will be described with reference to FIGS. 17 and 18.

Figure 17:
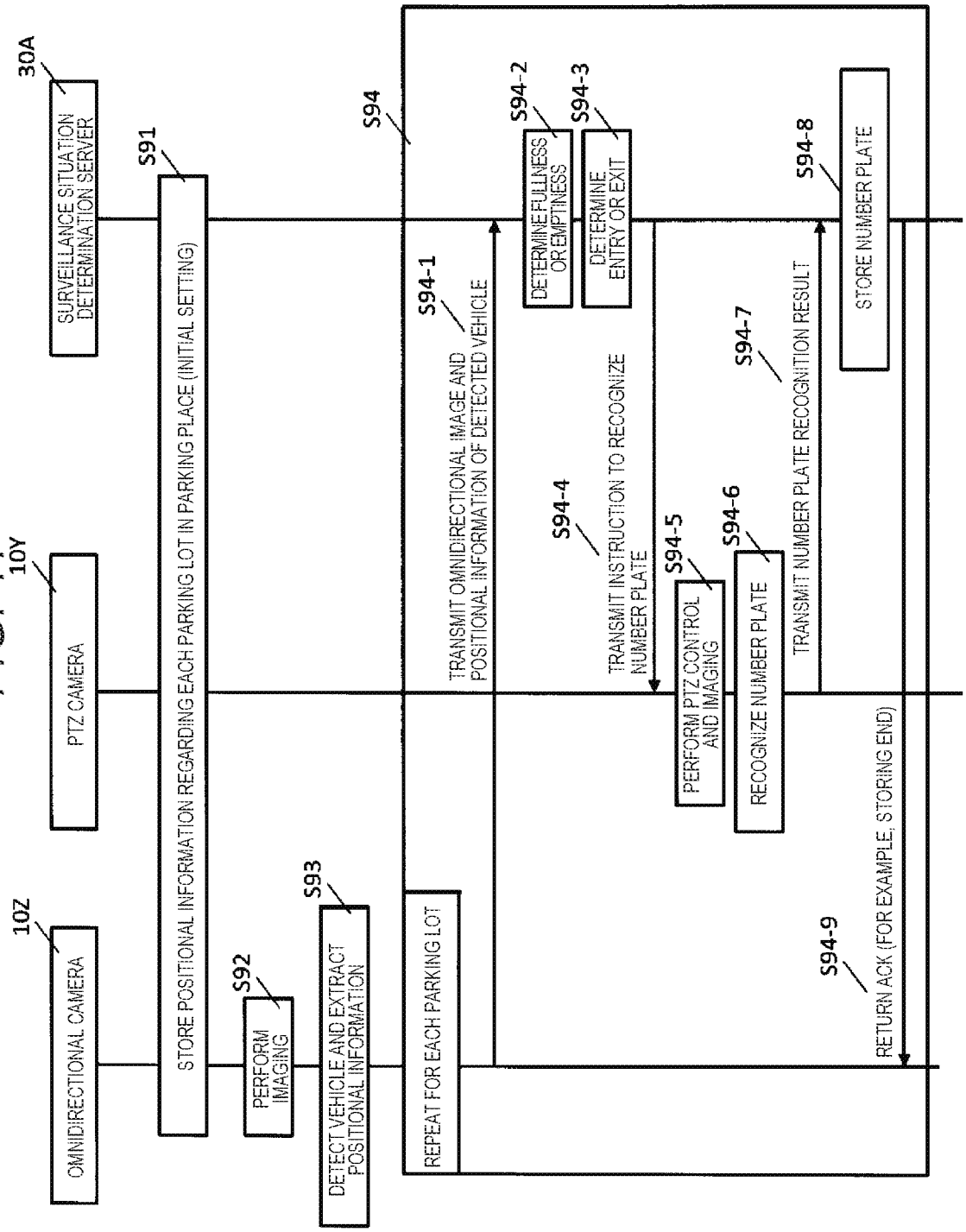
FIG. 17 is a sequence diagram illustrating a first example of an operation procedure in detail at the time of recognizing a number plate in a parking place surveillance system according to Exemplary Embodiment 3.

FIG. 17 is a sequence diagram illustrating a first example of an operation procedure in detail at the time of recognizing a number plate in parking place surveillance system 100Y according to Exemplary Embodiment 3. FIG. 18 is a sequence diagram illustrating a second example of an operation procedure in detail at the time of recognizing a number plate in parking place surveillance system 100Y according to Exemplary Embodiment 3.

In the first example illustrated in FIG. 17, omnidirectional camera 10Z detects a vehicle parked in the parking lot and PTZ camera 10Y recognizes a number plate of the vehicle.

Figure 18:
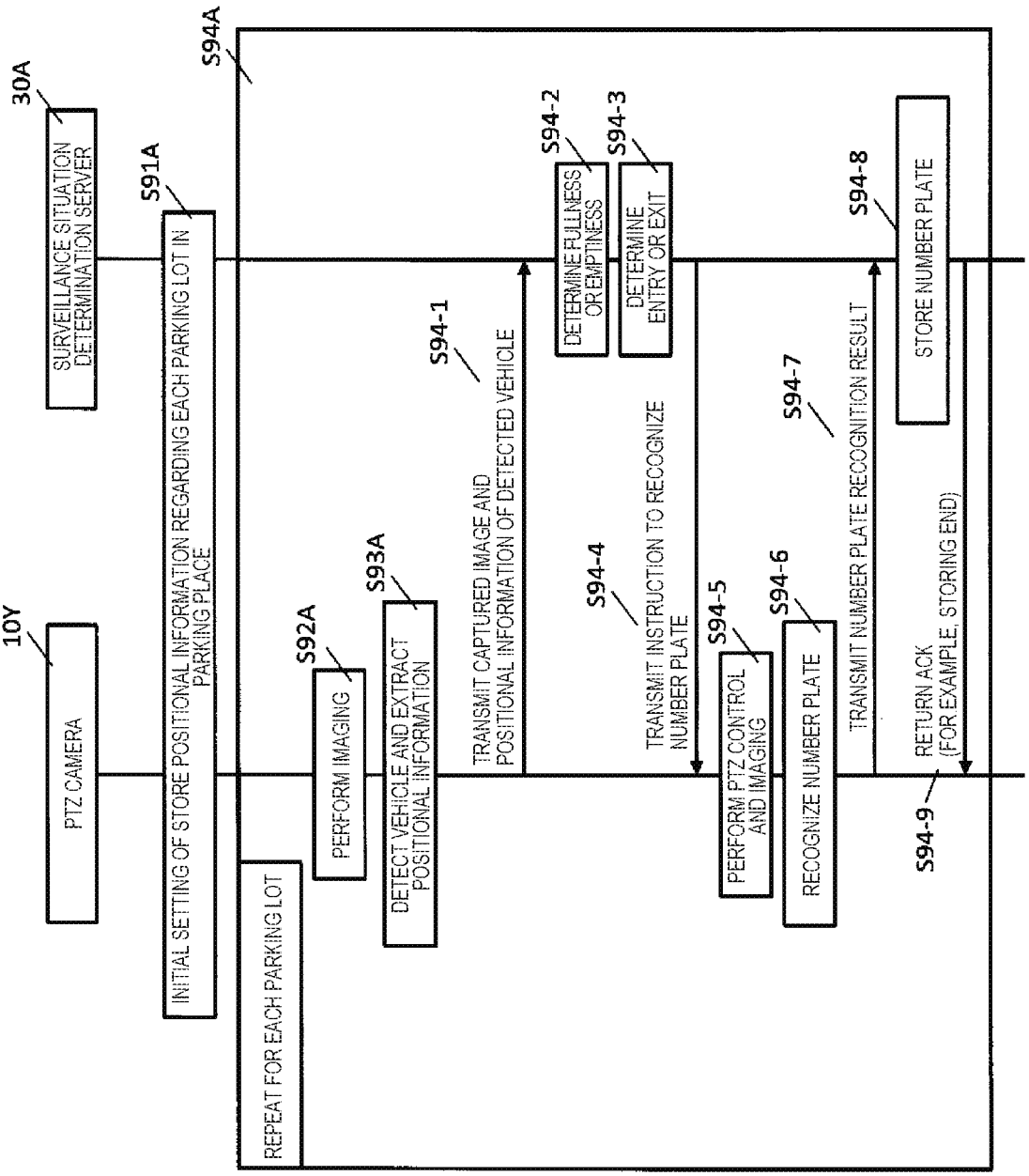
FIG. 18 is a sequence diagram illustrating a second example of an operation procedure in detail at the time of recognizing a number plate in a parking place surveillance system according to Exemplary Embodiment 3.

On the other hand, in the second example illustrated in FIG. 18, as a variation of the first example illustrated in FIG. 17, PTZ camera 10Y detects the vehicle parked in the parking lot and further recognizes a number plate of the vehicle without using omnidirectional camera 10Z. In description of each process illustrated in FIG. 18, the same step numerals are given to the same content as each process illustrated in FIG. 17 and the description thereof will be simplified or omitted.

In FIG. 17, as initial setting, positional information of the parking lots of parking lot numbers 1 to 9 installed in berth BTH in parking place PRK3 is stored in regard to omnidirectional camera 10Z, PTZ camera 10Y, and surveillance situation determination server 30A (S91). Specific management starts after step S91.

After the initial setting of step S91, omnidirectional camera 10Z captures an omnidirectional image of a subject (for example, each parking lot of parking lot numbers 1 to 9 of berth BTH of parking place PRK3) set in omnidirectional camera 10Z (S92). Omnidirectional camera 10Z detects a vehicle parked in one parking lot using an omnidirectional image captured in step S92 and extracts positional information (for example, coordinates of the omnidirectional image) of the detected vehicle and entry time information at which parking of the vehicle is detected (S93).

A process after step S93 (that is, a process of step S94) is repeatedly performed, for example, for each parking lot of parking lot numbers 1 to 9 after a vehicle parked in the parking lot is detected in step S93. In other words, before a number plate is recognized by PTZ camera 10Y, omnidirectional camera 10Z beforehand grasps in which parking lot of berth BTH the vehicle is parked. Thus, omnidirectional camera 10Z corresponds to parking of a vehicle in a parking lot and PTZ camera 10Y corresponds to recognition of a number plate, and thus PTZ camera 10Y can focus on a process of recognizing a number plate. It is possible to acquire information regarding a number plate of a vehicle parked in real time without causing delay of the recognition of the number plate.

Specifically, omnidirectional camera 10Z transmits the omnidirectional image captured in step S92, the positional information of the vehicle (detected vehicle) detected in step S93, and the entry time information at which the parking of the vehicle is detected to surveillance situation determination server 30A (S94-1). In a case in which omnidirectional camera 10Z does not detect the vehicle parked in the parking lot in the process of step S94-1, the omnidirectional image captured in step S92 and a message indicating that the vehicle is not parked in the parking lot which is a current process target of step S94 are transmitted to surveillance situation determination server 30A. Thus, surveillance situation determination server 30A can easily determine fullness or emptiness of the vehicle in the parking lot which is the current process target of step S94.

In surveillance situation determination server 30A, for example, full or empty detector 326 of image analyzer 32A determines whether the vehicle is parked in the parking lot of the current process target of step S94 using the positional information of the parking lot stored in the initial setting of step S91 and the positional information transmitted in step S94-1 (S94-2).

Surveillance situation determination server 30A determines entry or exit of the vehicle in the parking lot which is the current process target of step S94 based on a determination result of step S94-2 (S94-3). For example, in a case in which "no parking" is determined in the full or empty determination (see step S94-2) in the corresponding parking lot at the time of the previous process of step S94 and "parking" is determined in the full or empty determination in the same parking lot as that at the time of the current process of step S94, surveillance situation determination server 30A determines "entry".

Conversely, in a case in which "parking" is determined in the full or empty determination (see step S94-2) in the corresponding parking lot at the time of the previous process of step S94 and "no parking" is determined in the full or empty determination in the same parking lot as that at the time of the current process of step S94, surveillance situation determination server 30A determines "exit".

In a case in which "no parking" is determined in the full or empty determination (see step S94-2) in the corresponding parking lot at the time of the previous process of step S94 and "no parking" is determined in the full or empty determination in the same parking lot as that at the time of the current process of step S94, surveillance situation determination server 30A determines "exit".

Similarly, in a case in which "parking" is determined in the full or empty determination (see step S94-2) in the corresponding parking lot at the time of the previous process of step S94 and "parking" is determined in the full or empty determination in the same parking lot as that at the time of the current process of step S94, surveillance situation determination server 30A determines "entry".

Surveillance situation determination server 30A transmits an instruction to recognize the number plate of the vehicle in the parking lot on which "entry" is determined in step S94-3 to PTZ camera 10Y (S94-4).

When PTZ camera 10Y receives the recognition instruction from surveillance situation determination server 30A, PTZ camera 10Y images the vehicle of the corresponding parking lot by orienting the imaging direction to the parking lot included in the recognition instruction using the PTZ control (that is, the pan, tilt, and zoom functions) (S94-5) and recognizes the number plate using a captured image (S94-6). PTZ camera 10Y associates (tags) the captured image in step S94-5 with a recognition result of the number plate in step S94-6 to transmit the captured image and the recognition result of the number plate to surveillance situation determination server 30A (S94-7).

Surveillance situation determination server 30A receives the captured image and the number plate recognition result transmitted in step S94-7 and stores the captured image and the number plate recognition result in association with (by tagging) the entry time information at which the parking of the vehicle is detected in information accumulator 37A (S94-8). Surveillance situation determination server 30A transmits a message (for example, acknowledgment (ACK)) indicating that the recognition (in other words, reading) of the number plate of the vehicle parked in the parking lot ends in regard to the parking lot which is the current process target of step S94 to omnidirectional camera 10Z (S94-9). Thus, omnidirectional camera 10Z can recognize the end of the process related to the parking lot which is the current process target of step S94 and can start the process of step S94 in regard to a subsequent parking lot (for example, the parking lot of adjacent parking lot number 2 in a case in which the current parking lot is parking lot number 1).

In FIG. 18, as initial setting, positional information of the parking lots of parking lot numbers 1 to 9 installed in berth BTH in parking place PRK3 is stored in regard to PTZ camera 10Y and surveillance situation determination server 30A (S91A). Specific management starts after step S91A. That is, for example, the process of step S94 is repeatedly performed for each parking lot of parking lot numbers 1 to 9.

Specifically, PTZ camera 10Y captures an image of a parking lot as a subject (for example, each parking lot of parking lot numbers 1 to 9 of berth BTH of parking place PRK3) set in PTZ camera 10Y by focusing on a parking lot which is the current process target of step S94 (S92A). PTZ camera 10Y detects whether there is a vehicle parked in the parking lot which is the current process target of step S94A using the captured image of step S92A and extracts the positional information (for example, coordinates on the captured image) of the detected vehicle and the entry time information at which the parking of the vehicle is detected (S93A).

Specifically, PTZ camera 10Y transmits the captured image captured in step S92A, the positional information of the vehicle (detected vehicle) detected in step S93A, and the entry time information at which the parking of the vehicle is detected to surveillance situation determination server 30A (S94-1). In a case in which PTZ camera 10Y does not detect the vehicle parked in the parking lot in the process of step S94-1, the omnidirectional image captured in step S92A and a message indicating that the vehicle is not parked in the parking lot which is a current process target of step S94A are transmitted to surveillance situation determination server 30A. Thus, surveillance situation determination server 30A can easily determine fullness or emptiness of the vehicle in the parking lot which is the current process target of step S94A.

In surveillance situation determination server 30A, for example, full or empty detector 326 of image analyzer 32A determines whether the vehicle is parked in the parking lot of the current process target of step S94A using the positional information of the parking lot stored in the initial setting of step S91A and the positional information transmitted in step S94-1 (S94-2).

Surveillance situation determination server 30A determines entry or exit of the vehicle in the parking lot which is the current process target of step S94A based on a determination result of step S94-2 (S94-3). For example, in a case in which "no parking" is determined in the full or empty determination (see step S94-2) in the corresponding parking lot at the time of the previous process of step S94A and "parking" is determined in the full or empty determination in the same parking lot as that at the time of the current process of step S94A, surveillance situation determination server 30A determines "entry".

Conversely, in a case in which "parking" is determined in the full or empty determination (see step S94-2) in the corresponding parking lot at the time of the previous process of step S94A and "no parking" is determined in the full or empty determination in the same parking lot as that at the time of the current process of step S94A, surveillance situation determination server 30A determines "exit".

In a case in which "no parking" is determined in the full or empty determination (see step S94-2) in the corresponding parking lot at the time of the previous process of step S94A and "no parking" is determined in the full or empty determination in the same parking lot as that at the time of the current process of step S94A, surveillance situation determination server 30A determines "exit".

Similarly, in a case in which "parking" is determined in the full or empty determination (see step S94-2) in the corresponding parking lot at the time of the previous process of step S94A and "parking" is determined in the full or empty determination in the same parking lot as that at the time of the current process of step S94A, surveillance situation determination server 30A determines "entry".

Surveillance situation determination server 30A transmits an instruction to recognize the number plate of the vehicle in the parking lot on which "entry" is determined in step S94-3 to PTZ camera 10Y (S94-4).

When PTZ camera 10Y receives the recognition instruction from surveillance situation determination server 30A, PTZ camera 10Y images the vehicle of the corresponding parking lot by orienting the imaging direction to the parking lot included in the recognition instruction using the PTZ control (that is, the pan, tilt, and zoom functions) (S94-5) and recognizes the number plate using a captured image (S94-6). PTZ camera 10Y associates (tags) the captured image in step S94-5 with a recognition result of the number plate in step S94-6 to transmit the captured image and the recognition result of the number plate to surveillance situation determination server 30A (S94-7).

Surveillance situation determination server 30A receives the captured image and the number plate recognition result transmitted in step S94-7 and stores the captured image and the number plate recognition result in association with (by tagging) the entry time information at which the parking of the vehicle is detected in information accumulator 37A (S94-8). Surveillance situation determination server 30A transmits a message (for example, ACK) indicating that the recognition (in other words, reading) of the number plate of the vehicle parked in the parking lot ends in regard to the parking lot which is the current process target of step S94A to PTZ camera 10Y (S94-9). Thus, PTZ camera 10Y can recognize the end of the process related to the parking lot which is the current process target of step S94A and can start the process of step S94A in regard to a subsequent parking lot (for example, the parking lot of adjacent parking lot number 2 in a case in which the current parking lot is parking lot number 1).

In this way, parking place surveillance system 100Y according to the exemplary embodiment further includes omnidirectional camera 10Z capable of capturing an omnidirectional image of berth BTH of parking place PRK3 that has the parking lot (an example of a parking region) for each vehicle. When omnidirectional camera 10Z detects parking of a vehicle in the parking lot, PTZ camera 10Y orients the imaging direction to the parking lot to perform imaging, recognizes a number plate of the vehicle shown in the captured image using the captured image of the parking lot, acquires the information regarding the number plate and the captured image of the vehicle parked in the parking lot, and transmits the information regarding the number plate and the captured image of the vehicle to surveillance situation determination server 30A. Surveillance situation determination server 30A records the information regarding the number plate and the captured image of the parked vehicle transmitted from PTZ camera 10Y in association with each other (that is, by tagging) in information accumulator 37A. Thus, in parking place surveillance system 100Y, parking of a vehicle in the parking lot is detected by omnidirectional camera 10Z and a number plate is recognized by PTZ camera 10Y. Thus, it is possible to cause PTZ camera 10Y to focus on the process of recognizing the number plate, and thus it is possible to acquire the information regarding the number plate of the parked vehicle in real time without causing delay in the recognition of the number plate.

PTZ camera 10Y images the parking lot of each vehicle installed in parking place PRK3 at each given time, recognize the number plate of the vehicle shown in the captured image using the captured image of the parking region in accordance with the detection of the parking of the vehicle in the parking lot, acquires the information regarding the number plate and the captured image of the vehicle parked in the parking lot, and transmits the information regarding the number plate and the captured image of the vehicle to surveillance situation determination server 30A. Surveillance situation determination server 30A records the information regarding the number plate and the captured image transmitted from PTZ camera 10Y in association with each other (by tagging) in information accumulator 37A. Thus, parking place surveillance system 100Y has a simple configuration in which at least PTZ camera 10Y and surveillance situation determination server 30A are used without using omnidirectional camera 10Z. Thus, it is possible to periodically acquire the information regarding the number plate of the vehicle parked in each parking lot of berth BTH of parking place PRK3.

Omnidirectional camera 10Z periodically (that is, repeatedly) images the parking lot for each vehicle and determines whether the vehicle enters or exits from each parking lot using the captured image (that is, the omnidirectional image) of the parking lot for each vehicle. When omnidirectional camera 10Z detects the exit of the vehicle from the parking lot, omnidirectional camera 10Z acquires the information regarding the number plate of the vehicle read by PTZ camera 10Y at the time of entry and exit time information at which the exit of the vehicle parked in the parking lot and transmits the information regarding the number plate of the vehicle and the exit time information to surveillance situation determination server 30A. Surveillance situation determination server 30A records the information regarding the number plate and the exit time information transmitted from omnidirectional camera 10Z in association with each other (by tagging) in information accumulator 37A. Thus, surveillance situation determination server 30A can record information or data serving as a proof of exit of a vehicle parked in the parking lot of berth BTH of parking place PRK3 along with the information of the number plate of the vehicle. For example, it is possible to support work of causing the surveillance staff to easily confirm whether the vehicle appropriately exits later.

Background to Fourth Exemplary Embodiment

In technologies of the related art including Japanese Patent Unexamined Publication No. 2008-152460 described above, a flap plate or a gate is used to prevent illegal parking of a vehicle in a parking place. For the flap plate, it is pointed out that installation cost is high and breakdown occurs many times. In recent years, a sensor (for example, an infrared sensor, a magnetic sensor, or an ultrasonic sensor) is mounted on a pole erected in a parking place without using a flap plate or a gate and entry or exit of a vehicle to or from a parking space in the parking place is detected using a sensing result of the sensor to surveil a parking situation.

However, in the technology of the related art, for example, there is a problem that a recognition ratio of the sensor is not necessarily 100% and there is a possibility that a parking fee may not correctly be charged to a user of a parking place.

Fourth Exemplary Embodiment

Accordingly, in Exemplary Embodiment 4, an example of a parking place surveillance system that allows a user scheduling to park a vehicle in a parking place in advance to have a reservation, prompts the user to confirm the parking using a captured image of the parking place captured by a camera, and charges a charging fee in the approval of the confirmation will be described.

Figure 19:
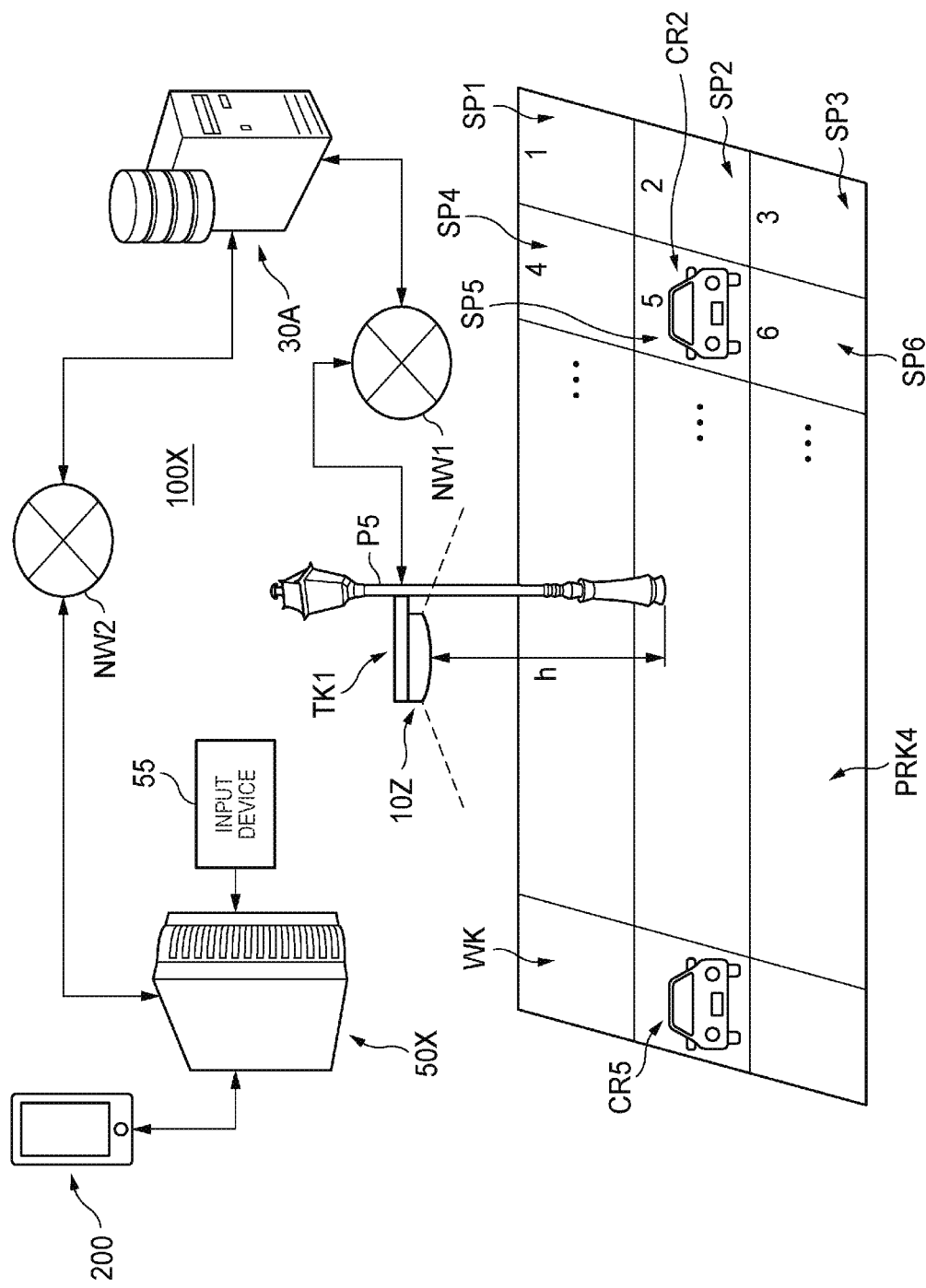
FIG. 19 is a diagram schematically illustrating an overview of an example of a system configuration of a parking place surveillance system according to Exemplary Embodiment 4.
Figure 20A:
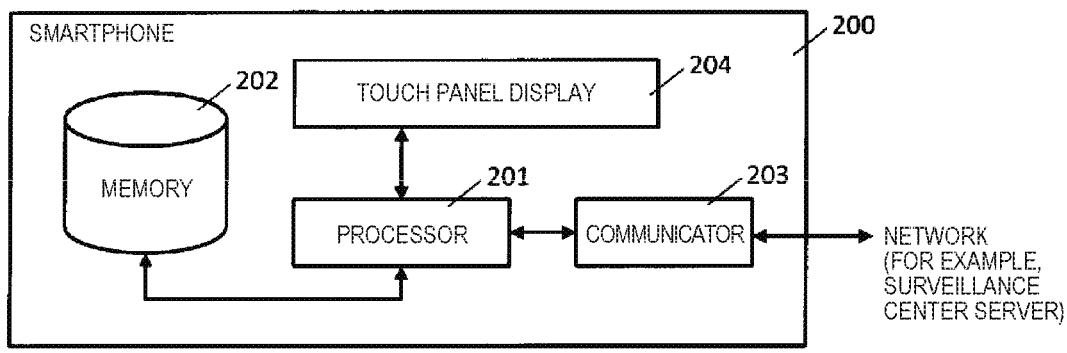
FIG. 20A is a block diagram illustrating an example of an internal configuration of a smartphone in detail according to Exemplary Embodiment 4.
Figure 20B:
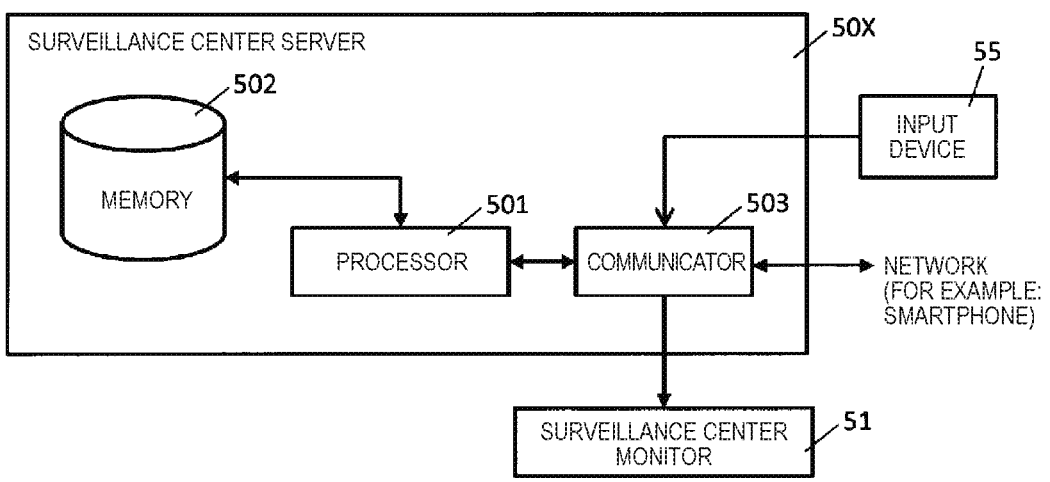
FIG. 20B is a block diagram illustrating an example of an internal configuration of a surveillance sensor server in detail according to Exemplary Embodiment 4.

FIG. 19 is a diagram schematically illustrating an overview of an example of a system configuration of parking place surveillance system 100X according to Exemplary Embodiment 4. FIG. 20A is a block diagram illustrating an example of an internal configuration of smartphone 200 in detail according to Exemplary Embodiment 4. FIG. 20B is a block diagram illustrating an example of an internal configuration of surveillance center server 50X in detail according to Exemplary Embodiment 4.

In description of FIGS. 19 and 20B, the same reference numerals are given to the same configurations as the configurations described in FIGS. 1, 2, 5, 6, 11, 12, 15, and 16 and the description thereof will be simplified or omitted.

Parking place surveillance system 100X is configured to include omnidirectional camera 10Z installed in parking place PRK4, surveillance situation determination server 30A, surveillance center server 50X, smartphone 200, and input device 55. In parking place PRK4, pole P5 is erected and omnidirectional camera 10Z is installed on pole P5 through mounting bracket TK1. Omnidirectional camera 10Z is installed at a position of height h from the ground.

In FIG. 19, only one pole is illustrated in parking place PRK4 to simplify the description, but the number of installed poles is not limited to 1.

Surveillance situation determination server 30A and surveillance center server 50X are connected to be able to communicate with each other via network NW2. Smartphone 200 and surveillance center server 50X are connected to be able to communicate with each other via a network. In FIG. 19, the network in which smartphone 200 and surveillance center server 50X are connected is not illustrated. Smartphone 200 and surveillance center server 50X may be connected to each other via network NW2.

In parking place PRK4, parking spaces SP1, SP2, SP3, SP4, SP5, and SP6 for which a plurality of vehicles (for example, vehicles CR2) in which advance reservation is registered can be parked and parking space WK (an example of a parking region) in which a vehicle (for example, a vehicle CR5) for which no advance reservation is registered can be parked are installed in advance. FIG. 19 illustrates a situation in which vehicle CR2 for which the advance reservation is registered is parked in parking space SP2 and vehicle CR5 in which no advance reservation is registered are parked in parking space WK.

Smartphone 200 is carried to be used by a user who makes an advance reservation of the parking of parking place PRK4 described above in parking place surveillance system 100X according to the exemplary embodiment. Smartphone 200 is configured to include processor 201, memory 202, communicator 203, and touch panel display 204.

Processor 201 is configured using, for example, a processor such as a CPU, an MPU, or a DSP and performs a control process of generally controlling an operation of each unit of smartphone 200, processes of inputting and outputting data to and from other units, a data arithmetic (calculation) process, and a data storing process.

Memory 202 includes, for example, a read-only memory (ROM) that stores data of setting values or a program that defines an operation of smartphone 200 and a random access memory (RAM) that temporarily stores various kinds of information or data used at the time of each process of processor 201.

In smartphone 200, an application for making an advance reservation of parking of parking place PRK4 is installed in advance to be executable in parking place surveillance system 100X according to the exemplary embodiment. Memory 202 stores data (for example, various setting values) or a program executing the application. Processor 201 can execute the above-described application for making an advance reservation by reading the data and the program from memory 202.

Communicator 203 communicates (for example, transmits and receives information or data) with surveillance center server 50X via a network (for example, a wireless network).

Touch panel display 204 receives an input operation by, for example, a stylus pen or a finger of a user (that is, a user who makes an advance reservation of the parking of parking place PRK4 described above) of smartphone 200 and displays various kinds of information or data delivered from processor 201.

Surveillance center server 50X which is an example of a second server is configured to include processor 501, memory 502, and communicator 503. The configuration of surveillance center server 50X may be the same as the internal configuration of surveillance center server 50 according to each exemplary embodiment.

Processor 501 is configured using, for example, a processor such as a CPU, an MPU, or a DSP and performs a control process of generally controlling an operation of each unit of surveillance center server 50X, processes of inputting and outputting data to and from other units, a data arithmetic (calculation) process, and a data storing process.

Memory 502 which is an example of a second accumulator includes, for example, a ROM that stores data of setting values or a program that defines an operation of surveillance center server 50X and a RAM that temporarily stores various kinds of information or data used at the time of each process of processor 501.

Surveillance center server 50X stores reservation information (for example, information such as a user ID, a parking time, or a parking space (parking frame)) used to make an advance reservation of parking place PRK4 and input with smartphone 200 in association with the identification information of smartphone 200 in memory 502.

Communicator 503 communicates (for example, transmits and receives information or data) with smartphone 200 or surveillance situation determination server 30A via a network (for example, a wireless network).

Next, an operation overview of parking place surveillance system 100X according to the exemplary embodiment will be described with reference to FIG. 21.

FIG. 21 is a diagram schematically illustrating an example of an operation overview of parking place surveillance system 100X according to Exemplary Embodiment 4.

First, the user uses smartphone 200 carried by the user to execute the application for making an advance reservation of parking of parking place PRK4 and performs a process for user registration in the application. For example, the user inputs a user ID, a password, a mail address, and a credit card on smartphone 200 and requests smartphone 200 to perform a registration process. Smartphone 200 transmits the various kinds of input information to surveillance center server 50X in accordance with the input operation by the user. Surveillance center server 50X registers the various kinds of information transmitted from smartphone 200 in memory 502. The various kinds of registered information are used in an inquiry of the user.

In FIG. 21, the user operates smartphone 200 to first activate and execute the application for making an advance reservation of parking of parking place PRK4. Smartphone 200 accesses a portal site related to the advance reservation in the application, acquires various kinds of information such as the parking space (for example, parking space SP2) of parking place PRK4 input through the input operation by the user and a parking start time, and transmits a request for the advance reservation including the various kinds of information to surveillance center server 50X (T1). In management of parking place surveillance system 100X, charging a basic fee (for example, 100 yens) (for example, charging a fee with a credit card number corresponding to the user ID) may be performed at the time of the advance reservation of the user.

After step T1, when the user heads his or her vehicle to parking place PRK4 and arrives at parking place PRK4, the user parks the vehicle in a parking space (for example, parking space SP2) in which the user has made a reservation at a parking start time input at the time of the advance reservation (T2).

Omnidirectional camera 10Z normally or periodically transmits an omnidirectional image of parking place PRK4 to surveillance situation determination server 30A. When the parking of vehicle CR2 of the user in parking space SP2 (a parking frame) in which the advance reservation is made is detected using the omnidirectional image transmitted from omnidirectional camera 10Z, surveillance situation determination server 30A inquires to surveillance center server 50X about the advance reservation at the parking start time in parking space SP2.

Surveillance center server 50X transmits a mail including an omnidirectional image captured by omnidirectional camera 10Z or a cut image of vehicle CR2 which is based on the omnidirectional image to smartphone 200 of the user who has made the reservation using the user ID and the mail address of the advance reservation corresponding to parking space SP2 and the parking start time (T3). An omnidirectional image equivalent to a top view of vehicle CR2 is appended to the mail and text of a confirmation sentence (for example, "Entry of vehicle is detected in XX parking at 10:00. Is this your car?") of the parking is described in this mail.

After step T3, in a case in which the user uses smartphone 200 to perform an input operation of replying to a message indicating understanding of the mail confirmation sentence transmitted in step T3, smartphone 200 transmits a message indicating user's approval of the confirmation sentence to surveillance center server 50X. When surveillance center server 50X receives the message from smartphone 200, surveillance center server 50X starts charging a parking fee going back to the parking start time input in the advance reservation (T4).

After step T4, the parking of vehicle CR2 of the user continues for a short time (T5).

After step T5, the user is assumed to get on vehicle CR2 of the user and leave (exit from) parking space SP2 of parking place PRK4. Omnidirectional camera 10Z normally or periodically transmits the omnidirectional image of parking place PRK4 to surveillance situation determination server 30A. Surveillance situation determination server 30A notifies surveillance center server 50X that the leaving (exit) of vehicle CR2 of the user from parking space SP2 (the parking frame) in which the advance reservation has been made is detected using the omnidirectional image transmitted from omnidirectional camera 10Z.

Surveillance center server 50X transmits a mail of a message indicating use completion of the reservation of parking space SP2 to smartphone 200 of the user who has made the reservation using the user ID and the mail address of the advance reservation corresponding to parking space SP2 and the parking start time (T6). Text of a sentence (for example, "Leaving of vehicle is detected in XX parking at 10:00. Fee is 300 yens. Thank you for using") indicating the use completion of the reservation of parking space SP2 is described in this mail.

Next, operation procedures at the time of entry and exit of a vehicle in parking place surveillance system 100X according to the exemplary embodiment will be described with reference to FIGS. 22 and 23.

FIG. 22 is a sequence diagram illustrating an example of an operation sequence in detail at the time of entry of a vehicle in parking place surveillance system 100X according to Exemplary Embodiment 4. FIG. 23 is a sequence diagram illustrating an example of an operation sequence in detail at the time of exit of a vehicle in parking place surveillance system 100X according to Exemplary Embodiment 4.

Figure 23:
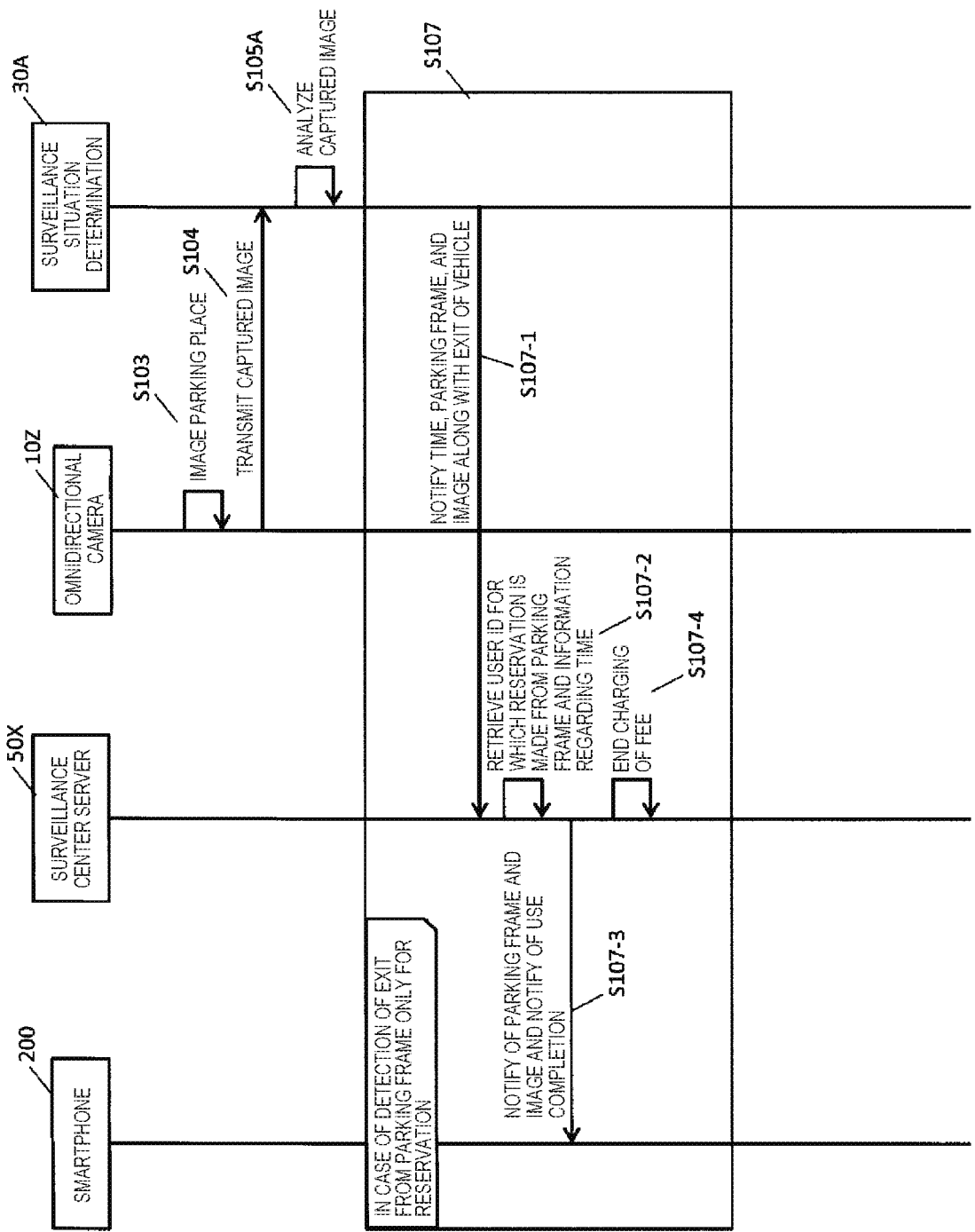
FIG. 23 is a sequence diagram illustrating an example of an operation sequence in detail at the time of exit of a vehicle in the parking place surveillance system according to Exemplary Embodiment 4.

In description of each process illustrated in FIG. 23, the same step numerals are given to the same content as each process illustrated in FIG. 22 and the description thereof will be simplified or omitted.

In FIG. 22, the user operates smartphone 200 carried by the user to activate and execute the application for making an advance reservation of parking of parking place PRK4. Smartphone 200 accesses a portal site related to the advance reservation in the application, acquires various kinds of information such as the parking space (for example, parking space SP2) of parking place PRK4 input through the input operation by the user, a parking start time, and the user ID and transmits a request for the advance reservation including the various kinds of information to surveillance center server 50X (S101).

Surveillance center server 50X stores the various kinds of information (for example, parking space SP2 of parking place PRK4, the parking start time, and the user ID) transmitted in step S101 as advance reservation information of parking place PRK4 in association with each other in memory 502 (S102).

Omnidirectional camera 10Z images parking place PRK4 as a subject (S103) and transmits an omnidirectional image (captured image) obtained by the imaging to surveillance situation determination server 30A (S104).

Surveillance situation determination server 30A performs analysis using the omnidirectional image transmitted in step S104 (S105). For example, surveillance situation determination server 30A analyzes whether entry of a vehicle to a parking space (parking frame) only for reservation included in the advance reservation information registered in step S102 is detected.

In a case in which surveillance situation determination server 30A determines that the entry of the vehicle to the parking space (parking frame) only for reservation included in the advance reservation information registered in step S102 is detected, the process of step S106 is performed.

Specifically, surveillance situation determination server 30A notifies (transmits) surveillance center server 50X of a time at which the parking is detected, the parking space (parking frame), and the captured image of the vehicle by associating a message indicating the detection of the entry of the vehicle to the parking space (parking frame) only for reservation included in the advance reservation information registered in step S102 (S106-1).

In accordance with the notification from surveillance situation determination server 30A in step S106-1, surveillance center server 50X retrieves the user ID for which the advance reservation is registered from the parking space (parking frame) included in the notification and information regarding the time at which the parking is detected with reference to memory 502 (S106-2).

Surveillance center server 50X generates and transmits a mail including an omnidirectional image captured by omnidirectional camera 10Z or a cut image of the vehicle which is based on the omnidirectional image to smartphone 200 of the user who has made the reservation using the user ID obtained through the retrieval in step S106-2 and the mail address of the user corresponding to the user ID (S106-3). This mail is used to confirm to the user that there is no problem (in other words, illegal parking or not) in the vehicle of the user along with notification of the detection of the parking (entry) and the captured image, as described with reference to step T3 of FIG. 21.

In a case in which the user performs an input operation on smartphone 200 to reply to the mail transmitted in step S106-3 with a message indicating approval of user confirmation to indicate that the user understands that there is no problem in the parking (entry) of the vehicle, smartphone 200 transmits the message indicating the approval of the user confirmation to surveillance center server 50X (S106-4). When surveillance center server 50X receives the message from smartphone 200, surveillance center server 50X starts charging a parking fee going back to the parking start time input in the advance reservation (S106-5).

In FIG. 23, surveillance situation determination server 30A performs analysis using the omnidirectional image transmitted in step S104 (S105A). For example, surveillance situation determination server 30A analyzes whether entry of a vehicle to a parking space (parking frame) only for reservation included in the advance reservation information registered in step S102 is detected.

In a case in which surveillance situation determination server 30A determines that the exit of the vehicle from the parking space (parking frame) only for reservation included in the advance reservation information registered in step S102 illustrated in FIG. 22 is detected, the process of step S107 is performed.

Specifically, surveillance situation determination server 30A notifies (transmits) surveillance center server 50X of a time at which the exit is detected, the parking space (parking frame), and the captured image of the vehicle by associating a message indicating the detection of the exit of the vehicle from the parking space (parking frame) only for reservation included in the advance reservation information registered in step S102 (S107-1).

In accordance with the notification from surveillance situation determination server 30A in step S107-1, surveillance center server 50X retrieves the user ID for which the advance reservation is registered from the parking space (parking frame) included in the notification and information regarding the time at which the parking is detected with reference to memory 502 (S107-2).

Surveillance center server 50X generates and transmits a mail including information regarding the parking space (parking frame), a message indicating use completion of the parking space (parking frame), and an omnidirectional image captured by omnidirectional camera 10Z or a cut image of the vehicle which is based on the omnidirectional image to smartphone 200 of the user who has made the advance reservation using the user ID obtained through the retrieval in step S107-2 and the mail address of the user corresponding to the user ID (S107-3). This mail is used to notify of the detection of the exit from the parking space (parking frame) and the captured image and notify the user of the use completion of the parking space (parking frame) of the vehicle of the user, as described with reference to step T6 of FIG. 21.

Surveillance center server 50X ends the charging of the parking fee after step S107-3 (S107-4).

In this way, in parking place surveillance system 100X according to the exemplary embodiment, surveillance center server 50X registers and stores the advance reservation information (an example of reservation information) of the parking space (an example of a parking region) in parking place PRK4 input from smartphone 200 (an example of a user terminal) in association with the identification information of smartphone 200 in memory 502. When entry of a vehicle to the parking space is detected based on a captured image of omnidirectional camera 10Z, surveillance center server 50X transmits parking confirmation notification to smartphone 200 inputting the reservation information of the parking space in which the entry of the vehicle is detected, using the information regarding the parking space in which the entry of the vehicle is detected and the advance reservation information of the parking space registered in memory 502. When surveillance center server 50X receives the parking approval notification input by smartphone 200, surveillance center server 50X performs a charging process on the parking from an entry time of the vehicle to the parking space. Thus, parking place surveillance system 100X can manage the advance reservation information regarding the parking space only for reservation of parking place PRK4 and the user can confirm an image at the time of parking the vehicle and a parking confirmation mail on smartphone 200. Therefore, it is possible to efficiently grasp appropriate and accurate parking (that is, parking which is not illegal parking) without using a sensor as in technologies of the related art.

It is not necessary for the user to go to a fare adjustment machine and pay money in parking place PRK4 of coin paying or the like and exit (leaving) of the vehicle from the parking place can be simply performed. Parking place surveillance system 100X can charge a fee, for example, by minutes and it is possible to suppress wasteful spending for the user.

When the exit of a vehicle from the parking space is detected based on the captured image of omnidirectional camera 10Z, surveillance center server 50X transmits use completion notification of the parking to smartphone 200 inputting the reservation information of the parking space in which the exit of the vehicle is detected, using the information regarding the parking space in which the exit of the vehicle is detected and the advance reservation information of the parking space registered in memory 502. Thus, parking place surveillance system 100X can appropriately manage the exit (leaving) of the vehicle of the user from parking place PRK4. Therefore, the user can be relieved to make a reservation for using the parking place without charging a fee more than necessary.

In parking place surveillance system 100X according to the exemplary embodiment, it is not necessary to install a flap plate, a gate, or a fare adjustment machine for parking fees at the time of setting up parking place PRK4. When exit (leaving) of a vehicle from parking place PRK4 is appropriately confirmed in surveillance center server 50X, surveillance center server 50X can receive a new advance reservation for the parking space, and thus can provide the parking space to another user so that the user can use the parking space.

In parking place surveillance system 100X according to the exemplary embodiment, surveillance center server 50X urges the user who makes an advance reservation to confirm an image at the time of parking (entry) to quickly confirm illegal parking by appending the image to a mail, and therefore can also notify the surveillance staff that the user confirms the image. Since omnidirectional camera 10X capable of viewing a whole range of parking place PRK4, it is possible to surveil parking place PRK4 every day.

In parking place surveillance system 100X according to the exemplary embodiment, an advance reservation for a parking space only for reservation of parking place PRK4 is received. Therefore, it is possible to flexibly set prices of parking fees in accordance with a congestion time or a non-congestion time. For example, it is possible to perform a management in which a parking fee is set to be high at the congestion time and a parking fee is set to be slightly low at the non-congestion time, and thus it is possible to contribute to use of appropriate parking place administration.

The various exemplary embodiments have been described above with reference to the drawings, but it is regardless to say that the present disclosure is not limited to the examples. It is apparent to those skilled in the art that various modification examples and correction examples can be made within the scope described in the claims and these examples are, of course, construed to pertain to the technical range of the present disclosure. The constituent elements in the foregoing exemplary embodiments can be combined arbitrarily within the range departing from the gist of the present disclosure.

In the above-described exemplary embodiments, the configurations of surveillance situation determination servers 30, 30A, and 30Z may be installed inside several cameras (that is, camera 10, omnidirectional camera 10Z, and PTZ camera 10Y) or may be installed inside one microphone (that is, microphone 20). Thus, since the configurations of surveillance situation determination servers 30, 30A, and 30Z can be mounted on a high-performance camera or microphone, an operator operating the parking place surveillance system according to each exemplary embodiment may not spend time and effort on separate introduction and installation of surveillance situation determination servers 30, 30A, and 30Z, and thus a reduction in the number of steps of constructing the system is expected. Since the camera or the microphone having the configurations of surveillance situation determination servers 30, 30A, and 30Z directly transmits and receives information or data to the surveillance center server or directly notifies the surveillance center server of information or data, the surveillance staff can quickly confirm notification indicating an alarm.

An execution procedure of processes such as operations, orders, steps, and stages in devices, systems, programs, and methods indicated in the claims, the present specification, and the drawings does not particularly clarify "earlier than", "previously", and the like and the processes can be performed in any procedure as long as an output of a previous process is not used in a subsequent process. In the operation flows in the claims, the present specification, and the drawings, even when description is made using "above", "below", and the like for convenience, it is not meant that the processes are performed necessarily in this procedure.

The present disclosure is useful as a surveillance camera system and a surveillance method for accurately guaranteeing an improvement in efficiency with which a surveillance agent early grasps the details of an incident by early collecting detailed information including a harmed vehicle or the position of a scene of an incident in a case in which there is a behavior of harming the parked vehicle in a parking place.

The invention claimed is:

1. A surveillance camera system, comprising:
a camera installed in a surveillance area; and
a server,
wherein the camera transmits a captured image of the surveillance area to the server,
wherein the server acquires information regarding a number plate of a vehicle at a time of entry of the vehicle to the surveillance area based on a captured image of the surveillance area transmitted from the camera, and
wherein the server repeatedly acquires information regarding the number plate of the vehicle and notifies that a change in the number plate occurs in accordance with detection indicating that the acquired number plate of the vehicle does not match the number plate at the time of entry of the vehicle.

2. The surveillance camera system according to claim 1, wherein the camera has at least one of an omnidirectional camera that detects a vehicle parked in a parking lot in the surveillance area and a PTZ (Pan Tilt Zoom) camera that detects a number plate of the vehicle in the surveillance area.

3. The surveillance camera system according to claim 1, wherein the camera is an omnidirectional camera capable of capturing an omnidirectional image of the surveillance area which has a parking region for each vehicle and monitors a parking situation in each parking region in accordance with whether a vehicle is parked in each parking region.

4. The surveillance camera system according to claim 3, wherein the camera tracks a movement of a vehicle when the vehicle is detected within an angle of view of the omnidirectional image, acquires a best shot image of the vehicle and information regarding the vehicle, and transmits the best shot image of the vehicle and the information regarding the vehicle to the server, and
wherein the server records the best shot image of the vehicle and the information regarding the vehicle transmitted from the camera in association with each other in a storage.

5. The surveillance camera system according to claim 4, wherein when a person getting on the vehicle shown in the angle of view of the omnidirectional image is detected, the camera tracks a movement of the person, acquires a best shot image of the person and information regarding the person, and transmits the best shot image of the person and the information regarding the person to the server, and wherein the server records the best short image of the person and the information regarding the person transmitted from the camera further in associating with the best shot image of the vehicle and the information regarding the vehicle in the storage.

6. A surveillance camera system, comprising:

a camera installed in a surveillance area; and a server, wherein the camera transmits a captured image of the surveillance area to the server, wherein the server acquires information regarding a number plate of a vehicle at a time of entry of the vehicle to the surveillance area using a captured image of the surveillance area transmitted from the camera, wherein the server acquires information regarding the number plate of the vehicle at a time of exit of the vehicle from the surveillance area using a captured image of the surveillance area transmitted from the camera, and wherein the server notifies that a change in the number plate occurs in accordance with detection indicating that the number plate at the time of entry does not match the number plate at the time of exit.

7. The surveillance camera system according to claim 6, wherein the camera is an omnidirectional camera capable of capturing an omnidirectional image of the surveillance area which has a parking region for each vehicle and monitors a parking situation in each parking region in accordance with whether a vehicle is parked in each parking region.

8. A surveillance method implemented by a surveillance camera system that has a camera installed in a surveillance area and a server, the method comprising:

transmitting, by the camera, a captured image of the surveillance area to the server;

acquiring, by the server, information regarding a number plate of a vehicle at a time of entry of the vehicle to the surveillance area using a captured image of the surveillance area transmitted from the camera;

acquiring, by the server, information regarding the number plate of the vehicle at a time of exit of the vehicle from the surveillance area using a captured image of the surveillance area transmitted from the camera; and notifying, by the server, that a change in the number plate occurs in accordance with detection indicating that the number plate at the time of entry does not match the number plate at the time of exit.

* * * * *